(12) United States Patent
Tanaka et al.

(10) Patent No.: US 12,371,068 B2
(45) Date of Patent: Jul. 29, 2025

(54) ELECTRONIC INSTRUMENT, MOVABLE APPARATUS, DISTANCE CALCULATION METHOD, AND STORAGE MEDIUM

(71) Applicant: CANON KABUSHIKI KAISHA, Tokyo (JP)

(72) Inventors: Shin Tanaka, Kanagawa (JP); Kazuya Nobayashi, Tokyo (JP); Makoto Oigawa, Kanagawa (JP); Shigeo Kodama, Tokyo (JP); Tomoyuki Kawamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 18/115,834

(22) Filed: Mar. 1, 2023

(65) Prior Publication Data

US 2023/0286548 A1 Sep. 14, 2023

(30) Foreign Application Priority Data

Mar. 9, 2022 (JP) .................. 2022-036621

(51) Int. Cl.
*B60W 60/00* (2020.01)
*G01C 3/08* (2006.01)
*G01C 3/14* (2006.01)
*G06T 7/521* (2017.01)
(Continued)

(52) U.S. Cl.
CPC ....... *B60W 60/00272* (2020.02); *G01C 3/085* (2013.01); *G01C 3/14* (2013.01);
(Continued)

(58) Field of Classification Search
CPC ........... G06T 7/521; G06T 7/593; G06T 7/70; G06T 2207/10012; G06T 2207/10028;
(Continued)

(56) References Cited

U.S. PATENT DOCUMENTS

2015/0015673 A1  1/2015 Matono et al.
2019/0340445 A1* 11/2019 Roy Chowdhury . G06V 20/588
(Continued)

FOREIGN PATENT DOCUMENTS

EP  3846128 A1 *  7/2021
EP  3936917 A1 *  1/2022 ............... G02B 7/36
(Continued)

OTHER PUBLICATIONS

Aug. 21, 2023 Extended Search Report in European Patent Application No. 23 159 886.3.

*Primary Examiner* — Tuan C To

(74) *Attorney, Agent, or Firm* — Venable LLP

(57) ABSTRACT

An electronic instrument includes a first distance information acquisition unit acquiring first distance information corresponding to an object included in an image signal, at least one of a second distance information acquisition unit acquiring second distance information on the basis of at least one of information of an end position of the object included in the image signal and a third distance information acquisition unit configured to acquire third distance information based on information of a size of the object included in the image signal, and a distance information integration unit generating integrated distance information by combining and integrating at least two of the first distance information, the second distance information, and the third distance information.

19 Claims, 30 Drawing Sheets

(51) Int. Cl.
  *G06T 7/593* (2017.01)
  *G06T 7/70* (2017.01)
(52) U.S. Cl.
  CPC .............. *G06T 7/521* (2017.01); *G06T 7/593* (2017.01); *G06T 7/70* (2017.01); *B60W 2420/408* (2024.01); *B60W 2556/00* (2020.02); *G06T 2207/10012* (2013.01); *G06T 2207/10028* (2013.01); *G06T 2207/30244* (2013.01); *G06T 2207/30252* (2013.01)
(58) Field of Classification Search
  CPC ........... G06T 2207/30244; G06T 2207/30252; G01C 3/085; G01C 3/14; B60W 2420/408; G01S 13/931; G05D 1/021
  USPC .......................................................... 701/25
  See application file for complete search history.

(56)     References Cited

U.S. PATENT DOCUMENTS

| | | | | |
|---|---|---|---|---|
| 2020/0004257 | A1* | 1/2020 | Kim | G05D 1/0088 |
| 2020/0324713 | A1* | 10/2020 | Lee | B60R 11/04 |
| 2021/0097707 | A1 | 4/2021 | Oba et al. | |
| 2022/0189179 | A1* | 6/2022 | Sasamoto | G06T 7/593 |
| 2024/0223915 | A1* | 7/2024 | Wendel | G06V 20/56 |

FOREIGN PATENT DOCUMENTS

| | | |
|---|---|---|
| JP | 2007-281296 A | 10/2007 |
| WO | 2020/213386 A1 | 10/2020 |

\* cited by examiner

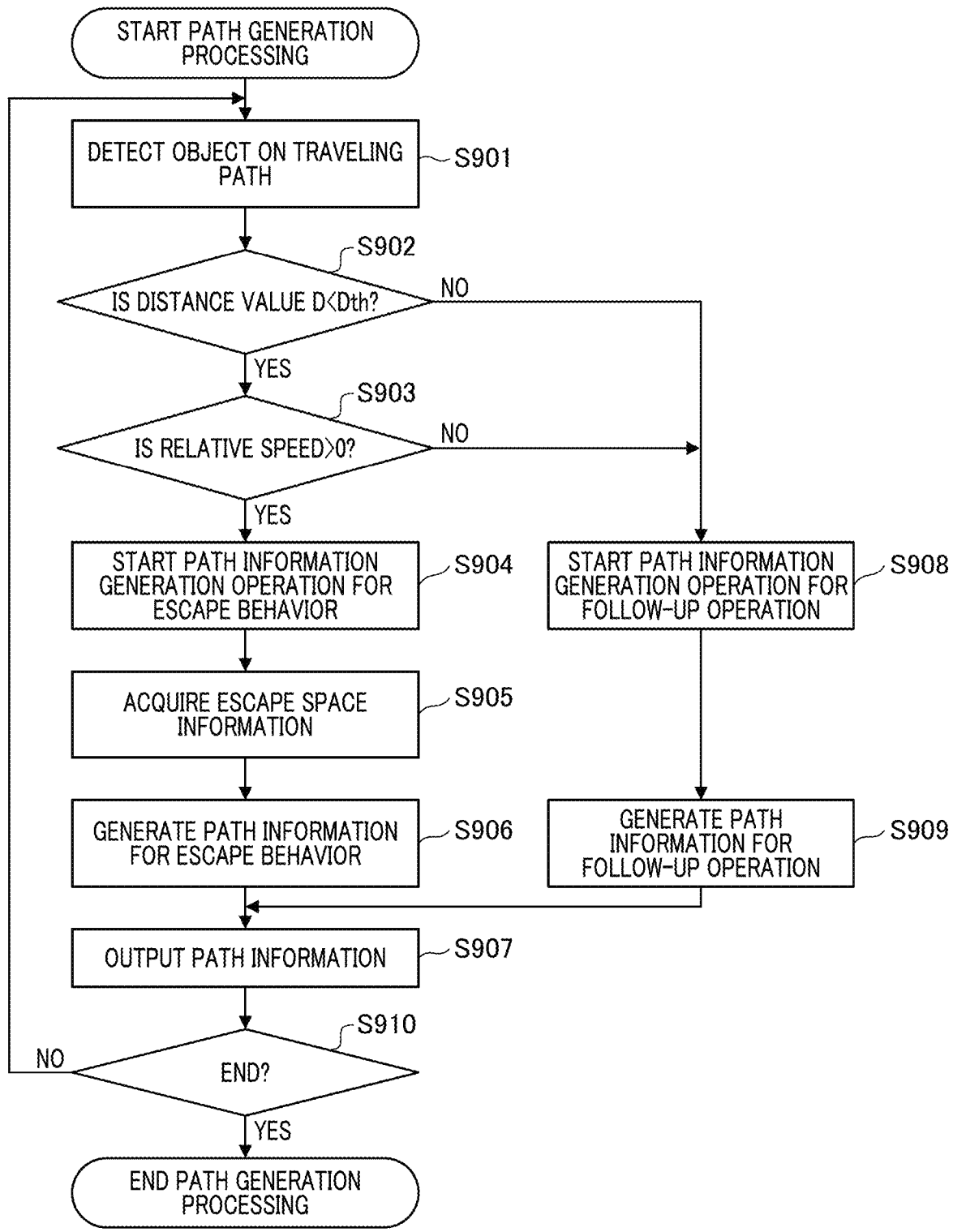

FIG. 30

| | Number | Traffic lane width | Distance |
|---|---|---|---|
| T0 | [0] | 1000pix | 10m |
| | [1] | 980pix | 10.1m |
| | ⋮ | ⋮ | ⋮ |
| | [30] | 520pix | 20m |
| | [31] | 500pix | 20.1m |
| T1 | [32] | 1000pix | 10.2m |
| | [33] | 950pix | 10.5m |
| | ⋮ | ⋮ | ⋮ |
| | [62] | 420pix | 25m |
| | [63] | 400pix | 25.2m |
| T2 | [64] | 1010pix | 9.9m |
| | [65] | 960pix | 10.5m |
| | ⋮ | ⋮ | ⋮ |
| | [k-1] | 510pix | 20m |
| | [k-2] | 400pix | 25.1m |

ELECTRONIC INSTRUMENT, MOVABLE APPARATUS, DISTANCE CALCULATION METHOD, AND STORAGE MEDIUM

BACKGROUND OF THE INVENTION

Field of the Invention

The present invention relates to an electronic instrument, a movable apparatus, a distance calculation method, a storage medium, and the like for acquiring a distance from the movable apparatus to an object.

Description of the Related Art

There is a photographing device that has a sensor in which a plurality of pixel regions having a photoelectric conversion function are two-dimensionally disposed and is able to acquire an image signal and distance information in each of the pixel regions. In a solid-state imaging element disclosed in Japanese Patent Laid-Open No. 2007-281296, pixels having a ranging function are disposed for some or all pixels in the imaging element, and a subject distance is detected on the basis of a phase difference detected on an imaging surface (imaging surface phase difference system).

That is, positional deviation is computed on the basis of a correlation between two image signals based on images generated by luminous fluxes which have passed through different pupil regions in an imaging optical system provided in the photographing device, and a distance is acquired on the basis of the positional deviation. A correlation between two image signals is evaluated using a technique such as a region-based matching technique of evaluating a correlation by cutting out an image signal included in a predetermined collation region from each of the image signals.

However, erroneous evaluation of a correlation may occur due to a subject or photographing conditions, such as a case in which a subject included in an image signal has little change in contrast, a case in which an image signal includes a large amount of noise, and the like. If occurrence of erroneous evaluation of a correlation included therein reaches or exceeds a certain level, there is concern that a computed amount of positional deviation between two image signals may have an error and accuracy of an acquired distance may deteriorate.

SUMMARY OF THE INVENTION

An electronic instrument according to an aspect of the present invention includes at least one processor or circuit configured to function as: a first distance information acquisition unit acquiring first distance information corresponding to an object included in an image signal, at least one of a second distance information acquisition unit acquiring second distance information on the basis of at least one of information of an end position of the object included in the image signal and a third distance information acquisition unit configured to acquire third distance information based on information of a size of the object included in the image signal, and a distance information integration unit generating integrated distance information by combining and integrating at least two of the first distance information, the second distance information, and the third distance information.

Further features of the present invention will become apparent from the following description of embodiments with reference to the attached drawings.

BRIEF DESCRIPTION OF THE DRAWINGS

FIG. 9 is a flowchart showing an example of path generation processing executed by a path generation unit according to First Embodiment.

FIG. 30 is a schematic view showing an example of each piece of the traffic lane width data according to Third Embodiment.

DESCRIPTION OF THE EMBODIMENTS

Figure 1:
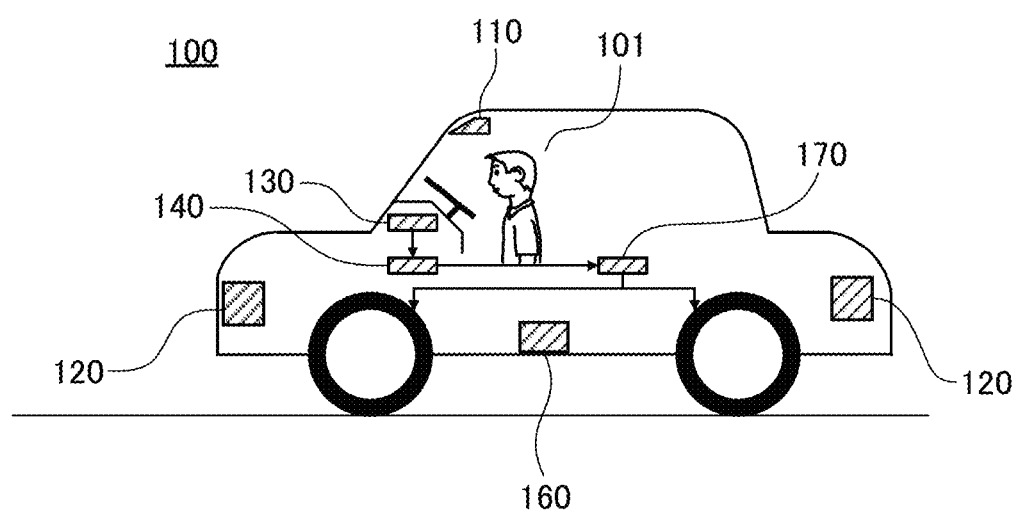
FIG. 1 is a schematic view illustrating an example of a constitution of a vehicle according to First Embodiment.

Hereinafter, with reference to the accompanying drawings, favorable modes of the present invention will be described using Embodiments. In each diagram, the same reference signs are applied to the same members or elements, and duplicate description will be omitted or simplified.

First Embodiment

In the following description, description will be given using a path generation device (electronic instrument) including a photographing device as an example of a path generation device of the present invention, but application of the present invention is not limited thereto.

In the description referring to the drawings, even if the drawing numbers are different, the same reference signs are basically applied to parts indicating the same parts, and duplicate description will be avoided whenever possible.

FIG. 1 is a schematic view illustrating an example of a constitution of a vehicle 100 according to First Embodiment. The vehicle 100 is an example of a movable apparatus including an imaging device 110, radar devices 120, a path generation ECU 130, a vehicle control ECU 140, and a measurement instrument group 160. The vehicle 100 further includes a driving unit 170 serving as a driving control unit for driving the vehicle 100, a memory 180, and a memory 190.

The driving unit 170, the memory 180, and the memory 190 will be described using FIG. 2. The imaging device 110, the radar devices 120, the path generation ECU 130, the vehicle control ECU 140, and the measurement instrument group 160 are included therein.

The imaging device 110, the path generation ECU 130, and the like constitute a path generation device 150. A driver 101 can ride the vehicle 100, and the driver 101 rides the vehicle 100 while facing a side in front thereof (travel direction) at the time of traveling. The driver 101 can control operation of the vehicle by operating operation members such as a steering wheel, an accelerator pedal, and a brake pedal of the vehicle 100. The vehicle 100 may have an automatic driving function or may be able to be remotely controlled from the outside.

The imaging device 110 is disposed to photograph a side in front of the vehicle 100 (normal travel direction). As illustrated in FIG. 1, the imaging device 110 is disposed, for example, in the vicinity of an upper end of a windshield in the vehicle 100 and photographs a region of a predetermined angle range (hereinafter, a photographing field angle) toward a side in front of the vehicle 100.

The imaging device 110 may be disposed to photograph a side behind the vehicle 100 (opposite the normal travel direction, that is, a rearward travel direction) or may be disposed to photograph a side next thereto. A plurality of imaging devices 110 may be disposed in the vehicle 100.

Figure 2:
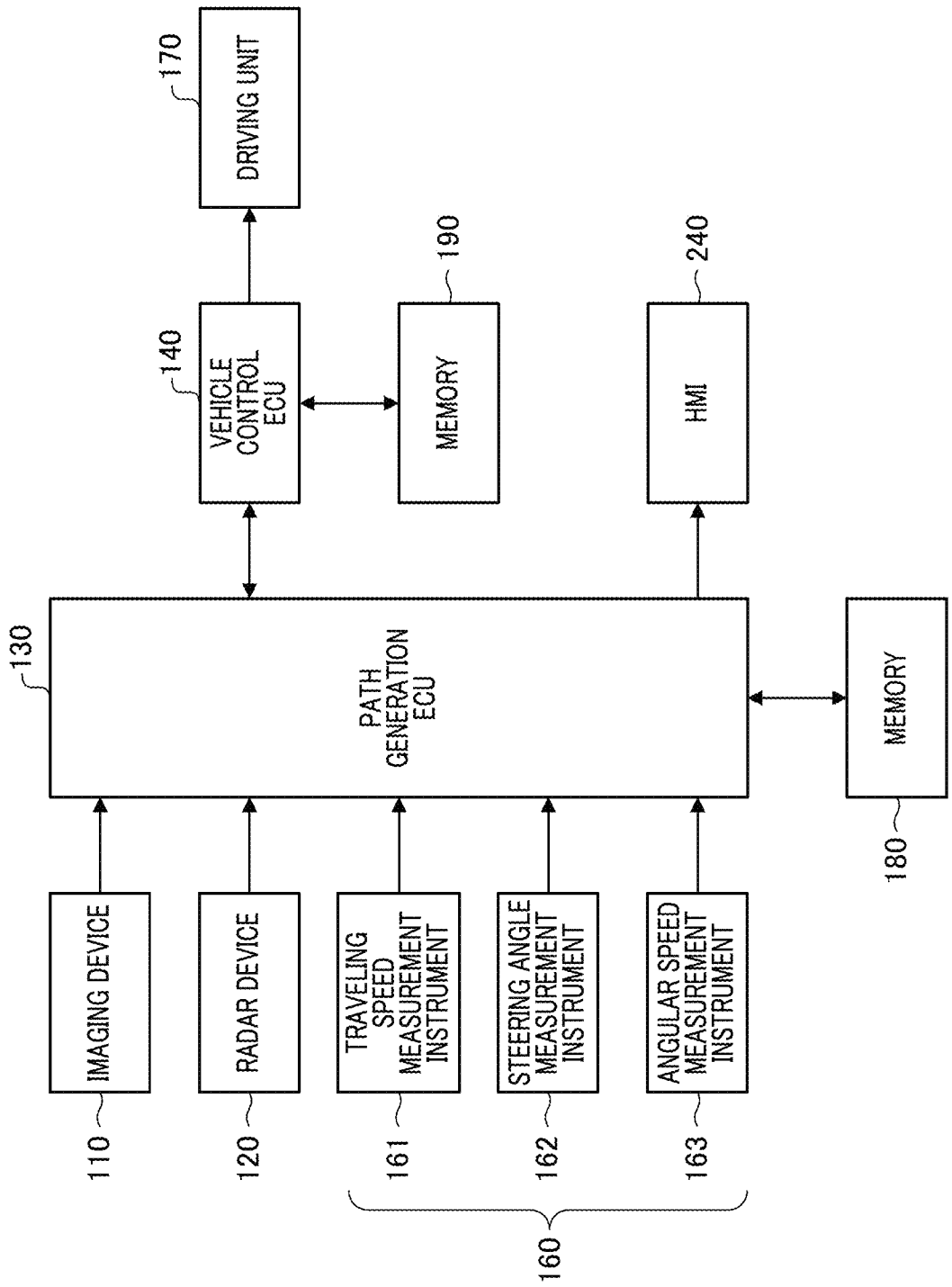
FIG. 2 is a block diagram showing an example of a constitution of the vehicle according to First Embodiment.

FIG. 2 is a block diagram showing an example of a constitution of the vehicle 100 according to First Embodiment.

The imaging device 110 photographs the environment around the vehicle (surrounding environment) including the road on which the vehicle 100 travels (traveling road) and detects an object included within a range of the photographing field angle of the imaging device 110. In addition, the imaging device 110 acquires information of a detected object (external information) and information relating to a distance of a detected object (object distance information) and outputs them to the path generation ECU 130.

Object distance information need only be information which can be converted into a distance from a predetermined position in the vehicle 100 to an object using a predetermined reference table, or a predetermined conversion coefficient and a conversion expression. For example, a distance may be allocated to predetermined integer values and sequentially output to the path generation ECU 130.

The imaging device 110 has a sensor in which a plurality of pixel regions having a photoelectric conversion function are two-dimensionally disposed and can acquire the distance of an object by an imaging surface phase difference system. Acquisition of distance information of an object by the imaging surface phase difference system will be described below.

The radar devices 120 are detection devices for detecting an object by emitting electromagnetic waves and receiving reflected waves thereof. The radar devices 120 function as a fourth distance information acquisition unit acquiring distance information (fourth distance information) indicating a distance to an object in a transmission direction of electromagnetic waves on the basis of a time from emission of electromagnetic waves to reception of reflected waves and a reception intensity of the reflected waves.

The radar devices 120 output the distance information to the path generation ECU 130. The radar devices 120 are assumed to be millimetric wave radar devices using electromagnetic waves having a wavelength within a so-called waveband range from a millimetric waveband to a sub-millimetric waveband.

In Present Embodiment, a plurality of radar devices 120 are attached to the vehicle 100. For example, the radar devices 120 are attached to each of the left and right front sides and the left and right rear sides of the vehicle 100.

In addition, each of the radar devices 120 emits electromagnetic waves within a predetermined angle range, measures distances from the respective radar devices 120 on the basis of a time from transmission of electromagnetic waves to reception of reflected waves and a reception intensity of the reflected waves, and generates distance information with respect to an object. The distance information may include information relating to a reception intensity of reflected waves and a relative speed of an object in addition to distances from the radar devices 120.

For example, the measurement instrument group 160 includes a traveling speed measurement instrument 161, a steering angle measurement instrument 162, and an angular speed measurement instrument 163, through which vehicle information relating to a driving state of the vehicle, such as a traveling speed, a steering angle, and an angular speed is acquired. The traveling speed measurement instrument 161 is a measurement instrument for detecting a traveling speed of the vehicle 100.

The steering angle measurement instrument 162 is a measurement instrument for detecting a steering angle of the vehicle 100. The angular speed measurement instrument 163 is a measurement instrument for detecting an angular speed of the vehicle 100 in a turning direction. Each of the measurement instruments outputs a measured measurement signal corresponding to a parameter to the path generation ECU 130 as the vehicle information.

The path generation ECU 130 is constituted using a logical circuit or the like and generates a traveling trajectory of the vehicle 100 and path information relating to the traveling trajectory on the basis of the measurement signal, the external information, the object distance information, the distance information, and the like. The path generation ECU 130 outputs the traveling trajectory and the path information to the vehicle control ECU 140. Data and programs processed and executed by the path generation ECU 130 are saved in the memory 180.

Here, a traveling trajectory is information indicating a trajectory (path) through which the vehicle 100 passes. In addition, path information is information for the vehicle 100 passing through a path indicated by the traveling trajectory (including road information and the like).

The vehicle control ECU 140 is constituted using a logical circuit or the like and controls the driving unit 170 such that the vehicle 100 passes through a path corresponding to the path information on the basis of the path information and the vehicle information acquired from the measurement instrument group 160. Data and programs processed and executed by the vehicle control ECU 140 are saved by the memory 190.

The driving unit 170 is a driving member for driving the vehicle and includes, for example, power units such as an engine and a motor (not illustrated) generating energy for rotating tires, and a steering unit for controlling the travel direction of the vehicle. In addition, the driving unit 170 includes a gear box for rotating the tires using energy generated by the power units, a gear control unit for controlling the constitution inside the gear box, a brake unit for performing a braking operation, and the like.

The vehicle control ECU 140 adjusts a driving amount, a braking amount, a steering amount and the like of the vehicle 100 by controlling the driving unit 170 such that the vehicle passes through a path corresponding to the path information. Specifically, the vehicle control ECU 140 causes the vehicle 100 to operate by controlling a brake, steering, a gear constitution, and the like.

The path generation ECU 130 and the vehicle control ECU 140 may be constituted of a common central processing unit (CPU) and a memory in which a computation processing program is saved. An HMI 240 is a human machine interface for providing the driver 101 with information.

The HMI 240 includes a display which can be visually recognized when the driver 101 is positioned at a driving position, and a display control device which generates information to be displayed in the display. In addition, the HMI 240 includes a device for outputting audio (speaker system) and an audio control device for generating audio data.

The display control device inside the HMI 240 causes the display to display navigation information on the basis of the path information generated by the path generation ECU 130. In addition, the audio control device inside the HMI 240 generates audio data for notifying the driver 101 of the path information on the basis of the path information and outputs it from the speaker system. For example, audio data is data or the like for notifying that an intersection to turn is approaching.

Figure 3:
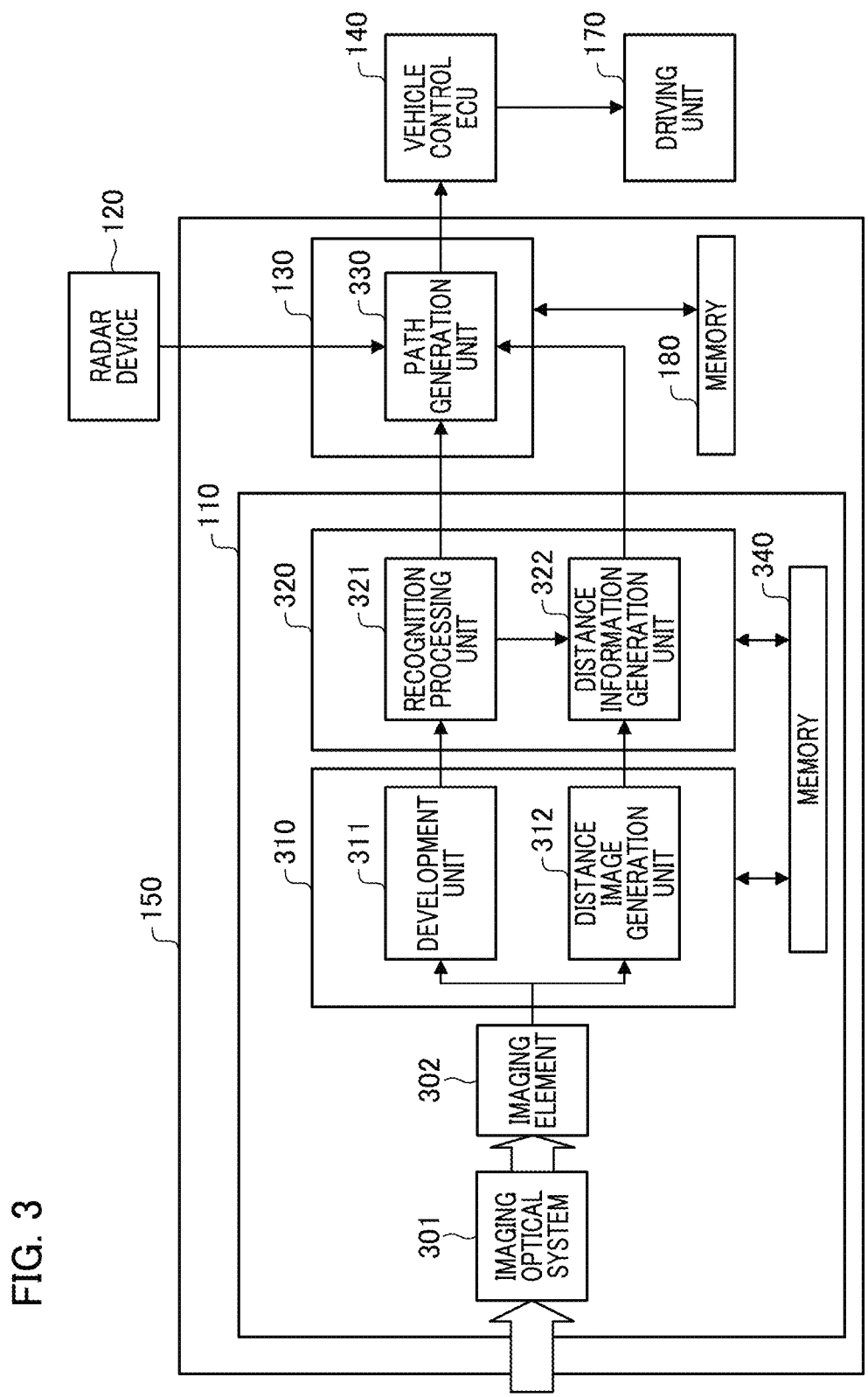
FIG. 3 is a functional block diagram showing an example of a constitution of a path generation device according to First Embodiment.

FIG. 3 is a functional block diagram showing an example of a constitution of the path generation device 150 according to First Embodiment. The path generation device 150 includes the imaging device 110 and the path generation ECU 130. A part of the functional blocks illustrated in FIG. 3 is realized by causing a computer included in the path generation device 150 to execute a computer program stored in the memory serving as a storage medium.

However, a part or all of them may be realized by means of hardware. A dedicated circuit (ASIC), a processor (reconfigurable processor, DSP), or the like can be used as hardware.

In addition, the functional blocks illustrated in FIG. 3 may not be built into the same casing and may be constituted of separate devices connected to each other via signal lines. The foregoing description relating to FIG. 3 also applies to those for FIGS. 18 and 22 in a similar manner.

The imaging device 110 has an imaging optical system 301, an imaging element 302, an image processing unit 310, and an object information generation unit 320. In Present Embodiment, the imaging optical system 301, the imaging element 302, the image processing unit 310, and the object information generation unit 320 are disposed inside a casing (not illustrated) of the imaging device 110.

The imaging optical system 301 includes photographing lenses of the imaging device 110 and has a function of forming an image of a subject (optical image) on the imaging element 302. The imaging optical system 301 is constituted of a plurality of lens groups. The imaging optical system 301 has an exit pupil at a position away from the imaging element 302 at a predetermined distance.

The imaging element 302 is an imaging element constituted of a complementary metal-oxide semiconductor (CMOS) or a charge coupled device (CCD) and having a ranging function performed by means of an imaging surface phase difference ranging method. In the imaging element 302, a plurality of pixel regions having a photoelectric conversion function are two-dimensionally disposed.

For example, each of the pixel regions has two photoelectric conversion units (a first photoelectric conversion unit and a second photoelectric conversion unit) separately disposed in a row direction. For example, any one color filter of R, G, and B and a microlens are disposed in front of the two photoelectric conversion units of each of the pixel regions.

The imaging element 302 performs photoelectric conversion of a subject image formed on the imaging element 302 via the imaging optical system 301, generates an image signal based on the subject image, and outputs it to the image processing unit 310. An image signal is a signal having an output value for each photoelectric conversion unit of each of the pixel regions.

The imaging element 302 separately outputs a first image signal based on a signal output from the first photoelectric conversion unit and a second image signal based on a signal output from the second photoelectric conversion unit. Alternatively, an addition signal in which the first image signal and the second image signal are added and the first image signal are separately output to the image processing unit 310.

The image processing unit 310 generates image data having luminance information of each of colors (red, green, and blue) for each pixel and distance image data indicating distance information for each pixel on the basis of the image signal supplied from the imaging element 302. The image processing unit 310 has a development unit 311 generating image data on the basis of the image signal supplied from the imaging element 302, and a distance image generation unit 312 generating distance image data on the basis of the image signal supplied from the imaging element 302.

Processing executed by these will be described below. The image processing unit 310 outputs the image data from the development unit 311 and the distance image data from the distance image generation unit 312 to the object information generation unit 320.

The object information generation unit 320 has a recognition processing unit 321 detecting an object included in an acquired image and generating external information indicating information relating to the object on the basis of the image data from the development unit 311. External information is information indicating a position, a size such as a width or a height, a region, and the like within the image of a detected object. In addition, external information includes information and the like relating to an attribution and an identification number of a detected object.

The object information generation unit 320 has a distance information generation unit 322 generating object distance information indicating a distance to an object (first distance information) included in an acquired image on the basis of the external information from the recognition processing unit 321 and the distance image data from the distance image generation unit 312. Here, the distance information generation unit 322 functions as a first distance information acquisition unit acquiring the first distance information corresponding to an object included in the image signal.

Moreover, the object distance information is linked to information relating to the identification number of an object included in the external information. The object information generation unit 320 outputs the external information from the recognition processing unit 321 and the object distance information from the distance information generation unit 322 to the path generation ECU 130.

The image processing unit 310 and the object information generation unit 320 may be constituted of one or more processors provided in the imaging device 110. Functions of the image processing unit 310 and the object information generation unit 320 may be realized by causing one or more processors to execute a program read from a memory 340.

The path generation ECU 130 includes a path generation unit 330. The path generation unit 330 generates path information on the basis of the external information and the object distance information, and the distance information acquired from the radar devices 120.

Next, a structure and control of each block in the path generation device 150 will be described in detail.

Figure 4A:
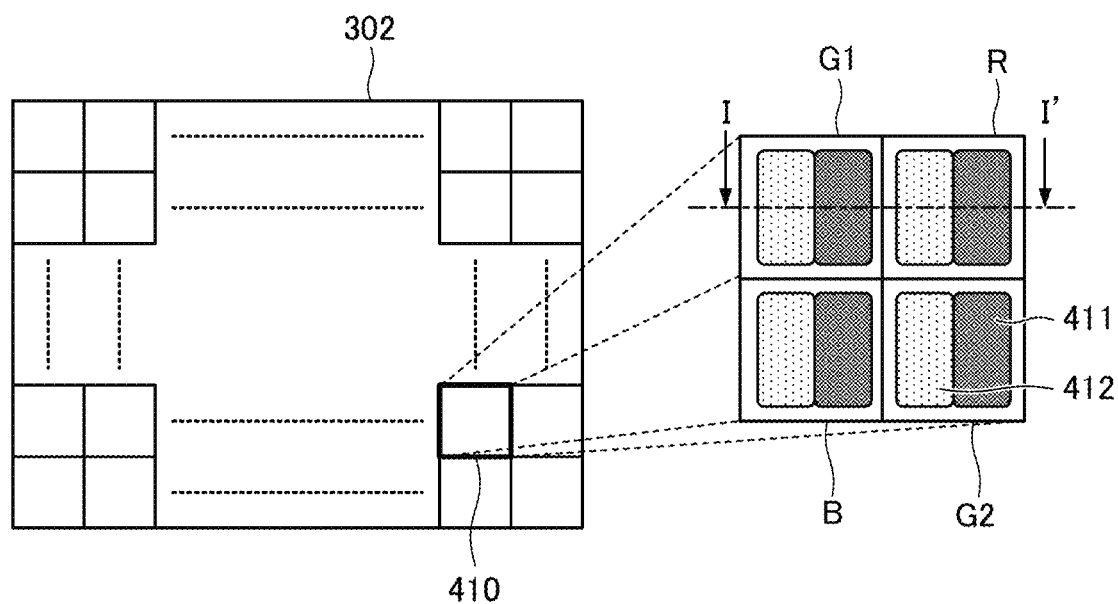
FIGS. 4A and 4B are schematic views illustrating an example of a constitution of an imaging element according to First Embodiment.
Figure 4B:
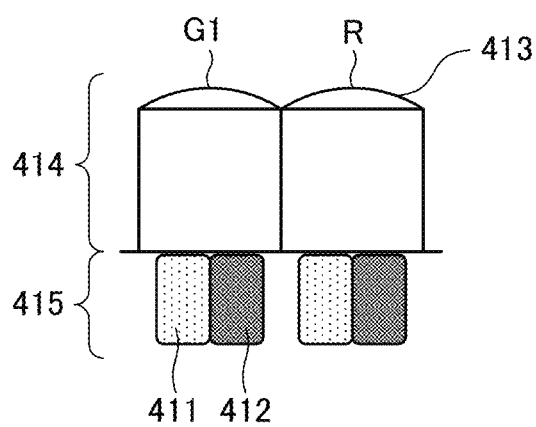

FIGS. 4A and 4B are schematic views illustrating an example of a constitution of the imaging element 302 according to First Embodiment. FIG. 4A is a top view of the imaging element 302 viewed in an incident direction of light. The imaging element 302 is constituted by arraying a plurality of pixel groups 410 (2 rows×2 columns) in a matrix shape.

Each of the pixel groups 410 has a green pixel G1, a green pixel G2 for detecting green light, a red pixel R for detecting red light, and a blue pixel B for detecting blue light. In the pixel groups 410, the green pixel G1 and the green pixel G2 are diagonally disposed. In addition, each pixel has a first photoelectric conversion unit 411 and a second photoelectric conversion unit 412.

FIG. 4B is a cross-sectional view along I-I' cross section of the pixel group 410 in FIG. 4A. Each pixel is constituted of a microlens 413, a light guiding layer 414, and a light receiving layer 415. The light guiding layer 414 has the microlens 413 for efficiently guiding a luminous flux incident on the pixel to the light receiving layer 415, the color filter for causing light having a wavelength band corresponding to the color of light detected by each pixel to pass therethrough, and a wiring for image reading and a wiring for pixel driving.

The light receiving layer 415 is a photoelectric conversion unit performing photoelectric conversion of light which has been incident via the light guiding layer 414 and outputting it as an electric signal. The light receiving layer 415 has the first photoelectric conversion unit 411 and the second photoelectric conversion unit 412.

Figure 5A:
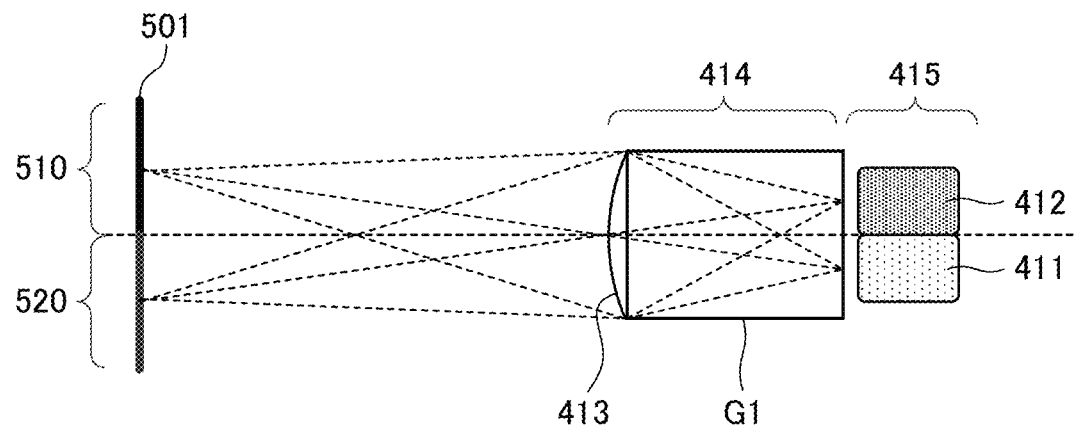
FIGS. 5A to 5D are explanatory schematic views of relationships between a subject distance and incident light in an imaging surface phase difference system.

FIGS. 5A to 5D are explanatory schematic views of relationships between a subject distance and incident light in the imaging surface phase difference system. FIG. 5A is a schematic view illustrating an exit pupil 501 of the imaging optical system 301, the green pixel G1 of the imaging element 302, and light incident on each photoelectric conversion unit of the green pixel G1. The imaging element 302 has a plurality of pixels. However, for the sake of simplification, one green pixel G1 will be described.

The microlens 413 of the green pixel G1 is disposed such that the exit pupil 501 and the light receiving layer 415 optically have a conjugation relationship. As a result, a luminous flux which has passed through a first pupil region 510 that is a partial pupil region involved in the exit pupil 501 is incident on the first photoelectric conversion unit 411. Similarly, a luminous flux which has passed through a second pupil region 520 that is a partial pupil region is incident on the second photoelectric conversion unit 412.

The first photoelectric conversion unit 411 of each pixel performs photoelectric conversion of a received luminous flux and outputs a signal. The first image signal is generated from signals output from a plurality of first photoelectric conversion units 411 included in the imaging element 302. The first image signal indicates an intensity distribution of an image (which will be referred to as an image A) formed on the imaging element 302 by a luminous flux which has mainly passed through the first pupil region 510.

The second photoelectric conversion unit 412 of each pixel performs photoelectric conversion of a received luminous flux and outputs a signal. The second image signal is generated from signals output from a plurality of second photoelectric conversion units 412 included in the imaging element 302. The second image signal indicates an intensity distribution of an image (which will be referred to as an image B) formed on the imaging element 302 by a luminous flux which has mainly passed through the second pupil region 520.

An amount of relative positional deviation (hereinafter, a parallax amount) between the first image signal corresponding to the image A and the second image signal corresponding to the image B is an amount corresponding to a defocus amount. A relationship between the parallax amount and the defocus amount will be described using FIGS. 5B, 5C, and 5D.

Figure 5B:
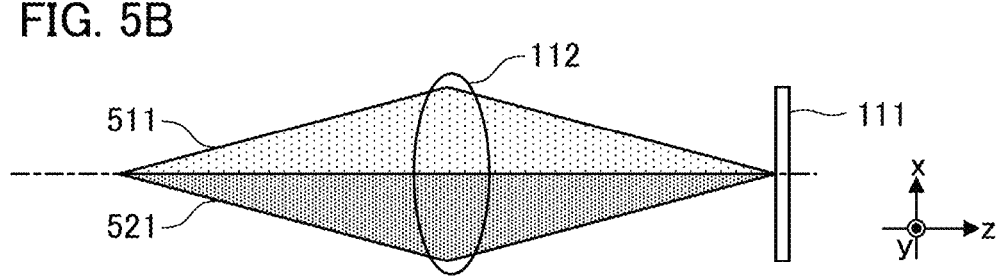
Figure 5C:
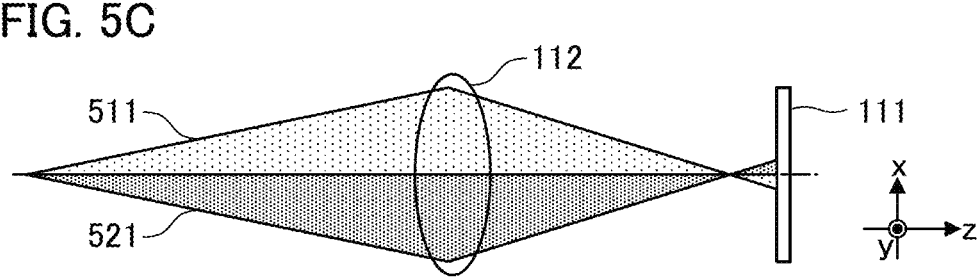
Figure 5D:
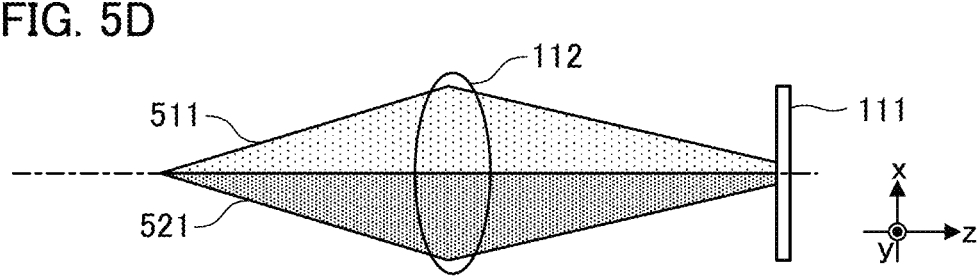

FIGS. 5B, 5C, and 5D are schematic views illustrating the imaging element 302 and the imaging optical system 301. In the diagram, the reference sign 511 indicates a first luminous flux passing through the first pupil region 510, and the reference sign 521 indicates a luminous flux passing through the second pupil region 520.

FIG. 5B illustrates a state at the time of focusing, and the first luminous flux 511 and the second luminous flux 521 converge on the imaging element 302. At this time, the parallax amount (positional deviation) between the first image signal corresponding to the image A formed by the first luminous flux 511 and the second image signal corresponding to the image B formed by the second luminous flux 521 becomes zero.

FIG. 5C illustrates a state defocused in a negative direction of a z axis on the image side. At this time, the parallax amount between the first image signal formed by the first luminous flux 511 and the second image signal formed by the second luminous flux 521 does not become zero and has a negative value.

FIG. 5D illustrates a state defocused in a positive direction of the z axis on the image side. At this time, the parallax amount between the first image signal formed by the first luminous flux 511 and the second image signal formed by the second luminous flux 521 does not become zero and has a positive value.

From the comparison between FIGS. 5C and 5D, it is ascertained that a direction in which a parallax occurs switches therebetween in accordance with the positive or negative sign of the defocus amount. In addition, from a geometric relationship, it is ascertained that a parallax amount according to the defocus amount occurs.

Therefore, as described below, the parallax amount between the first image signal and the second image signal can be detected by a region-based matching technique, and the parallax amount can be converted into a defocus amount via a predetermined conversion coefficient. Moreover, the defocus amount on the image side can be converted into a distance to an object using an image formation formula of the imaging optical system 301.

As described above, the imaging element 302 may separately output an addition signal (synthetic signal) of the first image signal and the second image signal, and the first image signal to the image processing unit 310. In this case, the image processing unit 310 can generate the second image signal by means of the difference between the addition signal (synthetic signal) and the first image signal so that the first image signal and the second image signal can be individually acquired.

Figure 6A:
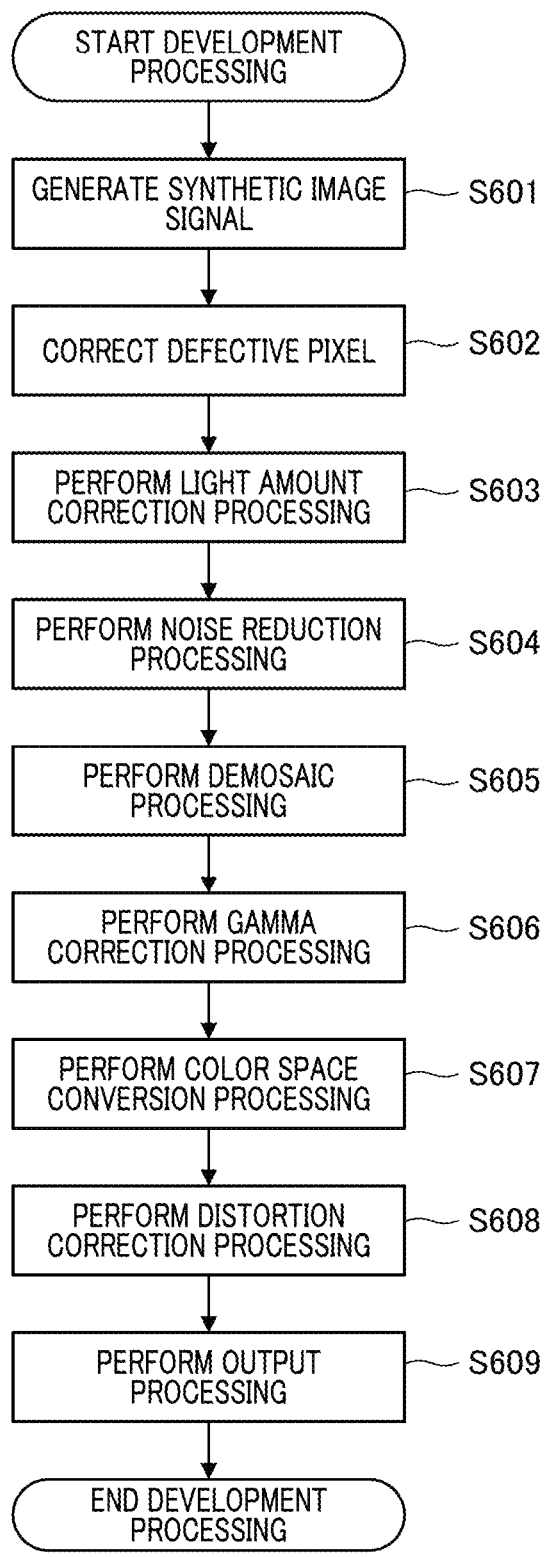
FIGS. 6A and 6B are flowcharts showing a processing example executed by an image processing unit according to First Embodiment.
Figure 6B:
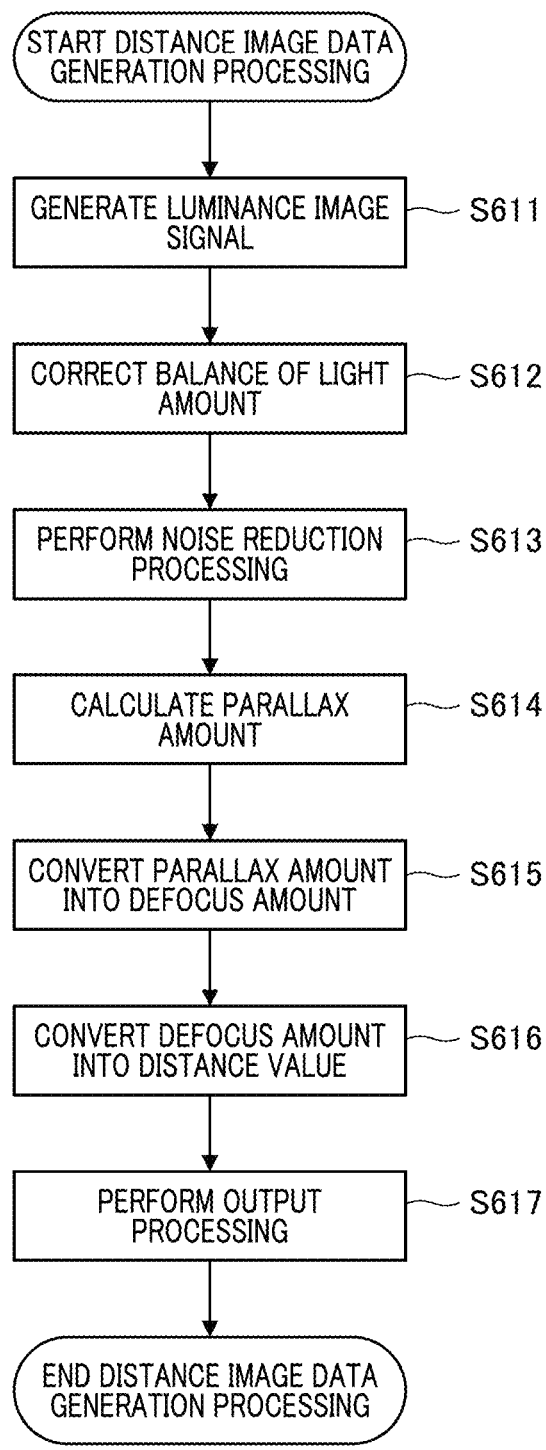

Next, processing performed by the image processing unit 310 will be described. FIGS. 6A and 6B are flowcharts showing a processing example executed by the image processing unit 310 according to First Embodiment. Operation of each step of the flowcharts in FIGS. 6A and 6B is performed by causing the computer included in the path generation device 150 to execute the computer program stored in the memory.

FIG. 6A is a flowchart showing operation of development processing in which the development unit 311 of the image processing unit 310 generates image data from the image signals (the first image signal and the second image signal). Development processing is executed upon reception of an image signal from the imaging element 302.

In Step S601, the development unit 311 executes processing of generating a synthetic image signal realized by synthesizing the first image signal and the second image signal input from the imaging element 302. It is possible to obtain an image signal based on an image formed by a luminous flux which has passed through the entire region of the exit pupil 501 by synthesizing the first image signal and the second image signal.

When a pixel coordinate of the imaging element 302 in a horizontal direction is x and a pixel coordinate thereof in a perpendicular direction is y, a synthetic image signal Im (x, y) of the pixel (x, y) can be expressed by the following Expression 1 using a first image signal Im1 (x, y) and a second image signal Im2 (x, y).

$$Im(x,y)=Im1(x,y)+Im2(x,y) \qquad \text{(Expression 1)}$$

In Step S602, the development unit 311 executes correction processing for a defective pixel of a synthetic image signal. A defective pixel is a pixel which cannot output a normal signal in the imaging element 302. The coordinates of a defective pixel are stored in the memory in advance. The development unit 311 acquires information indicating the coordinates of a defective pixel in the imaging element 302 from the memory.

The development unit 311 performs correction using a median filter substituting a synthetic image signal of a defective pixel with a median value of synthetic image signals of the pixels around the defective pixel. Regarding a method for correcting a synthetic image signal of a defective pixel, a signal value of a defective pixel may be generated through interpolation using the signal values of the pixels around the defective pixel by means of coordinate information of the defective pixel prepared in advance.

In Step S603, the development unit 311 applies light amount correction processing of correcting light amount reduction around a field angle caused by the imaging optical system 301 to a synthetic image signal. Characteristics of light amount reduction around the field angle (relative light amount ratio) caused by the imaging optical system 301 are stored in the memory in advance.

Regarding a method for correcting a light amount, it can be corrected by reading the relative light amount ratio between the field angles stored in advance from the memory and multiplying a synthetic image signal by a gain with which the light amount ratio becomes constant. For example, the development unit 311 performs light amount correction by multiplying a synthetic image signal of each pixel by a gain having characteristics of increasing from the pixel in the middle toward surrounding pixels in the imaging element 302.

In Step S604, the development unit 311 performs noise reduction processing for a synthetic image signal. Noise reduction by means of a Gaussian filter can be used as a method for reducing noise.

In Step S605, the development unit 311 performs demosaic processing with respect to a synthetic image signal, acquires color signals of red (R), green (G), and blue (B) for each pixel, and generates image data having luminance information for each pixel using it. Regarding a demosaic method, it is possible to use a technique of interpolating color information for each pixel using linear interpolation for each color channel.

In Step S606, the development unit 311 performs gradation correction using a predetermined gamma value (gamma correction processing). Image data Idc (x, y) of the pixel (x, y) after the gradation correction is expressed by the following Expression 2 using image data Id (x, y) of the pixel (x, y) before the gradation correction and a gamma value y.

$$Idc(x,y)=Id(x,y)^y \qquad \text{(Expression 2)}$$

A value which has been prepared in advance can be used as the gamma value y. The gamma value y may be determined in accordance with the position of the pixel. For example, the gamma value y may be varied for each region obtained by dividing an effective region of the imaging element 302 by a predetermined number of division.

In Step S607, the development unit 311 executes color space conversion processing of converting a color space of the image data from an RGB color space to a YUV color space. The development unit 311 converts the image data corresponding to the luminance of each of the colors (red, green, and blue) into a luminance value and a color difference value and converts a color space of the image data from the RGB color space to the YUV color space using predetermined coefficients and the conversion expression (Mathematical Expression 3) of the color space.

In Mathematical Expression 3, the factor IdcR (x, y) indicates an image data value of red of the pixel (x, y) after the gradation correction. The factor IdcG (x, y) indicates an image data value of green of the pixel (x, y) after the gradation correction. The factor IdcB (x, y) indicates an image data value of blue of the pixel (x, y) after the gradation correction. The factor Y (x, y) indicates a luminance value of the pixel (x, y) obtained by color space conversion. The factor U (x, y) indicates a difference (color difference value) between the luminance value of the pixel (x, y) obtained by color space conversion and a blue component.

The factor V (x, y) indicates a difference (color difference value) between the luminance value of the pixel (x, y) obtained by color space conversion and a red component. Coefficients (ry, gy, and gy) are coefficients for obtaining Y(x, y), and each of coefficients (ru, gu, and gu) and (rv, gv, and bv) is a coefficient for calculating color difference values.

$$Y(x,y)=ry \times IdcR(x,y)+gy \times IdcG(x,y)+by \times IdcB(x,y)$$

$$U(x,y)=ru \times IdcR(x,y)+gu \times IdcG(x,y)+bu \times IdcB(x,y)$$

$$V(x,y)=rv \times IdcR(x,y)+gv \times IdcG(x,y)+bv \times IdcB(x,y)$$

In Step S608, the development unit 311 executes correction (distortion correction) for curbing an influence of distortion aberration caused by optical characteristics of the imaging optical system 301 with respect to the image data after the foregoing conversion. The distortion aberration correction processing is carried out by performing geometrical deformation of the image data such that a distortion rate of the imaging optical system 301 is corrected.

The geometrical deformation is performed using a polynomial expression for generating a pixel position before correction from a correct pixel position having no distortion aberration. If a pixel position before correction is indicated by a decimal number, the nearest pixel may be used after rounding off or linear interpolation may also be used.

In Step S609, the development unit 311 outputs image data to which the distortion aberration correction processing is applied to the object information generation unit 320. With this, the development processing executed by the development unit 311 ends. However, the flow in FIG. 6A is regularly repeated until a user issues an instruction of ending (not illustrated).

If the recognition processing unit 321 can generate external information by external recognition processing on the basis of the image data before various kinds of correction processing obtained from the imaging element 302, the development unit 311 may not execute all the processing in FIG. 6A. For example, if the recognition processing unit 321 can detect an object within the photographing field angle range on the basis of the image data to which the distortion aberration correction processing of Step S608 is not applied, the processing of Step S608 may be omitted from the development processing in FIG. 6A.

FIG. 6B is a flowchart showing operation of distance image data generation processing performed by the distance image generation unit 312. Here, distance image data is data in which distance information corresponding to a distance from the imaging device 110 to a subject is associated with each pixel. Distance information may be a distance value D or may be a defocus amount ΔL or a parallax amount d used for calculating a distance value. In Present Embodiment, distance image data will be described as data in which the distance value D is mapped to each pixel.

In Step S611, the distance image generation unit 312 generates first and second luminance image signals from an input image signal. That is, the distance image generation unit 312 generates a first image signal using the first luminance image signal corresponding to the image A and generates a second luminance image signal using the second image signal corresponding to the image B.

The distance image generation unit 312 is assumed to synthesize values of the image signals of the red pixel, the green pixel, and the blue pixel in each of the pixel groups 410 using a coefficient and generate a luminance image signal. The distance image generation unit 312 may generate a luminance image signal through synthesis by multiplying each channel of red, green, and blue by a predetermined coefficient after performing demosaic processing using linear interpolation.

In Step S612, the distance image generation unit 312 performs correction of a balance of the light amount between the first luminance image signal and the second luminance image signal. Correction of a balance of the light amount is executed by multiplying at least one of the first luminance image signal and the second luminance image signal by a correction coefficient.

A correction coefficient is assumed to be calculated in advance such that uniform illumination is applied after positional adjustment of the imaging optical system 301 and the imaging element 302 and a luminance ratio between the obtained first and second luminance image signals becomes constant and to be saved in the memory 340.

The distance image generation unit 312 generates the first image signal and the second image signal subjected to application of light amount balance correction by multiplying at least one of the first luminance image signal and the second luminance image signal by the correction coefficient read from the memory.

In Step S613, the distance image generation unit 312 performs processing for reducing noise with respect to the first luminance image signal and the second luminance image signal subjected to application of the light amount balance correction. The distance image generation unit 312 executes the noise reduction processing by applying a low-pass filter for reducing a high spatial frequency band to each luminance image signal.

The distance image generation unit 312 may also use a band-pass filter allowing a predetermined spatial frequency band to be transmitted therethrough. In this case, it is possible to achieve an effect of reducing an influence of a correction error in the light amount balance correction performed in Step S612.

In Step S614, the distance image generation unit 312 calculates the parallax amount that is an amount of relative positional deviation between the first luminance image signal and the second luminance image signal. The distance image generation unit 312 sets a focal point within a first luminance image corresponding to the first luminance image signal and sets a collation region centered on the focal point. Next, the distance image generation unit 312 sets a reference point within a second luminance image corresponding to the second luminance image signal and sets the reference point centered on a reference region.

The distance image generation unit 312 calculates the degree of correlation between the first luminance image included within the collation region and the second luminance image included within the reference region while progressively moving the reference point and takes the reference point having the highest correlation as a corresponding point. The distance image generation unit 312 takes the amount of relative positional deviation between the focal point and the corresponding point as a parallax amount at the focal point.

The distance image generation unit 312 can calculate a parallax amount for a plurality of pixel positions by calculating a parallax amount while progressively moving the focal point. The distance image generation unit 312 identifies a value indicating a parallax value for each pixel as described above and generates parallax image data that is data indicating a parallax distribution.

A known technique can be used as a method for calculating the degree of correlation used for obtaining a parallax amount by the distance image generation unit 312. For example, the distance image generation unit 312 can use a so-called normalized cross-correlation (NCC) technique of evaluating a normalized cross-correlation between the luminance images.

In addition, the distance image generation unit 312 may also use a technique of evaluating a dissimilarity as a degree of correlation. For example, the distance image generation unit 312 can use a sum of absolute difference (SAD) for evaluating the sum of absolute values of the difference between the luminance images or a sum of squared difference (SSD) for evaluating the sum of squares of the difference.

In Step S615, the distance image generation unit 312 acquires the defocus amount of each pixel by converting the parallax amount of each pixel in the parallax image data into the defocus amount. The distance image generation unit 312 generates defocus image data indicating a defocus amount in each pixel on the basis of the parallax amount of each pixel in the parallax image data.

The distance image generation unit 312 calculates the defocus amount $\Delta L$ (x, y) of the pixel (x, y) from the following Expression 4 using the parallax amount d (x, y) of the pixel (x, y) and a conversion coefficient K in the parallax image data. In the imaging optical system 301, a part of the first luminous flux 511 and the second luminous flux 521 is cut in the surrounding field angle through vignetting. For this reason, the conversion coefficient K becomes a value depending on the field angle (position of the pixel).

$$\Delta L(x,y) = K(x,y) \times d(x,y) \quad \text{(Expression 4)}$$

If the imaging optical system 301 has characteristics having an image surface curvature in which a focal position varies between the central field angle and the surrounding field angle, when the amount of image surface curvature is Cf, the parallax amount d (x, y) can be converted into the defocus amount $\Delta L$ (x, y) using the following Expression 5. The conversion coefficient K and the amount of image surface curvature Cf can be acquired by acquiring a relationship between the parallax amount and the distance value with respect to an object through chart photographing after positional alignment of the imaging optical system 301 and the imaging element 302. At this time, the amount of image surface curvature Cf depends on the field angle and is given as a function of the pixel position.

$$\Delta L(x,y) = K(x,y) \times d(x,y) \times Cf(x,y) \quad \text{(Expression 5)}$$

In Step S616, the distance image generation unit 312 generates distance image data by converting the defocus amount $\Delta L$ (x, y) of the pixel (x, y) into the distance value D (x, y) with respect to an object in the pixel (x, y). The distance value D with respect to an object can be calculated by converting the defocus amount $\Delta L$ using an image formation relationship of the imaging optical system 301.

When a focal distance of the imaging optical system 301 is f and a distance from an image side main point to the imaging element 302 is Ipp, the defocus amount $\Delta L$ (x, y) can be converted into the distance value D (x, y) with respect to an object using the image formation formula of the following Expression 6.

$$D(x, y) = \frac{1}{\left\{\frac{1}{f} - \frac{1}{(Ipp + \Delta L(x, y))}\right\}} \quad \text{(Expression 6)}$$

The focal distance f and the distance Ipp from the image side main point to the imaging element 302 have constant values regardless of the field angle, but they are not limited thereto. If an image formation magnification of the imaging optical system 301 significantly varies for each field angle, at least one of the focal distance f and the distance Ipp from the image side main point to the imaging element 302 may have a value which significantly varies for each field angle.

In Step S617, the distance image generation unit 312 outputs distance image data generated as described above to the object information generation unit 320. With this, the distance image data generation processing executed by the distance image generation unit 312 ends.

However, the flow in FIG. 6B is regularly repeated until a user issues an instruction of ending (not illustrated). The parallax amount d for each pixel, the defocus amount $\Delta L$, and the distance value D of the imaging optical system 301 from the main point are values which can be converted using the coefficient and the conversion expression described above.

Therefore, information indicating the parallax amount d or the defocus amount ΔL by each pixel may be provided as distance image data generated by the distance image generation unit 312. In consideration of the object information generation unit 320 calculating a representative value of the distance value D included within an object region, it is desirable that distance image data be generated on the basis of the defocus amount with which a frequency distribution becomes symmetrical.

As described above, in the processing of calculating a parallax amount in Step S614, the corresponding point is searched for using the correlation between the first luminance image and the second luminance image. However, if the first image signal includes a lot of noise (for example, noise caused by optical shot noise), or if change in signal value of the luminance image signal included within the collation region is small, the degree of correlation may not be able to be correctly evaluated.

In such a case, a parallax amount having a large error with respect to a correct parallax amount may be calculated. If a parallax amount has a large error, an error in the distance value D generated in Step S616 also becomes large.

Therefore, the distance image data generation processing performed by the distance image generation unit 312 may include reliability calculation processing of calculating a reliability (parallax reliability) of a parallax amount. A parallax reliability is an index indicating how many errors are included in a calculated parallax amount. For example, a ratio of a standard deviation to an average value of signal values included in the collation region can be evaluated as a parallax reliability.

If change in signal value within the collation region (so-called contrast) is significant, the standard deviation becomes large. If a large amount of light is incident on pixels, the average value becomes large. If a large amount of light is incident on pixels, there is a lot of optical shot noise. That is, the average value has a positive correlation with respect to the amount of noise.

A ratio of the average value to the standard deviation (standard deviation/average value) corresponds to a ratio between an amount of the contrast and an amount of noise. If a contrast is sufficiently large with respect to an amount of noise, it is possible to estimate that an error in calculation of a parallax amount is small. That is, it is possible to mention that the larger the parallax reliability, the smaller the error in a calculated parallax amount and the more accurate the parallax amount.

Thereupon, in Step S614, reliability data indicating accuracy of a distance value for each pixel constituting distance image data can be generated by calculating a parallax reliability at each focal point. The distance image generation unit 312 can output reliability data to the object information generation unit 320.

Next, processing in which the object information generation unit 320 generates external information and object distance information on the basis of the image data and the distance image data will be described.

Figure 7A:
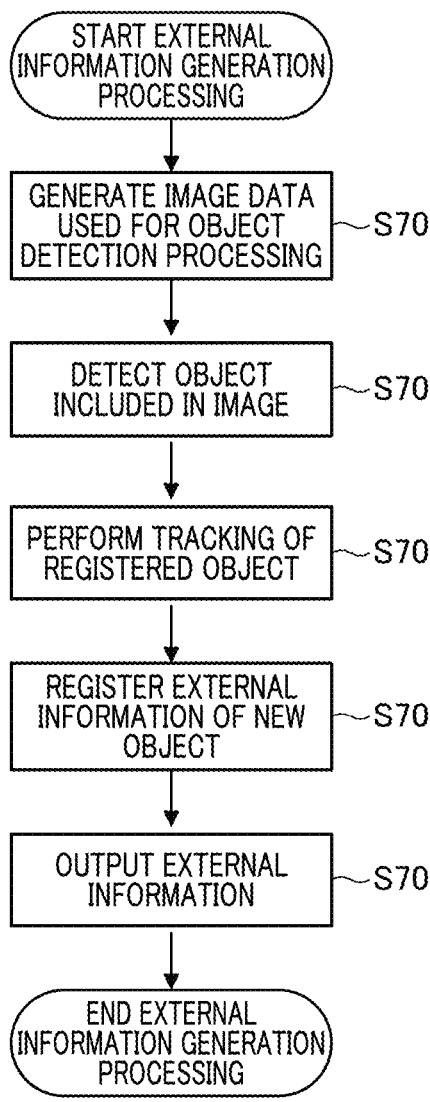
FIGS. 7A and 7B are flowcharts showing a processing example executed by a distance information generation unit according to First Embodiment.
Figure 7B:
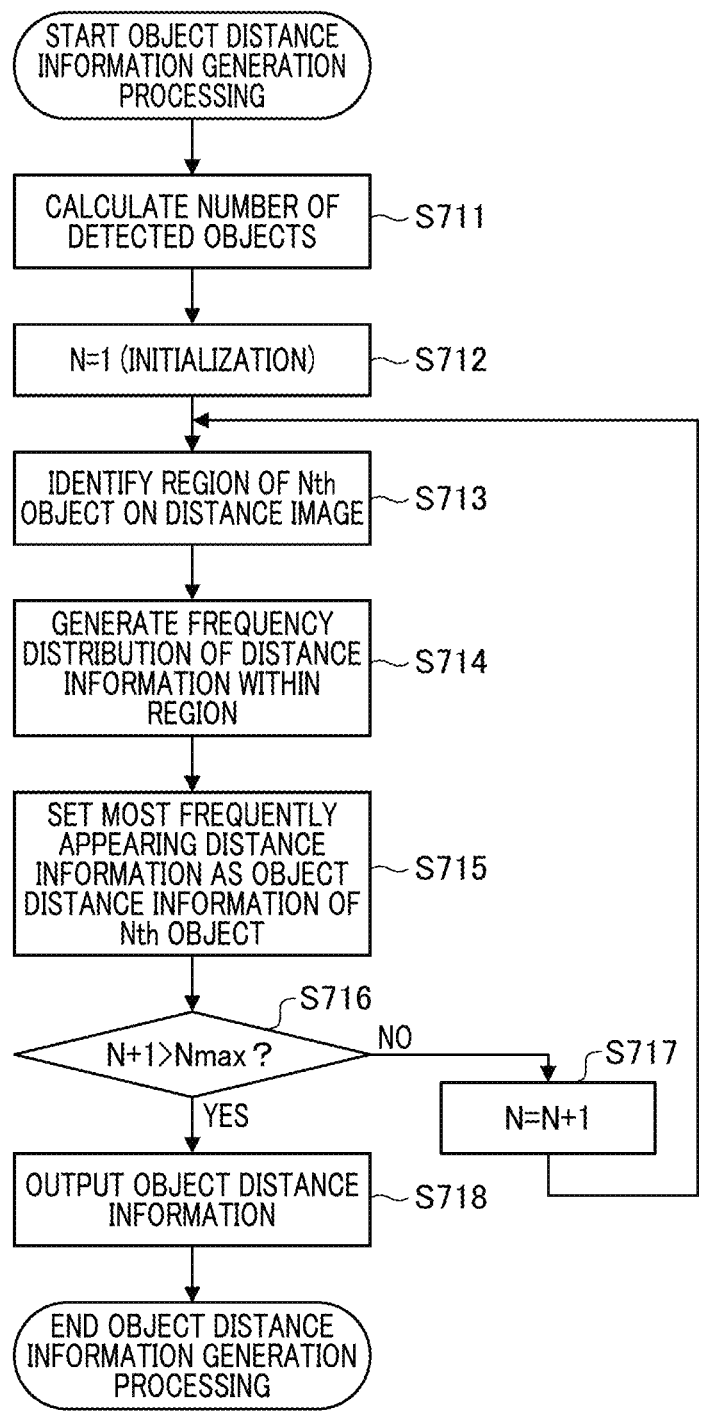

FIGS. 7A and 7B are flowcharts showing a processing example executed by the object information generation unit 320 according to First Embodiment, and FIGS. 8A to 8E are schematic views illustrating examples of an image and information in a processing example performed by the object information generation unit 320 according to First Embodiment.

Operation of each step of the flowcharts in FIGS. 7A and 7B is performed by causing the computer included in the path generation device 150 to execute the computer program stored in the memory.

The recognition processing unit 321 generates region information indicating a position, a size such as a width or a height, and a region in an image of an object included in an image based on the image data; and external information indicating a kind of object (attribution) and an identification number (ID number). An identification number is identification information for identifying a detected object and is not limited to a number.

The recognition processing unit 321 detects a kind of object present within a photographing field angle of the imaging device 110 and a position and a size of an object in an image, judges whether or not the object has already been registered, and assigns an identification number thereto.

Figure 8A:
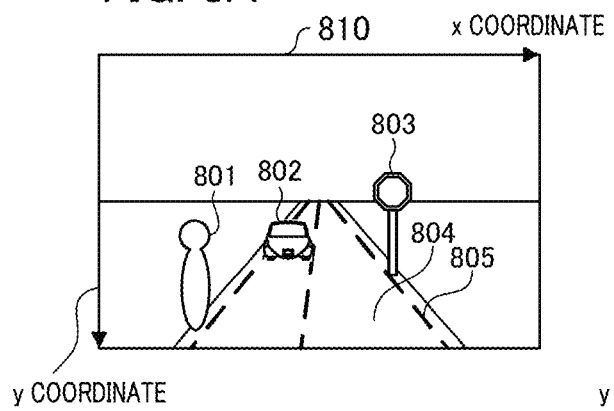
FIGS. 8A to 8E are schematic views illustrating examples of an image and information in a processing example performed by the distance information generation unit according to First Embodiment.

FIG. 8A illustrates an image 810 acquired by the imaging device 110 and is based on the image data input to the object information generation unit 320. The image 810 includes a person 801, a vehicle 802, a sign 803, a road 804, and a traffic lane 805.

Figure 8B:
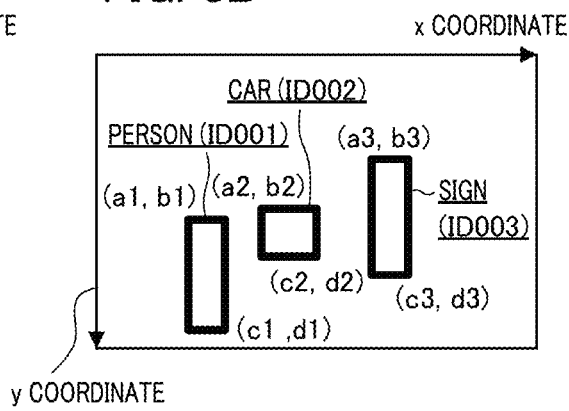

The recognition processing unit 321 detects objects from the image 810 and generates external information indicating a kind, an identification number, and region information of each object. FIG. 8B is a schematic view indicating the external information of each object detected from the image 810 at each position in the image 810 in an xy coordinate plane.

For example, external information is generated as a table shown in Table 1, for example. In external information, a region of an object is assumed to be defined as a rectangular frame (object frame) surrounding the object. In external information, region information of an object indicates a shape of a rectangular object frame as coordinates (x0, y0) on an upper left side and coordinates (x1, y1) on a lower right side.

TABLE 1

| Identification number | Kind | Upper left coordinates (x0, y0) | Lower right coordinates (x1, y1) |
|---|---|---|---|
| ID001 | Person | (a1, b1) | (c1, d1) |
| ID002 | Passenger car | (a2, b2) | (c2, d2) |
| ID003 | Sign | (a3, b3) | (c3, d3) |

FIG. 7A is a flowchart showing a processing example in which the recognition processing unit 321 generates external information. The recognition processing unit 321 starts processing of generating external information in accordance with acquisition of the image data, for example.

In Step S701, the recognition processing unit 321 generates image data used for object detection processing from the image data. That is, the recognition processing unit 321 performs processing of increasing and decreasing a size of image data input from the image processing unit 310 to a size determined from a detection performance and a processing time in the object detection processing.

In Step S702, the recognition processing unit 321 executes processing of detecting an object included in an image based on the image data and detects a region corresponding to the object in the image and a kind of object. The recognition processing unit 321 may detect a plurality of objects from one image. In this case, the recognition processing unit 321 identifies a kind and a region with respect to a plurality of detected objects.

The recognition processing unit 321 generates a position and a size (a horizontal width and a perpendicular height) of a region of an image in which an object has been detected and a kind of object as external information. For example, it is assumed that kinds of object which can be detected by the recognition processing unit 321 include a vehicle (a passenger car, a bus, or a truck), a person, an animal, a two-wheeled vehicle, a sign, and the like.

The recognition processing unit 321 detects an object and identifies a kind of the detected object by comparing a predetermined exterior shape pattern associated with the kind of object to the exterior shape of the object in an image in advance. The kind of object which can be detected by the recognition processing unit 321 is not limited to those above. However, from a viewpoint of a processing speed, it is desirable to narrow the number of kinds of object detected in accordance with a traveling environment of the vehicle 100.

In Step S703, the recognition processing unit 321 performs tracking of an object of which an identification number has already been registered. The recognition processing unit 321 identifies an object of which an identification number has already been registered in the objects detected in Step S702. For example, an object of which an identification number has been registered is an object which has been detected in previous object detection processing and to which an identification number is allocated.

If an object of which an identification number has been registered is detected, the recognition processing unit 321 maps the kind of object and information relating to a region acquired in Step S702 to the external information corresponding to the identification number (updates the external information).

If it is judged that an object of which an identification number has been registered is not present in image information, it is judged that the object associated with the identification number has moved out of the photographing field angle of the imaging device 110 (is lost), and tracking is suspended.

In Step S704, the recognition processing unit 321 judges whether each object detected in Step S702 is a new object of which an identification number has not been registered. Further, a new identification number is allocated to the external information indicating a kind of object and a region judged to be a new object and is registered in the external information.

In Step S705, the recognition processing unit 321 outputs the generated external information to the path generation device 150 together with information indicating a time.

With this, external information generation processing executed by the recognition processing unit 321 ends. However, the flow in FIG. 7A is regularly repeated until a user issues an instruction of ending (not illustrated).

FIG. 7B is a flowchart showing an example of processing of generating distance information for each object performed by the distance information generation unit 322. The distance information generation unit 322 generates object distance information indicating a distance value for each detected object on the basis of the external information and the distance image data.

Figure 8C:
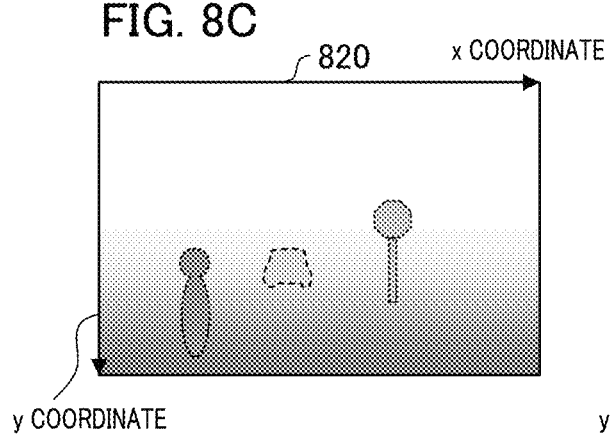

FIG. 8C is a view illustrating an example of a distance image 820 generated by mapping the distance image data to the image 810 on the basis of the image data in FIG. 8A. In the distance image 820 of FIG. 8C, the distance information is indicated by color gradation with darker color indicating a closer distance and lighter color indicating father distance.

In Step S711, the distance information generation unit 322 counts the number N of objects detected by the recognition processing unit 321 and calculates the number Nmax of detected objects that is a total number of detected objects.

In Step S712, the distance information generation unit 322 sets N to 1 (initialization processing). The processing of Step S713 and succeeding processing are sequentially executed with respect to each object indicated in the external information. It is assumed that the processing from Step S713 to Step S716 is executed sequentially from that having a smaller identification number in the external information.

In Step S713, the distance information generation unit 322 identifies a rectangular region of an Nth object included in the external information in the distance image 820 corresponding to the region (object frame) in the image 810. The distance information generation unit 322 sets a frame (object frame) indicating an exterior shape of the corresponding region in the distance image 820.

Figure 8D:
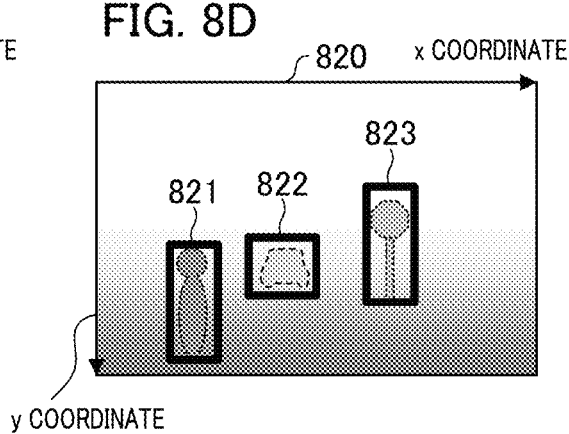

FIG. 8D is a schematic view in which the frames indicating the exterior shapes of the regions set in the distance image 820 are superimposed with respect to each object detected from the image 810. As illustrated in FIG. 8D, the distance information generation unit 322 sets each of an object frame 821 corresponding to the person 801, an object frame 822 corresponding to the vehicle 802, and an object frame 823 corresponding to the sign 803 in the distance image 820.

In Step S714, the distance information generation unit 322 generates a frequency distribution of the distance information of the pixel included in the rectangular region of the distance image 820 corresponding to the Nth object. If the information mapped to each pixel of the distance image data is the distance value D, regarding a section of a frequency distribution, a section is set such that reciprocal numbers of the distance are at equal intervals.

If the defocus amount or the parallax amount is mapped to each pixel of the distance image data, it is desirable that the section of the frequency distribution b e divided at equal intervals. In Step S715, the distance information generation unit 322 takes the distance information which appears most frequently in the frequency distribution as object distance information indicating the distance of the Nth object.

The average value of the distance values included within the region may be calculated as object distance information. A weighted average using the reliability data can be used when an average value is calculated. A distance value of an object can be more accurately calculated by setting a larger weight for each pixel as the distance value has a higher reliability.

It is desirable that the object distance information be information indicating a distance from a predetermined position in the vehicle 100 to an object in order to facilitate generation of a path in path generation processing which will be described below. If the distance value D is used as distance information, since the distance value D indicates a distance from the imaging element 302 to an object, a most frequently appearing value can be offset by a predetermined amount and can be set as information indicating a distance from a predetermined position in the vehicle 100 (for example, a front end portion) to an object.

If the defocus amount ΔL is used as distance information, after conversion to a distance from the imaging element 302 is performed using Mathematical Expression 6, it is offset by a predetermined amount and is set as information indicating a distance from a predetermined position in the vehicle 100 to an object.

In Step S716, the distance information generation unit 322 judges whether N+1 is larger than the number Nmax of detected objects. If N+1 is smaller than the number Nmax of detected objects (in the case of No in Step S716), the distance information generation unit 322 sets N to N+1 in Step S717, and the processing returns to Step S713.

That is, extraction of object distance information is performed for a next object (N+1th object). In Step S716, if N+1 is larger than the number Nmax of detected objects (in the case of Yes in Step S716), the processing proceeds to Step S718.

In Step S718, the distance information generation unit 322 outputs object distance information with respect to each of the Nmax objects to the path generation unit 330 together with information relating to time, and the processing ends. The information is stored in the memory 180. In addition, information of distances from the radar devices 120 is also stored in the memory 180 together with the time information. The flow in FIG. 7B is regularly repeated until a user issues an instruction of ending (not illustrated).

Through the object distance information generation processing, object distance information is generated for each object included in the external information. Particularly, unevenness in distance information for each pixel caused by noise, accuracy of computation, or the like can be curbed by statistically determining the distance information of an object from the distance information included in the region of the distance image 820 corresponding to the object detected within the image 810.

Therefore, information indicating a distance of an object can be acquired with higher accuracy. As described above, a method for statistically determining the distance information is a method for obtaining most frequently appearing distance information, an average value, a median value, or the like in a distribution of the distance information, and various methods can be employed.

Next, processing of generating path information (path generation processing) executed by the path generation unit 330 of the path generation ECU 130 will be described. Path information is information including a travel direction and a speed of the vehicle. Path information can also be referred to as operation plan information. The path generation unit 330 outputs the path information to the vehicle control ECU 140. The vehicle control ECU 140 controls the travel direction or the speed of the vehicle by controlling the driving unit 170 on the basis of the path information.

In Present Embodiment, if there is a different vehicle (preceding vehicle) in the travel direction of the vehicle 100, the path generation unit 330 generates path information for follow-up traveling of a preceding vehicle. In addition, it is assumed that the path generation unit 330 generates path information to take an escape behavior such that the vehicle 100 does not collide with an object.

FIG. 9 is a flowchart showing an example of path generation processing executed by the path generation unit 330 according to First Embodiment. Operation of each step of the flowchart in FIG. 9 is performed by causing the computer included in the path generation device 150 to execute the computer program stored in the memory.

For example, if an instruction of starting the path generation processing is issued by an instruction of a user, the path generation unit 330 starts the flow in FIG. 9 and generates path information of the vehicle 100 on the basis of the external information, the object distance information, and the distance information generated by the radar devices 120. The path generation ECU 130 performs processing by reading the external information, the object distance information, and the distance information generated by the radar devices 120 at each time, for example, from the memory 180 included in the path generation device 150.

In Step S901, the path generation unit 330 detects an object on a scheduled traveling path of the vehicle 100 from the external information and the object distance information. The path generation unit 330 judges the object on the traveling path by comparing a scheduled azimuth of the vehicle 100 in the travel direction and a position and a kind of object included in the external information.

It is assumed that a scheduled travel direction of the vehicle 100 is identified on the basis of information relating to control of the vehicle 100 (a steering angle of steering, a speed, and the like) acquired from the vehicle control ECU 140. If no object is detected on the traveling path, the path generation unit 330 judges that there is "no object".

For example, it is assumed that the imaging device 110 has acquired the image 810 illustrated in FIG. 8A. If the path generation unit 330 judges that the vehicle 100 travels forward in a direction along the traffic lane 805 from the information relating to control of the vehicle 100 acquired from the vehicle control ECU 140, the path generation unit 330 detects the vehicle 802 as an object on the traveling path.

In Steps S902 and S903, the path generation unit 330 judges whether to generate path information for follow-up traveling or generate path information for an escape behavior on the basis of the distance between the vehicle 100 and an object on the traveling path and a speed Vc of the vehicle 100.

In Step S902, the path generation unit 330 judges whether the distance between the vehicle 100 and an object on the traveling path is shorter than a threshold Dth. The threshold Dth is expressed by a function of the traveling speed Vc of the vehicle 100. The higher the traveling speed, the larger the threshold Dth.

If the path generation unit 330 judges that the distance between the vehicle 100 and an object on the traveling path is shorter than the threshold Dth (Yes in Step S902), the processing proceeds to Step S903. If the path generation unit 330 judges that the distance between the vehicle 100 and an object on the traveling path is equal to or longer than the threshold Dth (No in Step S902), the processing proceeds to Step S908.

In Step S903, the path generation unit 330 judges whether the relative speed between the vehicle 100 and an object on the traveling path has a positive value. The path generation unit 330 acquires the identification number of the object on the traveling path from the external information and acquires the object distance information of the object on the traveling path at each time from the external information acquired during a period up to a predetermined time from a current time.

The path generation unit 330 calculates the relative speed between the vehicle 100 and an object on the traveling path from the acquired object distance information of the object on the traveling path during a period up to a predetermined time. If the relative speed (speed of vehicle 100—speed of object on traveling path) has a positive value, it indicates that the vehicle 100 and the object on the traveling path approach each other.

If the path generation unit 330 judges that the relative speed between the vehicle 100 and an object on the traveling path has a positive value (in the case of Yes in Step S903), the processing proceeds to Step S904. If the path generation unit 330 judges that the relative speed between the vehicle 100 and an object on the traveling path does not have a positive value (No in Step S903), the processing proceeds to Step S908.

Here, if the processing proceeds to Step S904, path information for executing an escape behavior is generated. In addition, if the processing proceeds to Step S908, path information for executing follow-up traveling maintaining an interval with respect to a preceding vehicle is generated.

That is, if the distance between the vehicle 100 and an object on the traveling path is shorter than the threshold Dth and the relative speed between the vehicle 100 and an object on the traveling path has a positive value, the path generation unit 330 executes an escape behavior. Meanwhile, if the distance between the vehicle 100 and an object on the traveling path is equal to or longer than the threshold Dth, the path generation unit 330 judges to perform follow-up traveling.

Alternatively, if the distance between the vehicle 100 and an object on the traveling path is shorter than the threshold Dth and the relative speed between the vehicle 100 and an object on the traveling path is zero or has a negative value (if they are being away from each other), the path generation unit 330 judges to perform follow-up traveling.

If the distance between the vehicle 100 and an object on the traveling path is shorter than the threshold Dth obtained from the speed of the vehicle 100 and the relative speed between the vehicle 100 and an object on the traveling path has a positive value, it is conceivable that the vehicle 100 have a high likelihood of collision with the object on the traveling path.

Therefore, the path generation unit 330 generates path information so as to take an escape behavior. If not, the path generation unit 330 takes follow-up traveling. The judgment described above may include judgment whether the kind of detected object on the traveling path is a movable apparatus (an automobile, a motorcycle, or the like).

In Step S904, the path generation unit 330 starts the processing of generating path information for executing an escape behavior.

In Step S905, the path generation unit 330 acquires information relating to an escape space. The path generation unit 330 acquires distance information including prediction information including distances from the radar devices 120 to an object on a side next to or behind the vehicle 100 or a distance to an object.

The path generation unit 330 acquires information indicating a direction and an extent of a space to which the vehicle 100 can move around the vehicle 100 on the basis of the distance information acquired from the radar devices 120 (fourth distance information) and information indicating the speed of the vehicle 100 and the size of the vehicle 100.

In Present Embodiment, distance information acquired from the radar devices 120 (fourth distance information) is utilized for an escape space, but it may be used for generating integrated distance information with respect to an object.

In Step S906, the path generation unit 330 sets path information for an escape behavior on the basis of the information indicating a direction and an extent of a space to which the vehicle 100 can move, the external information, and the object distance information. For example, path information for an escape behavior is information for a course change of the vehicle 100 to the right side while reducing the speed, for example, if there is a space on the right side to which the vehicle 100 can escape.

In Step S907, the path generation unit 330 outputs path information to the vehicle control ECU 140. The vehicle control ECU 140 determines parameters for controlling the driving unit 170 and controls the driving unit 170 on the basis of the path information such that the vehicle 100 passes through a path indicated by the acquired path information.

Specifically, the vehicle control ECU 140 determines a steering angle of steering, a control value of an accelerator, a control value of a brake, a control signal for connecting a gear, a lighting control signal of a lamp, and the like on the basis of the path information.

Here, Step S907 functions as a path generation step of generating path information (path generation unit) on the basis of the distance information.

Meanwhile, in Step S908, the path generation unit 330 starts the processing of generating path information for executing follow-up operation.

In Step S909, the path generation unit 330 generates path information for the vehicle 100 following an object on the traveling path (preceding vehicle). Specifically, the path generation unit 330 generates path information such that a distance between the vehicle 100 and a preceding vehicle (vehicle-to-vehicle distance) is maintained within a predetermined range.

For example, if the relative speed between the vehicle 100 and a preceding vehicle is zero or has a negative value, or if the vehicle-to-vehicle distance is equal to or longer than a predetermined distance, the path generation unit 330 generates path information such that a predetermined vehicle-to-vehicle distance is maintained through acceleration and deceleration while the travel direction of the vehicle 100 is maintained straight forward.

The path generation unit 330 generates path information such that the traveling speed of the vehicle 100 does not exceed a predetermined value (for example, a legal speed of a road where the vehicle 100 is traveling or a set traveling speed based on an instruction from the driver 101). After Step S909, the processing proceeds to Step S907, and the vehicle control ECU 140 controls the driving unit 170 on the basis of the generated path information.

Next, in Step S910, it is distinguished whether an instruction of ending the path generation processing has been issued from a user. In the case of Yes, the processing of generating path information by the path generation unit 330 ends. In the case of No, the processing returns to Step S901, and the processing of generating path information is repeatedly executed.

According to the control described above, through statistical processing of distance information performed within a frame based on the position and the size of an object in an image, an influence of sensor noise or an influence of a local distance error caused by highly luminant reflection from a subject can be reduced, and a distance value with respect to each object can be calculated with high accuracy.

In addition, since the distance value with respect to each object can be made highly accurate and the path of the vehicle 100 calculated by the path generation ECU 130 can be accurately calculated, the vehicle 100 can travel more stably.

Modification Example 1

In the processing described above, a region of an object is indicated as a rectangular region (object frame) including an object, but a region of an object may be a region having a shape of an object having an outer circumference of the object within an image as a boundary. In that case, in Step S702, the recognition processing unit 321 stores the region in which the object is present in the image 810 in the external information as a region of the object. For example, the recognition processing unit 321 can divide the region for each object by identifying the attribution for each pixel of the image data.

Figure 8E:
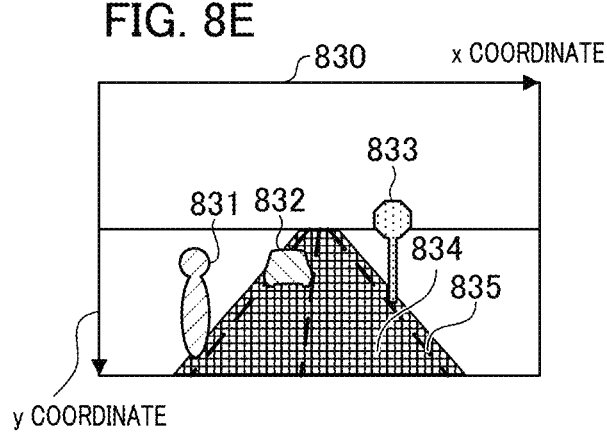

FIG. 8E is a schematic view illustrating an example in which the recognition processing unit 321 divides the region for each object and a result thereof is superimposed on the image 810. A region 831 indicates the region of the person 801, a region 832 indicates the region of the vehicle 802, and a region 833 indicates the region of the sign 803. Moreover, a region 834 indicates the region of the road 804, and a region 835 indicates the region of the traffic lane 805.

In this case, in Steps S713 and S714, the distance information generation unit 322 need only calculate a frequency distribution, for example, of the distance values included within the region for each region illustrated in FIG. 8E with respect to each object.

By defining the region of an object in this manner, distance information of a background and the like other than an object is unlikely to be included within the region. That is, in a distribution of distance information within the region, the distance information of an object can be further reflected. Therefore, since an influence of a region other than an object such as a background or a foreground of the object can be reduced, a distance value of an object can be more accurately calculated.

Modification Example 2

Image information and distance image information are sequentially output from the imaging device 110 of Present Embodiment. Moreover, the recognition processing unit 321 sequentially generates external information using image information which has been sequentially received. The external information includes an identification number of an object, and if objects having the same identification number are detected at each of certain times T0 and T1, it is possible to judge change over time in distance information of the object, detected size, or the like.

Therefore, in Modification Example 2, the distance information generation unit 322 calculates the average of the distance values D of objects having the same identification number within a predetermined time range. Accordingly, unevenness in distance in a time direction is reduced.

Figure 10:
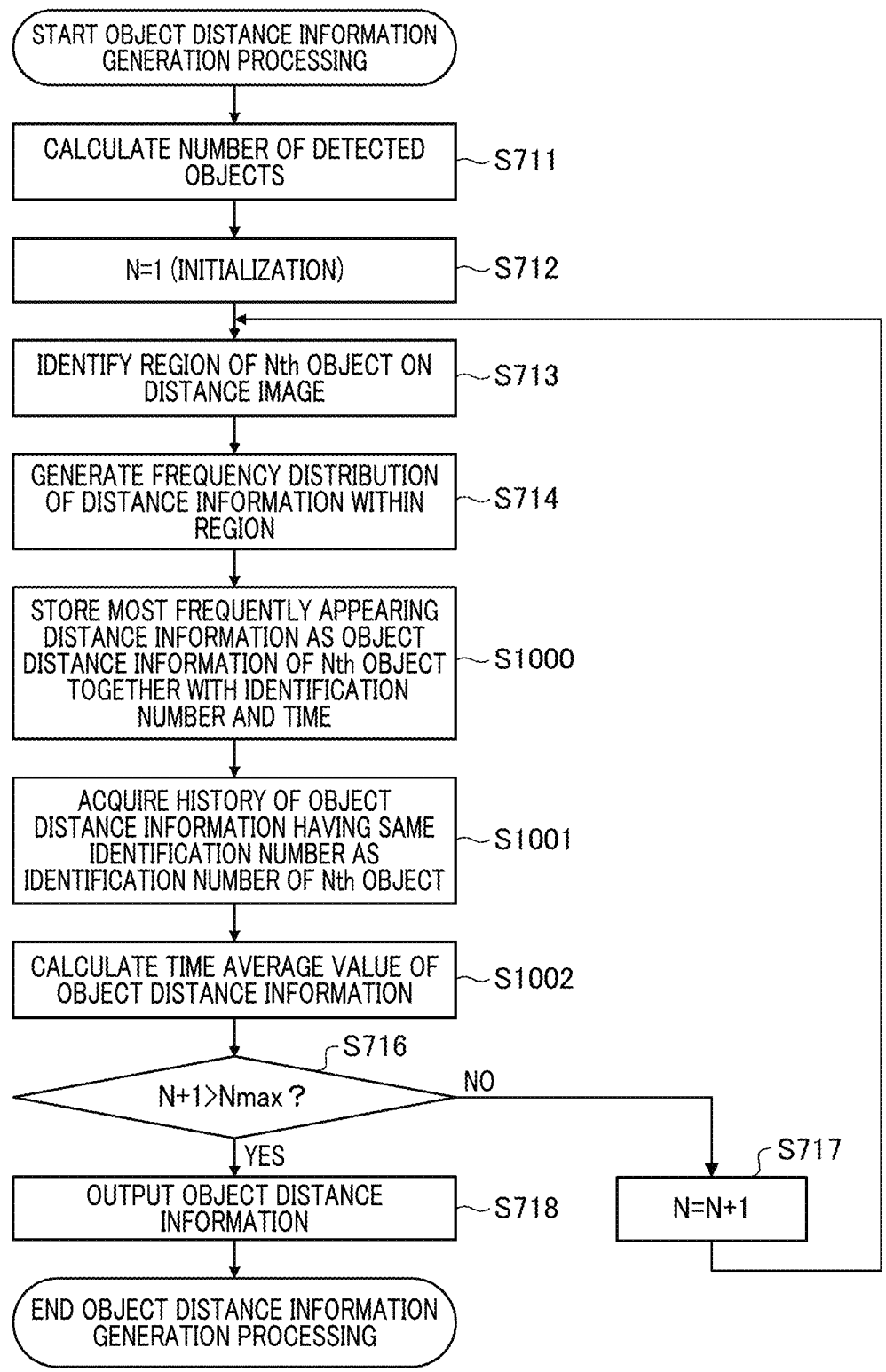
FIG. 10 is a flowchart showing an example of object distance information generation processing performed by the distance information generation unit according to Modification Example 2.

FIG. 10 is a flowchart showing an example of object distance information generation processing performed by the distance information generation unit 322 according to Modification Example 2. Operation of each step of the flowchart in FIG. 10 is performed by causing the computer included in the path generation device 150 to execute the computer program stored in the memory. Regarding each process of the processing in this flowchart, since the processing indicated by the same number as the processing shown in FIG. 7B is the same as the processing described regarding FIG. 7B, and description thereof will be omitted.

In Step S1000, the distance information generation unit 322 takes the distance information which appears most frequently in the frequency distribution generated in Step S714 as the object distance information indicating the distance of the Nth object. Further, the distance information generation unit 322 saves (stores) the object distance information in the memory 340 together with the identification number and the time.

In Step S1001, the distance information generation unit 322 acquires a history of the object distance information having the same identification number as the identification number of the Nth object in the object distance information saved in the memory 340. The distance information generation unit 322 acquires the object distance information having the same identification number corresponding to a period up to a time by a predetermined time from a time corresponding to the latest object distance information.

Figure 11:
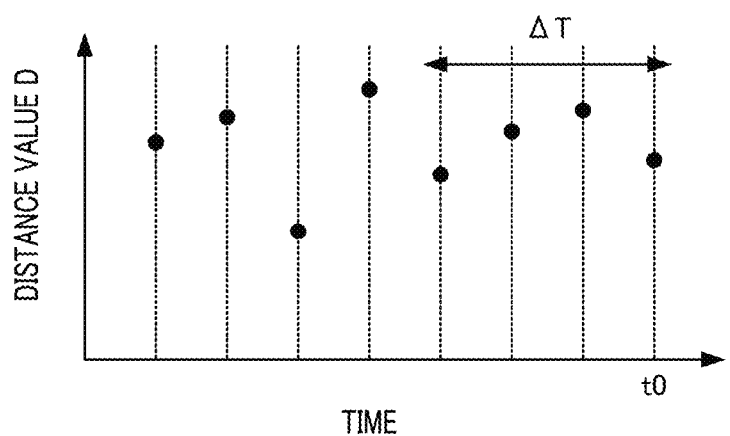
FIG. 11 is an explanatory schematic view of an example of change over time in object distance information of an object having the same identification number as an Nth object.

FIG. 11 is an explanatory schematic view of an example of change over time in object distance information of an object having the same identification number as the Nth object. The horizontal axis indicates time, and the vertical axis indicates object distance information (distance value D). A time t0 indicates a time when the latest distance value D is acquired.

In Step S1002, the distance information generation unit 322 calculates the average value of the object distance information included in a time range up to a predetermined time from the time when the latest object distance information is acquired from the acquired history of the object distance information of an object having the same identification number as the Nth object. For example, in FIG. 11, the distance information generation unit 322 calculates the average value of distance values at four points included in a predetermined time range ΔT.

As described above, unevenness can be curbed by acquiring a history of the object distance information (distance value) of the same objects using the identification number included in the external information and taking a time average. Even if the road where the vehicle 100 travels changes (for example, a curve, a slope, a rugged steep path, or the like), the average value in the time direction can be calculated while tracking the same object.

Therefore, while an influence of change in traveling environment is reduced, unevenness in distance value due to noise such as optical shot noise included in an image signal can be reduced, and the distance value of an object can be more accurately calculated. In Modification Example 2, in order to obtain a similar effect, object distance information in which time average has been performed to a certain degree may be acquired via a low-pass filter when object distance information is acquired.

Modification Example 3

In Modification Example 2 described above, unevenness is curbed by performing time average of the object distance information having the same identification number. When the history of the object distance information is averaged within a predetermined time range, the number of samples used for averaging can be increased by taking a long time range. For this reason, unevenness in distance value with respect to an object from the vehicle 100 can be further reduced.

However, if the distance from the vehicle 100 to an object within a predetermined time range has changed, since averaging is performed while including change in distance, there is a likelihood that the distance value with respect to an object from the vehicle 100 will not be able to be correctly estimated. In Modification Example 3, the distance between the vehicle 100 and an object can be acquired with higher accuracy by performing a weighted average of the object distance information using the size of the object having the same identification number.

Figure 12:
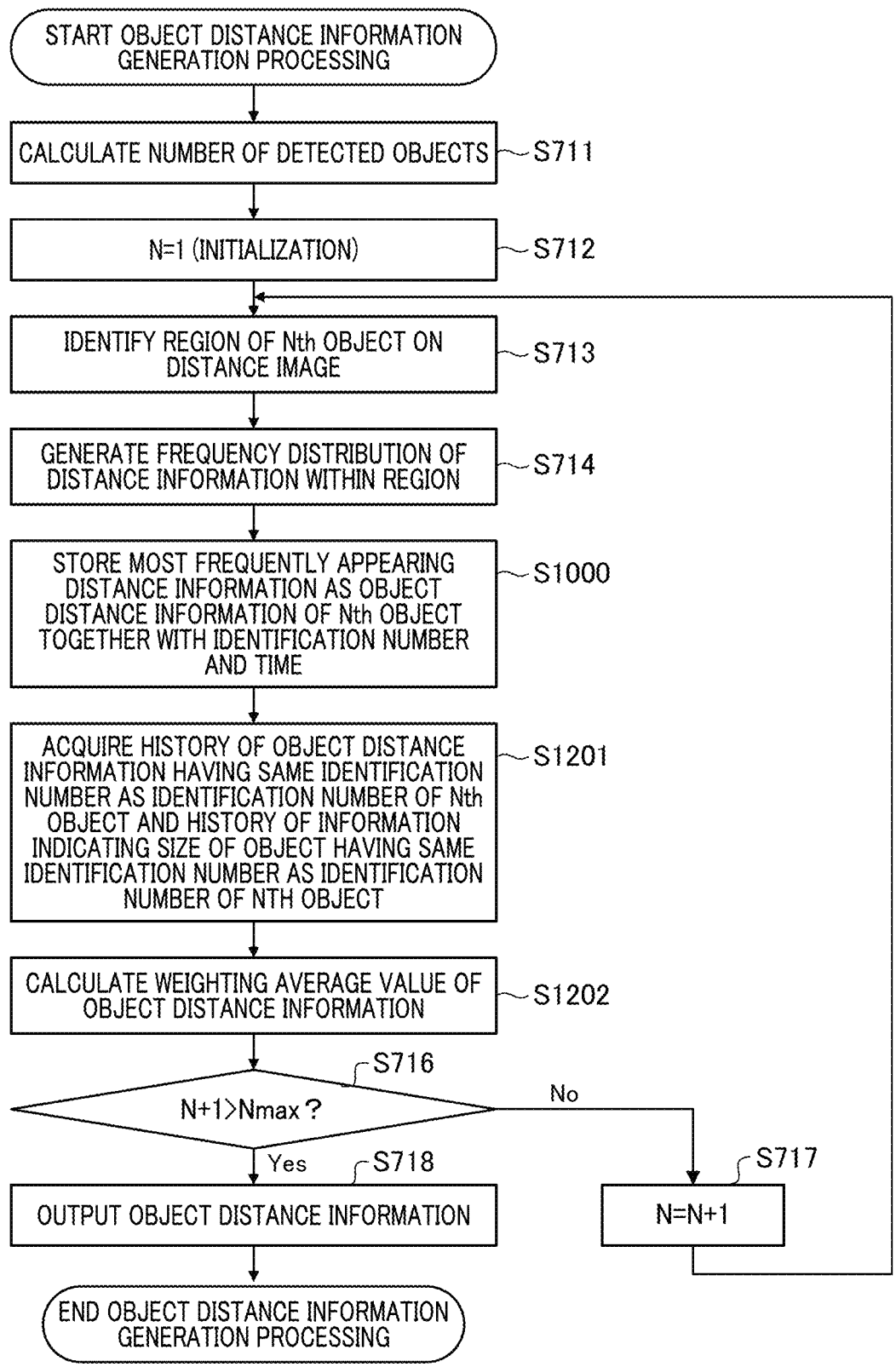
FIG. 12 is a flowchart showing an example of the object distance information generation processing performed by the distance information generation unit according to Modification Example 3.

FIG. 12 is a flowchart showing an example of the object distance information generation processing performed by the distance information generation unit 322 according to Modification Example 3. Operation of each step of the flowchart in FIG. 12 is performed by causing the computer included in the path generation device 150 to execute the computer program stored in the memory. Regarding each process of the processing in this flowchart, since the processing having the same number as the processing shown in FIGS. 7B and 10 is the same as the processing described above, description thereof will be omitted.

In Step S1000, the distance information generation unit 322 takes the distance information which appears most frequently in the frequency distribution as the object distance information indicating the distance of the Nth object. Further, the distance information generation unit 322 saves the object distance information in the memory 340 together with the identification number and the time.

In Step S1201, the distance information generation unit 322 acquires the history of the object distance information of an object having the same identification number as the Nth object and the history of information indicating the size of the object from the memory 340. Information indicating the size of an object is acquired from information indicating the object frame saved in the external information. For example, a width (x1-x0) from the coordinates (x0, y0) on the upper left side and the coordinates (x1, y1) on the lower right side is taken as information indicating the size of an object.

In Step S1202, the distance information generation unit 322 performs weighting average processing of the object distance information having the same identification number corresponding to a period up to a time by a predetermined time from a time corresponding to the latest object distance information using information indicating the size of an object having the same identification number as the Nth object. A weight coefficient of each time is determined using the object size at the corresponding time.

Figure 13B:
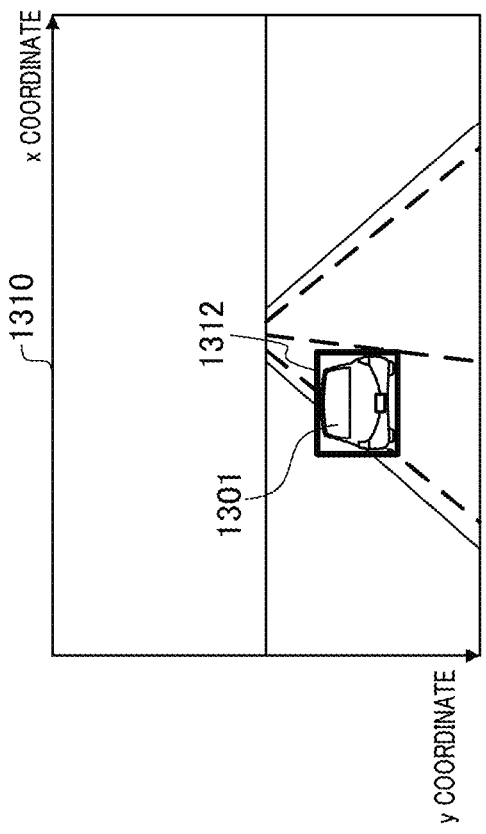
FIGS. 13A to 13D are explanatory schematic views of a weighted average.
Figure 13A:
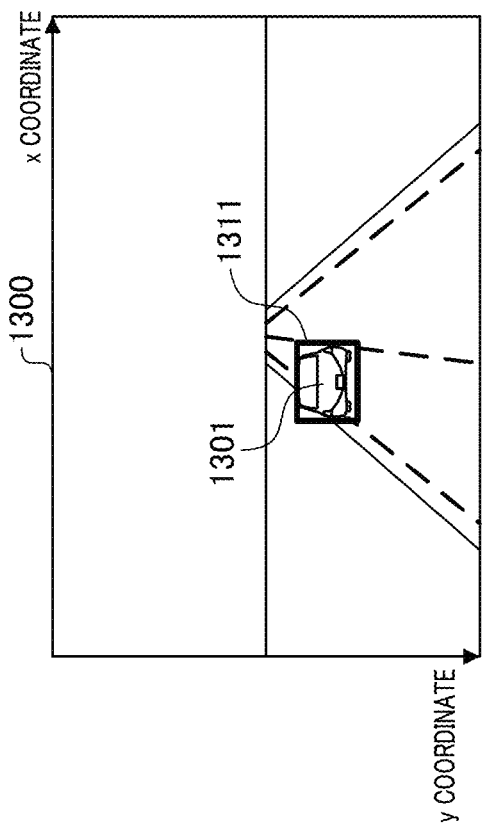

FIGS. 13A to 13D are explanatory schematic views of a weighted average. FIG. 13A is a schematic view illustrating an image 1300 based on the image data acquired by the imaging device 110 at a time t1 before the time t0 corresponding to the latest object distance information. The image 1300 includes a vehicle 1301. A frame 1311 indicates an object frame of the vehicle 1301 determined from the image 1300.

FIG. 13B is a schematic view illustrating an image 1310 based on the image data acquired by the imaging device 110 at the time to. The image 1310 includes the vehicle 1301 similarly to the image 1300. In addition, a frame 1312 indicates an object frame corresponding to the vehicle 1301 in the image 1310. At the time t0, the size of the vehicle 1301 within the image 1300 is larger than the size of the image 1310 acquired at the time t1. The object frame 1312 is larger than the object frame 1311.

Since the size of an object within the image is proportional to a lateral magnification of the imaging optical system 301, the distance between an object and the vehicle 100 and a reciprocal number of the object size on the image information have a proportional relationship. Through comparison between object sizes on the image information at different times, for example, if the size increases, it is possible to judge that the distance between an object and the vehicle 100 is shortened, and on the contrary, if it decreases, it is possible to judge that the distance between an object and the vehicle 100 has increased. In addition, if change in size is small, it is possible to judge that change in distance between an object and the vehicle 100 is short.

Figure 13D:
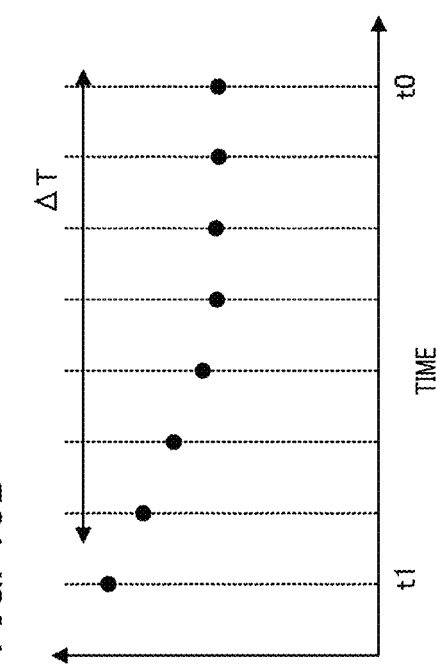
Figure 13C:
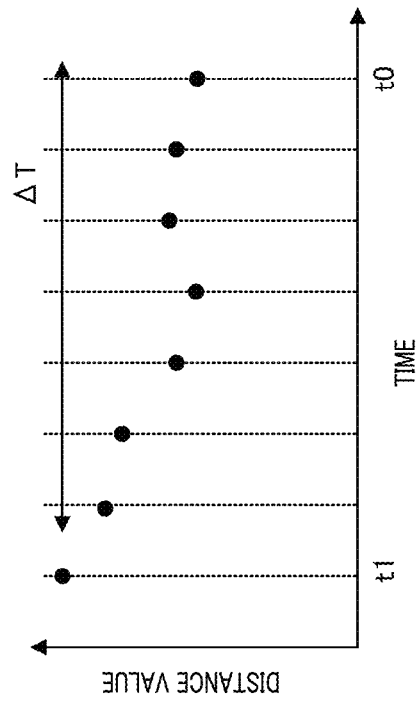

Hereinafter, as an example, it is assumed that the distance information is acquired while having the vehicle 1301 as the Nth object. FIG. 13C is a schematic view illustrating change over time in object distance information of an object having the same identification number as the vehicle 1301 (Nth object). FIG. 13D is a schematic view illustrating change over time in reciprocal number of information indicating the size of an object (width) having the same identification number as the vehicle 1301 (Nth object).

In Step S1202, the distance information generation unit 322 compares the reciprocal number of the size (width) of an object at each time during a period up to a predetermined time from the time t0 to the reciprocal number of the size (width) of an object at the time to. The distance information generation unit 322 determines a weight coefficient such that the weight coefficient decreases as the absolute value of the difference between the reciprocal numbers of the size (width) of an object increases.

A relationship between the reciprocal number of the size (width) of an object and the weighting coefficient is not limited to the example described above. For example, the weighting coefficient may be determined in accordance with a ratio of the reciprocal number of the size (width) of an object at each time to the reciprocal number of the size (width) of an object at the time t0.

In Step S1202, the distance information generation unit 322 performs a weighting average of the object distance information using the weighting coefficient to obtain the object distance information of the vehicle 1301 at the time t0. According to the processing in Modification Example 3, it is possible to reduce an estimation error of the distance value caused by change in relative distance from the vehicle 100 to an object by performing a weighted average of the object distance information using the weight coefficient which has been determined using the size of the object in the image.

Second Embodiment

In First Embodiment, a distance to an object included in an image (object distance information) is acquired with higher accuracy by statistically processing distance data acquired by the imaging surface phase difference system with respect to the object.

In Second Embodiment, the distance to an object can be acquired with higher accuracy by combining a method for calculating a distance by the imaging surface phase difference system and a method for calculating a distance utilizing image recognition. Hereinafter, a method for calculating a distance and processing of calculating a distance based on the method will be referred to as "ranging".

Hereinafter, Second Embodiment of the present invention will be described in detail with reference to the drawings. The following processing can be executed by any of processors constituting the image processing unit 310 and the object information generation unit 320 of the imaging device 110 and the path generation ECU 130 or by combination thereof.

In Second Embodiment, the path generation device 150 corrects a ranging value by combining imaging surface phase difference ranging and ranging utilizing image recognition.

Imaging surface phase difference ranging is ranging using the imaging surface phase difference system described in First Embodiment. Ranging utilizing image recognition is ranging of calculating a distance from the width of an object detected on the basis of object recognition (object width ranging) or ranging of calculating a distance on the basis of information of a ground contact position of an object (ground contact position ranging).

In the object width ranging, the distance to an object is calculated utilizing that an object is at a long distance as the number of pixels for the width of the object in an image decreases and an object is at a short distance as the number of pixels for the width of the object in an image increases. In calculation of a distance, other parameters indicating the size of an object in an image, such as a height or an oblique direction (for example, the size of the object frame) can be used in a similar manner.

In the ground contact position ranging, it is assumed that an object is in ground contact with the road surface, for example, and the distance from the vehicle 100 to an object is calculated on the basis of a ground contact line of the object in the image (which will become a lower end in a case of an image in which the road surface is on a lower side) and the distance to a vanishing point in the image. The closer the ground contact line to the vanishing point, the longer the distance of an object to the vehicle 100, and the farther the ground contact line from the vanishing point, the shorter the distance of an object to the vehicle 100.

Features of errors in the imaging surface phase difference ranging, the object width ranging, and the ground contact position ranging will be described. Regarding a way of considering common errors, a relative error and an absolute error are defined as follows. A relative error is defined as an amount corresponding to a standard deviation with respect to sufficient samples if there is no change in relative distance. An absolute error is defined as an amount corresponding to a difference between an average value and a true value with respect to sufficient samples if there is no change in relative distance.

A main cause of a relative error in the imaging surface phase difference ranging is a parallax error in block matching caused by unevenness in pixel value due to sensor noise. Since it does not change depending on the parallax value, in the case of conversion into a distance, a relative error deteriorates basically in proportion to the square of the distance.

Regarding an absolute error, an error occurs due to an aberration in an optical system, an assembling error, a variation component due to heat or vibration, and the like. Correction can also be made with respect to each cause, if no correction is made in consideration of a calculation amount or the like, a large absolute error may remain.

A relative error in the object width ranging depends on a resolution and recognition accuracy in an image of an object. In the object width ranging, the width of a detected object in an image cannot be converted into a distance unless an actual object width (an actual width of an object on the object side, namely, a physical amount indicated in units of meter or the like) is known.

For this reason, there is a need to determine the actual object width in any form so that both an absolute error and a relative error depend on the actual object width. Since a relative error is proportional to a distance, in the case of a long distance, there is a likelihood that a relative error will become smaller than the imaging surface phase difference ranging.

A relative error in the ground contact position ranging depends on the recognition accuracy of the ground contact line of an object in an image and the resolution of the image. Since the resolution of an image becomes a resolving power for measuring the distance between the vanishing point and the ground contact line, an image having a higher resolution can be measured with high accuracy even at a long distance. In addition, if the road surface extends downward a lower portion, an estimation error in a pitch angle in an optical axis direction becomes a ranging error.

If an imaging device for acquiring an image is mounted in a movable apparatus, the pitch angle varies for each imaging frame due to a movement acceleration or a road surface condition. In such a case, an error in the pitch angle becomes a relative error. Due to an installation state or an inclination of the movable apparatus itself, an error in the pitch angle generated with a constant value at all times becomes an absolute error. Although it will be described below, a pitch angle is estimated using information of the vanishing point, movement information, and the like so that an error can be reduced.

Although a relative error is proportional to a distance and is equivalent to the width of an object, since an influence of estimation of a pitch angle is added thereto, an error amount is larger than the width of the object. Since it is necessary that ranging according to the ground contact position of an object be in contact with the ground, there is a problem that ranging cannot be performed if the lower end is not in contact with the ground, such as a signal or a sign.

Figure 14:
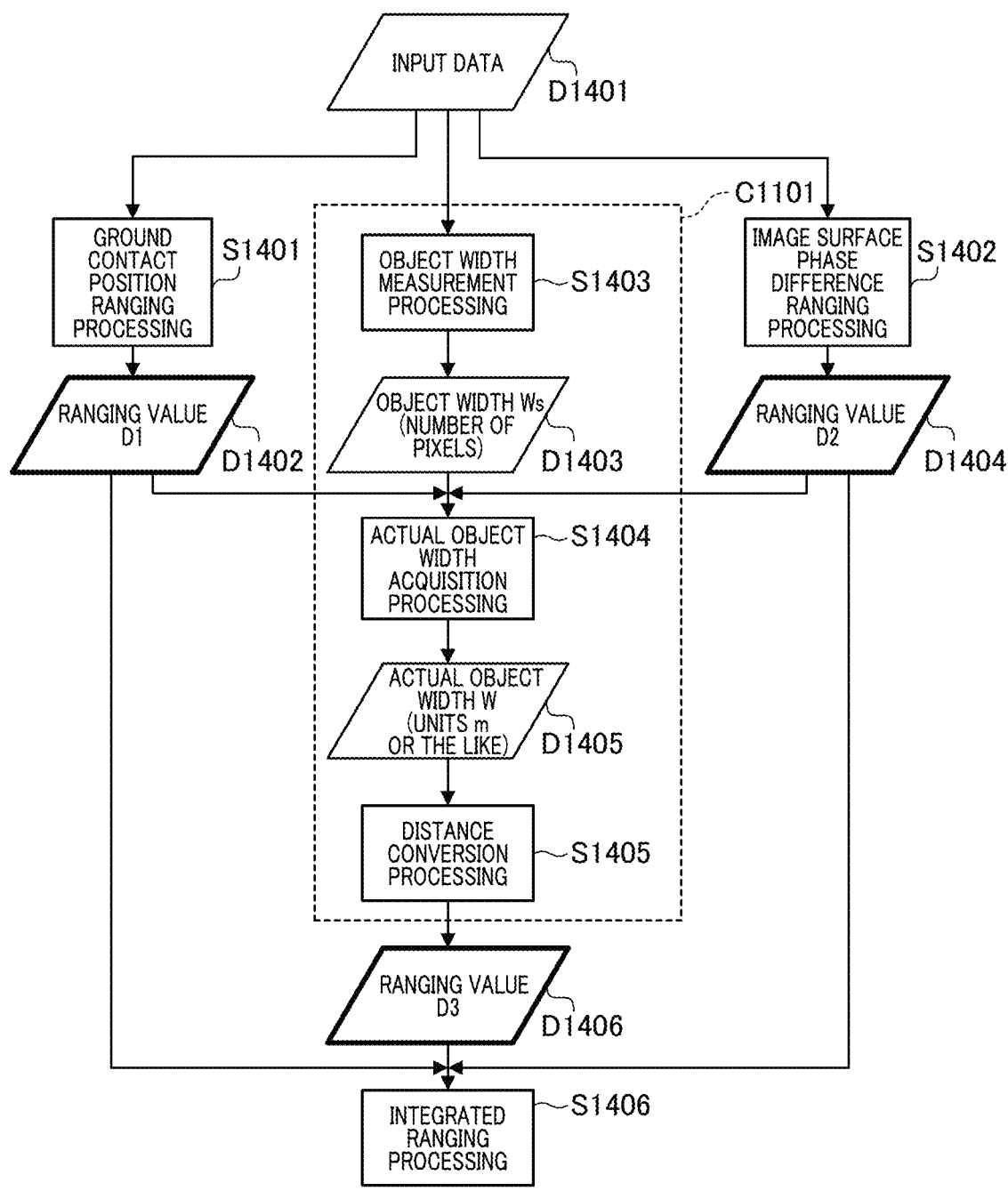
FIG. 14 is a flowchart showing a processing example for acquiring a ranging value (object distance information) according to Second Embodiment.

FIG. 14 is a flowchart showing a processing example for acquiring a ranging value (object distance information) according to Second Embodiment. Operation of each step of the flowchart in FIG. 14 is performed by causing the computer included in the path generation device 150 to execute the computer program stored in the memory.

Data D1401 is data input to the distance information generation unit 322. As described in First Embodiment, external information relating to an object (an identification number of an object, a kind of object (attribution), and a size of a region corresponding to the object) of which an image imaged by the imaging element 302 is obtained by image recognition is input to the distance information generation unit 322.

The data D1401 may include a result by other image recognition processing and may include information identifying a ground contact pixel position in an image, such as image coordinates indicating an image range of a recognized image or information of the same object region by a semantic region dividing technology. In addition, other information of results of image recognition may be included therein.

In addition, distance image data indicating a result obtained by computation of the imaging surface phase difference system (distance information of each pixel) is input to the distance information generation unit 322 as the data D1401. In Present Embodiment, in addition to these pieces of data, a focal distance f of the imaging optical system 301, information relating to a moving speed of the vehicle 100, and information relating to an installation position of the imaging device 110 are also input to the distance information generation unit 322 as the data D1401. The data D1401 is a data group in which these pieces of information are integrated.

In the following step, recognition processing may be simultaneously performed with respect to several objects. However, in the case of processing performed while data information in time series is reserved and referred to, it is performed regarding to that which has been recognized as the same object. Namely, it has the same identification number as input data.

In Step S1401, the distance information generation unit 322 acquires a ranging value (distance value) D1 and outputs it as data D1402 by the ground contact position ranging. The ranging value D1 indicates a distance between the vehicle 100 (imaging device 110) and a target object calculated by the ground contact position ranging.

The data D1402 is information indicating the ranging value D1 (second distance information) calculated in Step S1401 by the ground contact position ranging. Here, Step S1401 functions as a second distance information acquiring step of (second distance information acquisition unit) acquiring the second distance information based on information of an end position of an object included in an image signal, wherein the end position includes the ground contact position or a bottom end position.

The distance information generation unit 322 acquires a pixel position in contact with the ground in an image using image coordinates or the like indicating an image range of a recognized object included in the data D1401. An overview of ranging processing in the case in which an optical axis is set at a height H parallel to the road surface and the vanishing point in the image and the ground contact line are distant from each other by an Hs pixel (subpixel units may also be adopted) will be described.

When a pixel size in an image obtained by a central projection method at the focal distance f (an image corrected by the central projection method may be adopted) is Ps, the ranging value (distance value) D1 can be expressed as follows using the following Expression 7.

$$D1 = \frac{H}{(Hs \times Ps)} \times f \qquad \text{(Expression 7)}$$

Even if it is not on the road surface, if the optical axis is not parallel to the ground contact surface, if the central projection method is not used, or if it has a significant distortion aberration, ranging calculation itself can be performed as long as the vanishing point and the ground contact line can be presumed.

In Mathematical Expression 7, although the optical axis is assumed to be parallel to the road surface, if there is an error in the pitch angle of the movable apparatus as described above, the vanishing point position becomes a position different from the assumed position. Therefore, an error occurs in the value of Hs, resulting in a distance error. In addition, in the case of poor recognition accuracy, since the Hs is recognized as a position different from the actual ground contact line, a similar distance error occurs.

In Step S1402, the distance information generation unit 322 acquires a ranging value (distance value) D2 and outputs it as data D1404 by the imaging surface phase difference ranging. The data D1404 is information indicating the ranging value D2 (first distance information) calculated in Step S1402 by the imaging surface phase difference ranging.

That is, the first distance information is distance information acquired by a phase difference ranging method on the basis of signals from the first photoelectric conversion unit and the second photoelectric conversion unit described above. Alternatively, it is distance information acquired by the phase difference ranging method on the basis of two image signals from stereo cameras. Here, Step S1402 functions as a first distance information acquiring step of (first distance information acquisition unit) acquiring the first distance information corresponding to an object included in the image signal.

As described in First Embodiment, the distance information generation unit 322 can acquire distance information (distance value) of a target object on the basis of the distance image data and the external information. For example, regarding the input data D1401, it is assumed that the distance image data in which the distance information of each pixel is indicated by a defocus amount and the external information in which the region of an object is indicated by a frame are input.

At this time, the distance information generation unit 322 can acquire a distance from the vehicle 100 to a target object (object distance information) from the image formation expression using the most frequently appearing value of the defocus amount included in the object frame of the target object, and the focal distance f. The obtained distance is acquired as the ranging value D2. The distance value itself may be input as the data D1401, and other data in the middle of calculation may be adopted.

In Step S1403, the distance information generation unit 322 acquires a width Ws of a target object (object width) in an image. The object width Ws is indicated by the number of pixels. The number of objects may be indicated by subpixel units. The distance information generation unit 322 performs measurement of the object width Ws from the result of image recognition.

For example, if information indicating the object frame of each object within an image is included as the external information included in the data D1401, the width of the object frame corresponding to a target object may be adopted as the object width Ws. In addition, it is not necessarily the width of an object and may be a height. Any object frame having a larger number of pixels may be selected, or robustness may be enhanced using both of them.

If the attribution information of an object is known, determination can be performed in consideration thereof. In addition, for example, if the object is a vehicle which deviates from a central portion of the field angle, there is a high likelihood that the object width will also include side surfaces of the vehicle. In such a case, it is better to select a height.

If change in time series is observed, in consideration of a variation or the like in ratio between the height and the width, stabler information than distance change can be selected. The distance information generation unit 322 takes information indicating the object width Ws as data D1403.

In Step S1404, the distance information generation unit 322 uses the object width Ws of the data D1403 and any one or both the ranging value D1 obtained by the ground contact position ranging of the data D1402 and the ranging value D2 by the imaging surface phase difference ranging of the data D1404. Further, an actual object width W is calculated. The actual object width W is information indicated by a unit system (meters or the like) indicating the width of a target object by a length.

As described above, the actual object width W can be obtained using one of or both the ranging value D1 and the ranging value D2 with respect to the object width Ws. However, it is desirable to select a ranging value having a smaller absolute error between D1 and D2. If the ranging value D1 is used, the actual object width W can be expressed as follows using the following Expression 8.

$$W = \frac{(Ws \times Ps)}{f} \times D1 \qquad \text{(Expression 8)}$$

In addition, the actual object width W may perform determination on the basis of information indicating the kind of object included in the external information of the input data of D1401. That is, integrated distance information may also be generated on the basis of the kind of object. For example, if the kind of target object is a passenger car, the actual object width W can also have a value, for example, 1.7 m, which has been set in advance.

However, if the actual object width W is determined in accordance with the kind of object, since it strictly differs for each object, the difference becomes an absolute error. The distance information generation unit 322 outputs information indicating the actual object width W as data D1405.

In Step S1405, the distance information generation unit 322 acquires a distance value D3 using the actual object width W and the object width Ws. Data D1406 (third distance information) is information indicating the ranging value D3 by the object width calculated in Step S1405.

Here, Step S1405 functions as a third distance information acquiring step of (third distance information acquisition unit) acquiring the third distance information based on information of the size of an object (the width or the height of an object) included in the image signal. The processing executed in Step S1405 becomes reversed processing of that in Step S1404. The ranging value (distance value) D3 can be expressed as follows using the following Expression 9.

$$D3 = \frac{f}{(Ws \times Ps)} \times W \qquad \text{(Expression 9)}$$

Here, since the actual object width W is the same, D1=D3 is established. However, since processing is added to Step S1404 using information in time series which will be described below, D1 and D3 become distance values different from each other.

A step group C1101 constituted of Step S1403, Step S1404, and Step S1405 is the object width ranging. In Step S1406, the distance information generation unit 322 integrates the ranging value D1 of the data D1402, the ranging value D3 of the data D1406, and the ranging value D2 of the data D1404 and takes it as the distance value D with respect to a recognized object.

There is no need to combine all the first distance information to the third distance information. Integrated distance information in which at least two of the first distance information to the third distance information are combined and integrated may be generated. In Present Embodiment, both the second distance information acquisition unit and the third distance information acquisition unit are provided, but at least one of them may be provided.

Here, Step S1406 functions as a distance information integrating step of (distance information integration unit) generating integrated distance information in which at least two of the first distance information to the third distance information are combined and integrated.

For example, integrated processing need only be processing in which the ranging value D1 (first distance information), the ranging value D2 (second distance information), and the ranging value D3 (third distance information) is selected as the ranging value D.

Each of the ranging value D1, the ranging value D2, and the ranging value D3 has a relative error and an absolute error which differ depending on the kind of acquired ranging. The distance information generation unit 322 can employ a ranging value having a smaller error in accordance with a scene in a plurality of ranging methods by selecting a ranging value considered to have smaller relative error and absolute error.

For example, regarding the ranging value obtained by the ground contact position ranging or the imaging surface phase difference ranging, a larger distance value has a smaller error. Therefore, if the acquired ranging value is larger (longer) than a predetermined distance, the distance information generation unit 322 may select any of the ranging value D1 and the ranging value D2, and if it is equal to or smaller (shorter) than the predetermined distance, the ranging value D3 may be selected.

The integrated distance information may be generated by performing weighting addition of at least two of the first distance information to the third distance information.

In addition, regarding another integrated processing technique, selection may be performed from the sum of a probability distribution such that the presence probability becomes the highest by calculating a distribution of a presence probability with respect to the distance in consideration of each of the absolute error and the relative error. Moreover, the presence probability of the relative distance value can be determined with respect to a current relative distance value on the basis of information of the moving speed with respect to the vehicle 100, the accelerator, the brake, and steering included in the data D1401.

For example, determination can be performed such that the probability decreases when the acceleration change increases while having the same acceleration as the maximum probability with respect to the acceleration at the previous time so as to prevent acceleration change from increasing. In accordance with this, the presence probability of the relative distance can be calculated.

In addition, if there is accelerator information, the maximum probability can be determined in a direction in which the acceleration increases, and if there is brake information, the maximum probability can be determined in a direction in which the acceleration decreases. Moreover, it can be set depending on the kind of target object. If the kind (category) of target object is an automobile, an automatic two-wheeled vehicle, or the like, since there is a likelihood that a recognized object side will significantly accelerate or decelerate, there is a likelihood that change in relative distance will increase.

Meanwhile, if the category is a pedestrian or the like that does not suddenly accelerate or decelerate, there is a likelihood that change in relative distance will depend on an operation of itself, and thus the presence probability can be determined with higher accuracy. Hereinabove, a basic flow in in which one piece of input data at a certain time has input has been described. Subsequently, consecutive input data in time series will be described.

Figure 15:
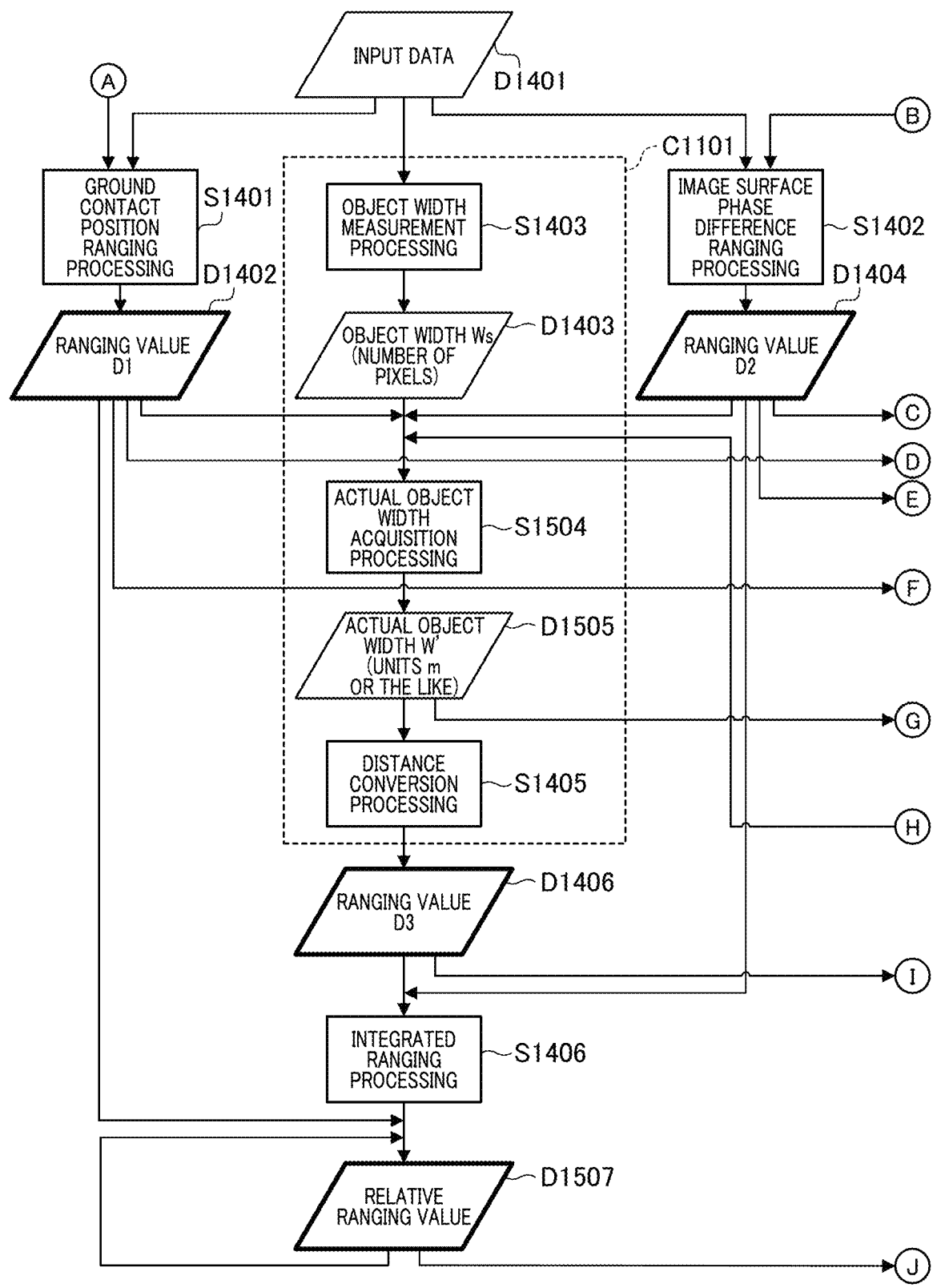
FIG. 15 is a flowchart showing a part of a processing example in which a plurality of pieces of consecutive input data in time series according to Second Embodiment are input.
Figure 16:
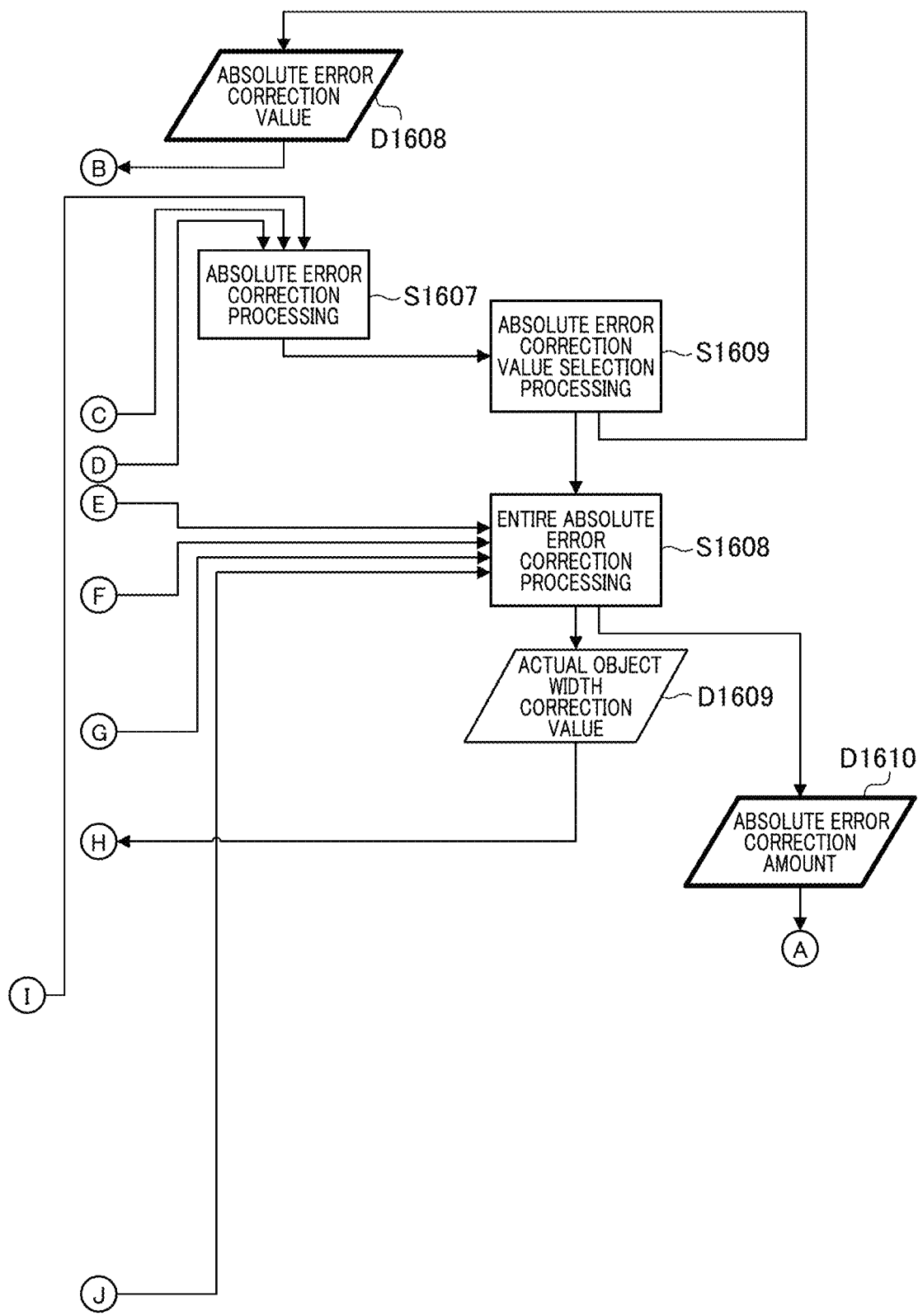
FIG. 16 is a flowchart showing the remaining part of the processing example shown in FIG. 15.

FIG. 15 is a flowchart showing a part of a processing example in which a plurality of pieces of consecutive input data in time series according to Second Embodiment are input, and FIG. 16 is a flowchart showing the remaining part of the processing example shown in FIG. 15.

Operation of each step of the flowcharts in FIGS. 15 and 16 is performed by causing the computer included in the path generation device 150 to execute the computer program stored in the memory. The same reference signs are applied to processing and data which are the same as the processing and the data described above using FIG. 14, and description thereof will be omitted.

If consecutive input data in time series is input, with respect to an object to which the same identification number is assigned, that is, an object which is recognized as the same object, the ranging value D1 of D1402, the object width Ws of D1403, and the ranging value D2 of D1404 can be sequentially acquired in time series.

If consecutive input data in time series is input, each ranging value temporally changes due to change over time in relative distance with respect to a target object. However, if it is assumed that an object is a rigid body, it is possible to mention that the actual object width W is constant at all times.

For this reason, in Step S1504, the distance information generation unit 322 acquires data D1505 of an average actual object width W' by smoothing the actual object width W in the time-series direction even if the relative distance value has changed in time series. Accordingly, a relative error can be reduced.

At this time, it is better to remove data which becomes an outlier such that data having a significant error is not utilized. In addition, when smoothing in the time-series direction is performed in all data, an influence of an error in an initial stage may remain even after a lapse of time.

In that case, it can be improved by taking a movement average within a range which has been determined to a certain degree. The number of data points used for a movement average can be determined in consideration of a relative error and an absolute error. If a system has a significant relative error, it is better to take a large number of data points used for the movement average, and if an absolute error is significant, it is better to take a small number thereof.

If W is presumed by the Mathematical Expression 8, a relative error can be sufficiently reduced including a ground contact position ranging value and the object width (the number of pixels) by sufficiently performing smoothing in the time-series direction. However, an absolute error remains by an amount corresponding to the ground contact position ranging value. It is possible to similarly consider even in a case of calculating an actual object width W' using an imaging surface phase difference ranging value.

The data D1505 becomes the object width W' having a small relative error, and due to distance conversion processing in Step S1405, the object width ranging value D3 as the data D1406 can be obtained as a distance value with only a relative error in the object width Ws and an absolute error corresponding to the ground contact position ranging value.

Meanwhile, in Step S1607 in FIG. 16, the distance information generation unit 322 calculates a correction amount of an absolute error in the imaging surface phase difference ranging valueD2 on the basis of the ranging values D1 and D3. In an absolute error in the imaging surface phase difference ranging value D2, an error having a constant value becomes a main component by defocus conversion regardless of the distance. For this reason, the distance information generation unit 322 converts the imaging surface phase difference ranging value D2 into a defocus amount based on the focal distance and the image formation expression.

Similarly, the distance information generation unit 322 converts the object width ranging value D3 into a defocus amount by the same focal distance and the same image formation expression. At this time, it may be converted into a defocus amount using the ground contact position ranging value D1 or the relative ranging value D.

The distance information generation unit 322 calculates an average value of time-series difference data by taking a difference between pieces of data at the same time between the defocus amount converted from the imaging surface phase difference ranging value D2 and the defocus amount converted from the object width ranging value D3.

If an average value can be calculated with sufficient data, the obtained average value indicates a difference between the absolute value errors in the imaging surface phase difference ranging value D2 and the object width ranging value D3. If this average value is selected in Step S1609, data D1608 is taken as an absolute error correction value.

If correction is performed using the ground contact position ranging value D1, correction is performed based on the absolute value error in the ground contact position ranging value D1, and if the ground contact position ranging value D1 is used in Step S1504, the result is the same absolute value error. In that case, an influence of a relative error is reduced by selecting a value having a smaller relative error.

Step S1609 is absolute error correction value selection processing, and the distance information generation unit 322 determines which result of the processing result in Step S1607 and the processing result in Step S1608 is selected as the absolute error correction value. Details thereof will be described below.

In Step S1402, the distance information generation unit 322 calculates the ranging value D2 by the imaging surface phase difference ranging and corrects the defocus amount using the absolute error correction value of D1608. Since the absolute error correction value indicates a defocus offset, an absolute error in the ranging value D2 of D1404 is corrected by subtracting an offset from the defocus amount calculated from the input data.

A direct distance value may be corrected. Actually, it has a shape adjusted to an absolute error in data used for the difference in Step S1607. If a defocus amount converted from the object width ranging value D3 is used as described above, it becomes an absolute error in the object width ranging value D3.

The object width ranging value D3 depends on the ranging value used in Step S1504. Therefore, if the actual object width W is calculated using the ground contact position ranging value D1 in Step S1504, all of the ground contact position ranging value D1, the imaging surface phase difference ranging value D2, and the object width ranging value D3 has an absolute error in the ground contact position ranging value D1.

Since the absolute error is uniform in three ranging values, only a relative error can be considered when the probability distribution is determined in integrated ranging processing in Step S1406. Accordingly, the relative ranging value D of data D1507 can be calculated more simply and stably.

The relative ranging value D can be calculated in time series from the ground contact position ranging value D1, the imaging surface phase difference ranging value D2, and the object width ranging value D3 by inputting time-series data of an object as above. The relative speed with respect to a target object, the relative acceleration, and the relative jerk can be calculated from the time-series data of the relative ranging value D. A probability distribution of the relative distance value described above can be calculated using these.

For example, the probability distribution can be determined such that change in relative acceleration is reduced. In addition, including a variation in relative ranging value, modeling of calculation of the ranging value D can also be performed. In that case, each distance value is expressed in linear coupling by the following Expression 10.

$$D=(1-K_1-K_2-K_3)D_m+K_1D_1+K_2D_2+K_3D_3 \quad \text{(Expression 10)}$$

Dm is a ranging value from a kinetic model estimated from the relative speed with respect to a target object, the relative acceleration, the relative jerk, and the like described above. K1, K2, and K3 indicate the weight coefficients of D1, D2, and D3. Namely, if K1, K2, and K3 can be estimated from the probability distribution in each technique, a plausible ranging value D can be obtained.

On the assumption that the probability distribution of each of the ranging values Dm, D1, D2, and D3 can be approximated to a Gaussian distribution, it can be analytically solved using the following Expression 11. Specifically, three expressions can be obtained for three unknowns by taking variance on both sides and partially differentiating with a coefficient K.

$$\frac{dV}{dK_x} = -2(1 - K_1 - K_2 - K_3)V_m + 2K_x V_x = 0 \quad \text{(Expression 11)}$$

V indicates variance in the probability distribution with respect to each distance value Dx. X indicates 1, 2, or 3. Accordingly, K1, K2, and K3 can be calculated with respect to the ranging values Dm, D1, D2, and D3 obtained in each frame, and the ranging value D can be obtained. Each variance value may be set in advance in each ranging technique or may be calculated in accordance with each of ranging results or conditions. For example, the ground contact position ranging value D1 can be set in consideration of the recognition accuracy in calculation of a ground contact point and a pitch angle estimation error of an imaging instrument.

Similarly, the object width ranging value D3 also depends on the recognition accuracy in an image determining the object width. Regarding the imaging surface phase difference ranging valueD2, if calculation is performed by general block matching, there are many ranging points in a recognized image, and the variance value can be calculated as statistics thereof.

At this time, since a significant error may also be included therein, it is better to remove the outlier of a block matching result. In addition, since it can be obtained as the statistics of many ranging values within the recognized object, it depends on the number of ranging points, but it is also necessary to consider the block size of block matching at this time.

This is because, if each ranging point is viewed, the blocks of block matching overlap each other at neighboring ranging points and therefore it is not independent as an influence of noise on the sensor pixel. If the variance of the average phase difference ranging value D2 inside a recognized object with respect to the variance of each ranging point is independent, it becomes a value obtained by dividing the variance of each ranging point by the number of ranging points.

However, since it is not independent for each ranging point as described above, there is a need for the variance to be determined as a deteriorated value by taking this into account. Specifically, the product of the number of pixels within the block may be computed, or it may be the product of a value determined by some other method.

In addition, Vm can be updated using the result of the immediately preceding frame. Specifically, since a posterior probability in the foregoing model can be calculated, updating can be performed through combination therewith (a form of mainly adding to the presumed variance). In addition, this time, a mathematical expression with respect to three ranging values has been described. However, it can also be increased if there are other ranging techniques, and even in that case, an analytical solution can be obtained with a similar concept of developing the expression.

On the contrary, there is no need to utilize all of D1, D2, and D3. Only the selected one may be utilized in accordance with the conditions, for example. Particularly, if the amount of variation in calculation of the speed, the acceleration change, and the like is large, it is presumed that the error is large. Therefore, in that case, it is conceivable to take countermeasures of not utilizing it.

For example, if it is ascertained that the preceding object is a standstill object or the like, approximate change can be obtained from the speed of the host vehicle. In addition, since the variance of the ranging value D (the probability distribution when assumed in a Gaussian distribution) can also be obtained by Mathematical Expression 11, there is a high likelihood of an error in the ranging technique in the case of the ranging values D1, D2, and D3 significantly deviating therefrom. In that case, the coefficient K can be set to zero or the like so as not to be considered.

Thus far, time-series data has been described, but it is not always necessary to be consecutively acquired. If the object recognition fails and correct input data cannot be obtained for this frame, no processing is performed, or recalculation can be started from there when it can be correctly recognized.

In that case, the average value W' of the actual object width or the absolute error correction value can be utilized as it is, and the stable relative ranging value D can be obtained therefrom. However, in that case, since the probability distribution of the relative ranging value using the relative speed, the relative acceleration, and the relative jerk calculated from the relative ranging value D cannot be correctly obtained, it is desirable to be set to zero.

In addition, a case in which any one or two of the ground contact position ranging value D1, the imaging surface phase difference ranging value D2, and the object width ranging value D3 cannot be correctly calculated can also be considered. Examples thereof include a case in which a recognized object floats, and a case in which a different object enters between the vehicle and a recognized object and the object width cannot be correctly measured.

In such cases, there is a high likelihood that change will be significantly different from the previous value, will be significantly different from other distance values, and will not be able to be correctly obtained. In such a case, regarding the distance value thereof, an influence on calculation of the relative ranging value D can be avoided or reduced by setting zero or a very small value as the presence probability distribution.

In Step S15108, if the relative distance value D with respect to a target object has sufficiently varied as time-series change, the distance information generation unit 322 executes correction processing of performing highly accurate absolute error correction using a variation in relative distance and change in actual object width W.

Figure 17A:
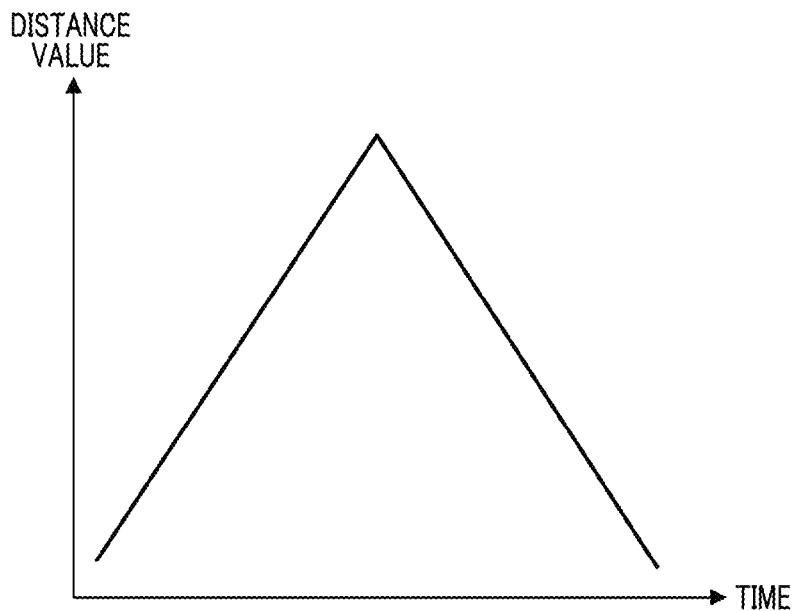
FIGS. 17A and 17B are explanatory schematic views of an example of absolute error correction processing according to Second Embodiment.
Figure 17B:
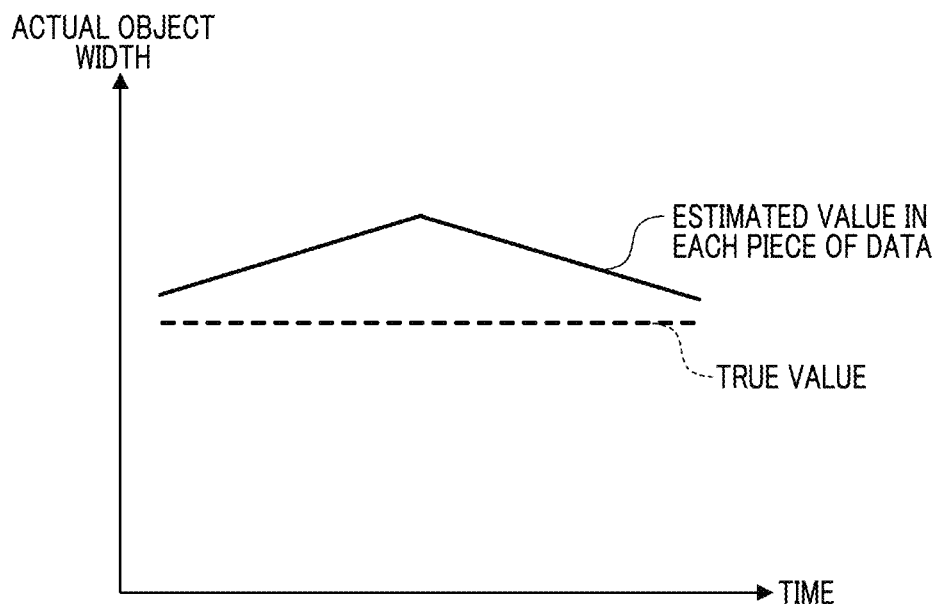

FIGS. 17A and 17B are explanatory schematic views of an example of absolute error correction processing according to Second Embodiment. A time axis is set for the horizontal axis, the distance value D is plotted for the vertical axis in FIG. 17A, and the actual object width W is plotted for the vertical axis in FIG. 17B. In FIG. 17B, instead of the averaged actual object width W', the actual object width W calculated based on the object width at each time is employed. For the sake of description, a relative error is removed.

Even if the relative distance value D has changed as illustrated in FIG. 17A, the actual object width W should be constant as indicated by the dashed line in FIG. 17B. However, if an absolute error is included therein, as indicated by the solid line, it changes depending on the distance. An estimation distance value De having an error can be expressed by the following Expression 12 using a true distance value Dt, a true actual object width Wt, and an estimated average actual object width We'.

$$De = \frac{We'}{Wt} \times Dt \qquad \text{(Expression 12)}$$

If there is no relative error, since the We and the Wt coincide with each other and the Dt and the De coincide with each other, the relative distance can be correctly estimated. If the We does not coincide with the Wt, namely, an absolute error remains, an error also occurs in the relative distance with a ratio of the We and the Wt. Accordingly, as illustrated in FIG. 17B, the actual object width We estimated in accordance with the distance changes.

Therefore, if a certain variation occurs in the relative distance, an absolute distance correction component is determined in Step S11608 such that the change does not occur in the actual object width at each time. Since the true distance value Dt is unknown, in consideration of any of or a plurality of values of the ground contact position ranging value D1, the imaging surface phase difference ranging value D2, and the relative ranging value D, it can be estimated from the variation component thereof and change in actual object width W.

Specifically, for example, the actual object width W is calculated by a technique equivalent to that in Step S1404 using the imaging surface phase difference ranging value D2, and change thereof in time series is calculated. The absolute error correction value may be revised such that the change in actual object width W is reduced. Regarding a calculation method, a correction value with which change in actual object width W is minimized can be found using a general optimization technique. Accordingly, the absolute error correction value and the actual object width correction value are simultaneously estimated.

One of specific calculation methods will be described. If it can be assumed that an error is included therein and the order of the distance value is sufficiently large with respect to the order of the defocus, an image formation expression that is a relational expression of the ranging value in the imaging surface phase difference ranging and a defocus, and a relational expression of the ranging value in the object width ranging value and the image surface are rearranged by the following Expression 13.

$$\frac{1}{W_t} \propto D \qquad \text{(Expression 13)}$$

Since the actual vehicle width ideally coincides regardless of the distance, it is ascertained that a reciprocal number of the actual vehicle width is proportional to the distance value by including an error although it does not depend on the distance value. Regarding the relationship between 1/Wt and D, an error in the actual vehicle width increases in proportion to the distance, and an error in the actual vehicle width decreases if the distance is small.

In other words, an error in the Wt is approximated to zero if the relative distance value D is approximated to zero. For this reason, the relative distance value D and the reciprocal number 1/Wt of the actual vehicle width are plotted, an intercept thereof becomes the correct answer of the actual vehicle width, and the absolute error correction value can be calculated from this.

Actually, since a relative error is also included in addition to an absolute error, plotting of data varies, but if there is a certain variation in relative distance and there is data corresponding to a certain time, it can be easily solved using a least square method or the like.

In addition, the absolute errors in the imaging surface phase difference ranging value D2, the object width ranging value D3, and the ground contact position ranging value D1 which have been corrected should coincide with each other, and the difference between the absolute errors can also be calculated as an absolute error correction amount. The main cause of an absolute error component in the ground contact position ranging processing in Step S1401 includes a pitch angle deviation of the photographing device described above. Namely, the vanishing point is at a position different from the presumed position, and the component thereof becomes an absolute error in the ground contact position ranging value.

In Step S1608, since an absolute error component can be estimated, the pitch angle deviation can be estimated. The correction amount can be adopted as an absolute error correction amount (data D1610). If a variation occurs in the relative distance in this manner, an absolute error component in each ranging value can be corrected with higher accuracy utilizing the information.

If a variation in absolute error component including time series is within a range which can be disregarded, after the entire absolute error correction processing in Step S1608, the processing may shift to actual object width acquisition processing in Step S1504. That is, basically, calculation of the average value of actual object widths and the absolute error correction processing in Step S1607 are no longer necessary. For this reason, each process of the processing may be simplified or may be processed for successive confirmation.

In Step S1609, the distance information generation unit 322 selects which of the absolute error correction value in Step S1607 and Step S1608 to output as the data D1608. As described above, Step S1608 is performed if a certain variation occurs in the relative distance.

For this reason, in Step S1609, the distance information generation unit 322 basically selects the absolute error correction value calculated in Step S1607, and if the processing in S1608 is performed, the absolute error correction value calculated in Step S1608 is selected.

Again, if there is a variation in absolute error or the like, the absolute error correction value calculated in Step S1607 may be selected again. For example, if the absolute error correction value calculated in Step S1607 varies after the absolute error correction value calculated in Step S1608 is selected, the absolute error correction value calculated in Step S1607 can be selected again.

Thereafter, if a certain variation occurs again in the relative distance, it is possible to continuously select a better absolute error correction value in a form of performing Step S1608 and selecting the absolute error correction value thereof.

As described above, a flow of correcting a relative error and an absolute error in time series using the ground contact position ranging, the object width ranging, and the imaging surface phase difference ranging has been described using FIGS. 15 to 17. In the processing described above, the imaging surface phase difference ranging has been described, but stereo ranging can also be similarly considered.

A relative error is equivalent to an influence of sensor noise, and an absolute error can be considered as an influence of an installation position error of each stereo photographing device. Although an absolute error is not converted as a defocus value, the correction amount can be estimated as an installation position error.

In addition, other modalities such as LiDAR can also be similarly considered. For example, in the case of LiDAR, since a relative error similarly occurs in the distance resolving power and an absolute error also occurs as a distance offset, a concept similar to that of Present Embodiment can be applied.

In addition, this time, an integrated flow of three kinds of ranging techniques has been described, but an integrated flow in which two kinds are extracted for each may be adopted. In addition, correction can be similarly performed for each through combination of four or more kinds of ranging techniques by adding the imaging surface phase difference ranging, stereo, and LiDAR (other modalities).

Due to such an integrated ranging technique, a stable ranging value can be obtained for a purpose such as tracking a recognized object for a certain period of time. When this photographing device is attached to a vehicle, for example, it can be applied to adaptive cruise control (ACC), automatic driving, and the like.

In this manner, in Present Embodiment, object distance information of a corresponding object which has been recognized with higher accuracy can be obtained using image information in addition to information of an ordinary modality. In addition, in Present Embodiment, the path generation device 150 generates path information on the basis of the integrated distance information generated in such a manner.

Therefore, path information having higher accuracy can be generated. Here, the path generation device 150 functions as the path generation unit executing the path generation step of generating path information on the basis of the integrated distance information. Regarding path information, the path generation device 150 generates path information on the basis of the speed of the vehicle as a movable apparatus.

Third Embodiment

The path generation device 150 of Third Embodiment realizes highly accurate ranging from a short distance to a long distance by combining ranging based on a parallax using a plurality of images and distance estimation based on a single image.

Figure 18:
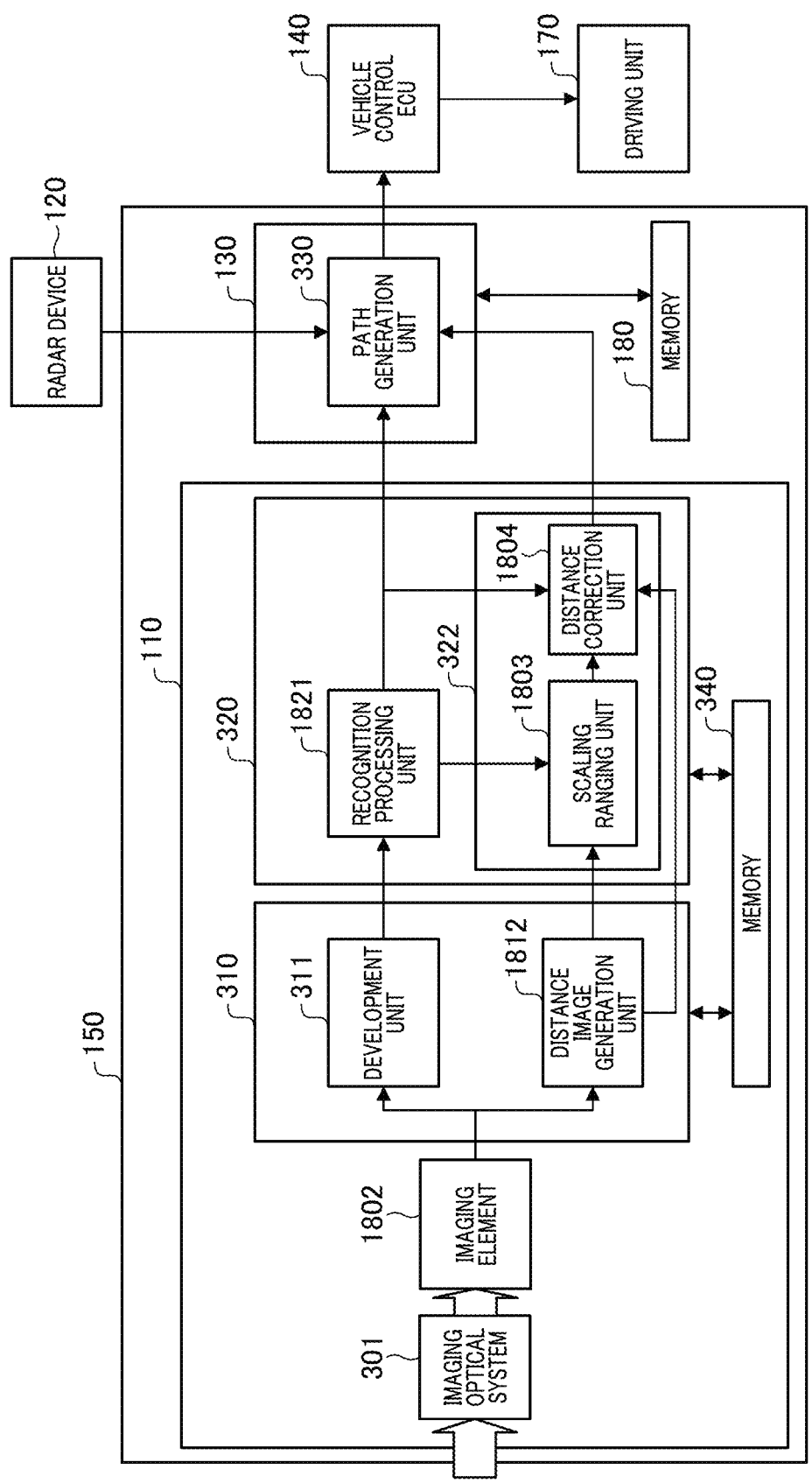
FIG. 18 is a block diagram showing an example of a constitution of a ranging system according to Third Embodiment.

FIG. 18 is a block diagram showing an example of a constitution of a ranging system according to Third Embodiment. In Present Embodiment, a ranging system is included in the imaging device 110. The ranging system includes an imaging element 1802 serving as an image acquisition unit, a recognition processing unit 1821, a distance image generation unit 1812, a scaling ranging unit 1803, and a distance correction unit 1804.

Here, the imaging element 1802 has a constitution similar to that of the imaging element 302 in First Embodiment. The recognition processing unit 1821 corresponds to the recognition processing unit 321. The distance image generation unit 1812 corresponds to the distance image generation unit 312. The scaling ranging unit 1803 and the distance correction unit 1804 correspond to the distance information generation unit 322.

The imaging element 1802 acquires an image signal in a manner similar to that of the imaging element 302. The imaging element 1802 has the first photoelectric conversion unit 411 and the second photoelectric conversion unit 412 which are disposed within each pixel. In addition, an image signal constituted of an image signal acquired by the first photoelectric conversion unit 411 and an image signal constituted of an image signal acquired by the second photoelectric conversion unit 412 are acquired.

These are images corresponding to different viewpoints and are referred to as parallax images. In addition, the imaging element 1802 acquires a synthetic image signal obtained by synthesizing image signals of two parallax images as a captured image. The imaging element 1802 may acquire one of two parallax images as a captured image.

Regarding a camera constitution for obtaining a parallax image, stereo cameras disposed side by side may also be used. Moreover, in a single-lens camera constitution, in consideration of the speed of a host vehicle, a parallax image may be obtained by assuming an amount of relative movement of an object in consecutive frame images as a parallax.

The recognition processing unit 1821 detects an object included in a captured image by applying the image recognition processing to a captured image photographed by the imaging element 1802. In order to realize automatic driving control and collision reduction braking control of the vehicle 100, it is necessary to recognize a traffic lane in which the vehicle 100 travels, a vehicle traveling on a side in front of the vehicle 100 (preceding vehicle), and an object such as a person.

Regarding an object detection technique, a technique of detecting an object having approximately constant appearance (a signal, a traffic sign, or the like) by template matching, or a technique of detecting a general object (a vehicle, a person, or the like) or the like using machine learning is used.

Figure 19:
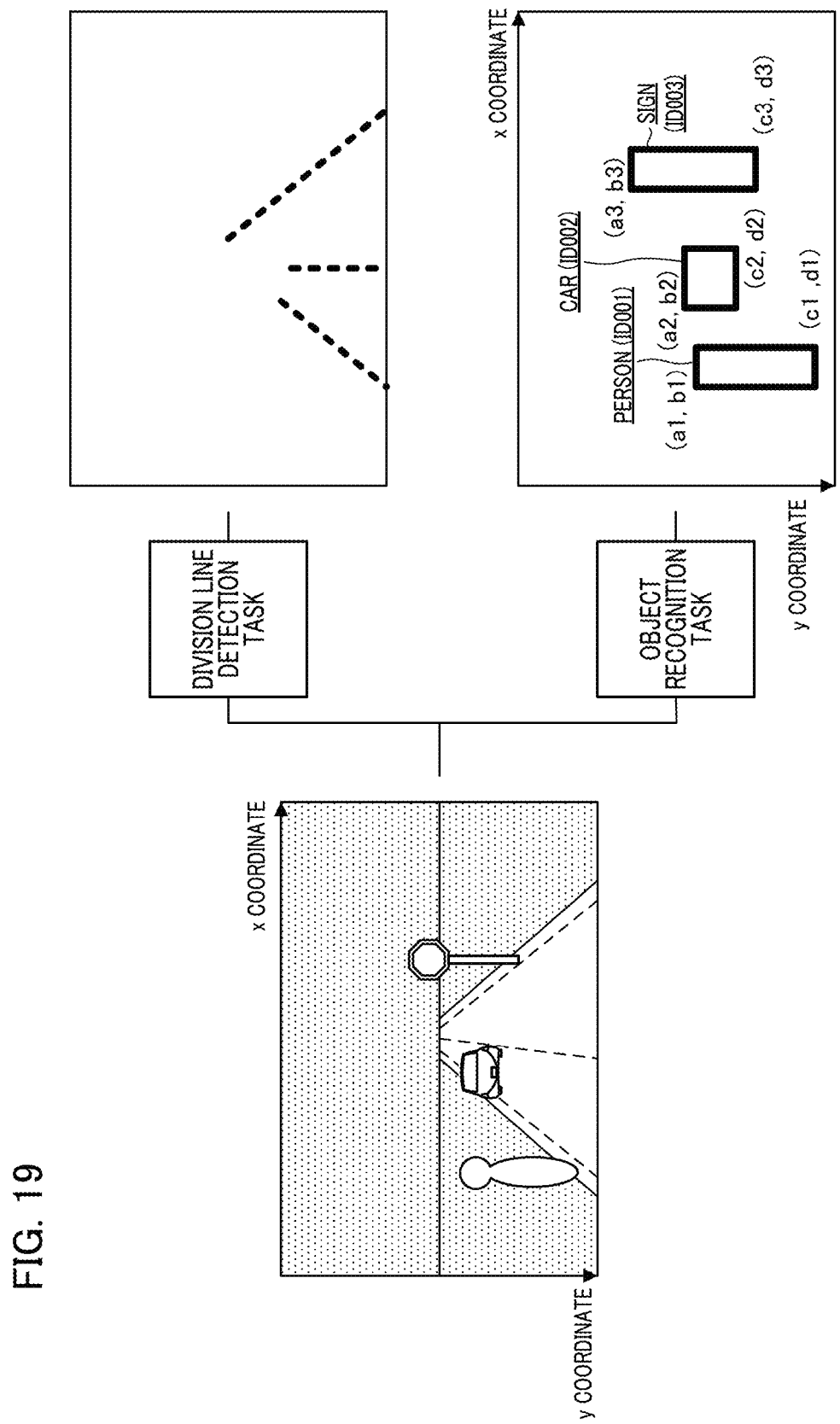
FIG. 19 is a schematic view illustrating an example of an output result of a division line detection task and an object recognition task executed by an object detection unit according to Third Embodiment.

In Present Embodiment, the recognition processing unit 1821 executes a division line detection task and an object recognition task. FIG. 19 is a schematic view illustrating an example of an output result of a division line detection task and an object recognition task executed by the recognition processing unit 1821 according to Third Embodiment. In a division line detection task, when a captured image is input, a division line region map subjected to labeling (in the diagram, the division line which can be detected is indicated by a black dashed line) indicating whether or not it is a division line using a machine learning model for detecting whether it is a division line (or a white line or a yellow line) on the road for each pixel is obtained.

In an object recognition task, when a captured image is input, the kind of detected object (a person, a car, a sign, or the like), the coordinates (x0, y0) of the upper left point in a detection frame, and the coordinates (x1, y1) of the lower right point in the detection frame are obtained using a machine learning model for detecting an object on the road. Further, the coordinates of a detection frame which comes into contact with the detected object are obtained. Here, an output of the object recognition task is equivalent to that of the external information described in First Embodiment.

The distance image generation unit 1812 obtains distance data from a parallax image obtained by the imaging element 1802. In ranging from a parallax image, a parallax value is calculated by detecting a corresponding point between images having different viewpoints, and a distance can be calculated from the parallax value and the camera conditions (a focal distance and a base length) for photographing a parallax image.

As described above, even if a camera which has photographed a parallax image is a single-lens camera using a dual pixel CMOS sensor, camera conditions for calculating a distance can be identified. Generally, it is known that in ranging using a parallax image, ranging estimation accuracy deteriorates because the parallax almost disappears when a ranging target becomes distant.

The scaling ranging unit 1803 calculates a distance value of a second region by scaling the distance value of a first region calculated by the distance image generation unit 1812 based on a size ratio of an object present in the first region and an object present in the second region.

In Present Embodiment, an example in which the distance value on the short distance side calculated by the distance image generation unit 1812 is subjected to scaling will be described by expanding the road surface on the short distance side to the long distance side based on the road information of the short distance side and the long distance side.

Figure 20:
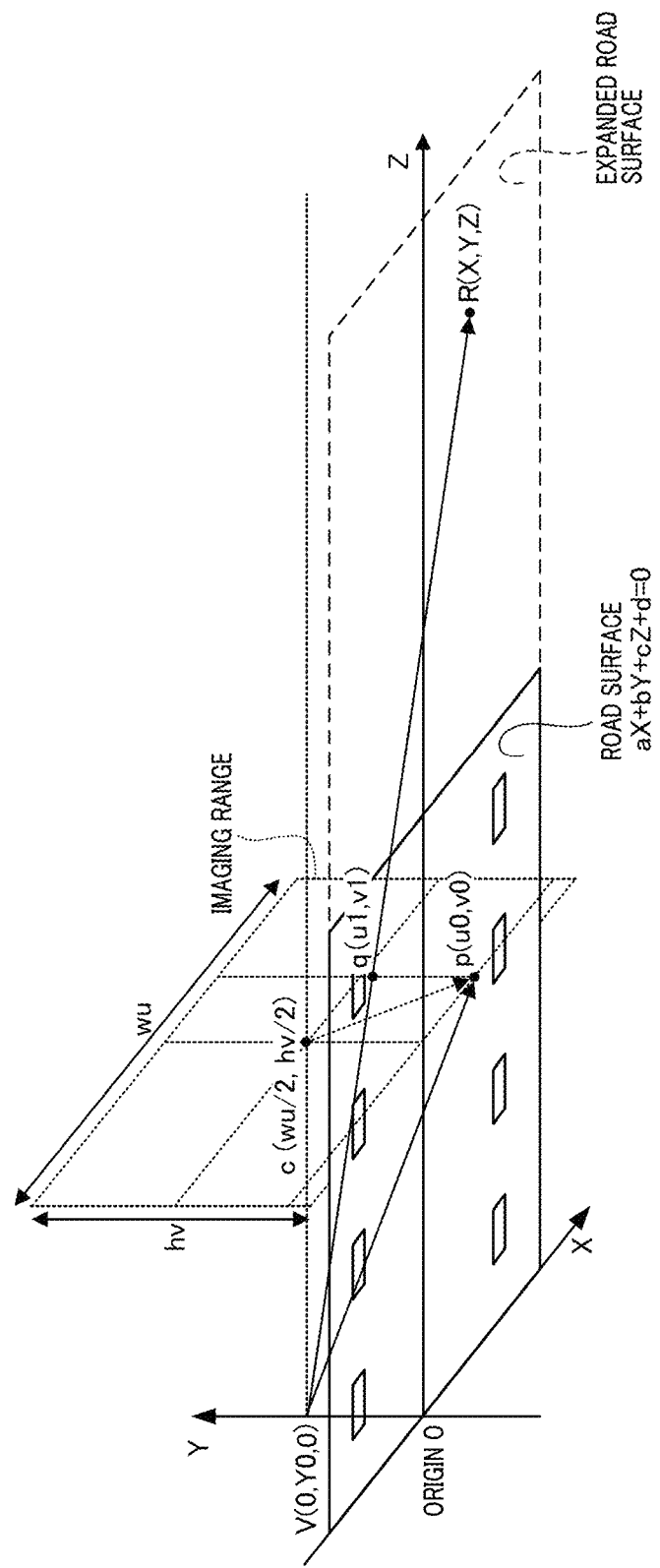
FIG. 20 is an explanatory view of an example of a positional relationship between a camera attachment position and a road surface according to Third Embodiment.

FIG. 20 is an explanatory view of an example of a positional relationship between a camera attachment position and a road surface. Global coordinates (X, Y, Z) for setting a road surface in a vertical direction of a camera attachment position V (0, Y0, 0) as an origin O are set. In addition, in the imaging optical system 301 of an imaging camera and an optical axis of an imaging element used in the imaging element 1802, the optical axis direction is horizontally disposed.

In addition, due to the angle of visibility of the imaging camera, a range to be imaged is indicated as an imaging range. When the imaging range, that is, an image width of a captured image and a distance map calculated by the distance image generation unit 1812 is wu and an image height is hv, a center pixel of the distance map is expressed as c (wu/2, hv/2).

First, the road surface on the short distance side is estimated. A region in a lower portion of the distance map is assumed as the road surface on the short distance side on the distance map. Otherwise, the road surface on the short distance side can also be directly estimated by recognition processing of a photographed image. In a region in a lower portion of the distance map, an area around the pixels judged as the division line on the division line region map detected by the recognition processing unit 1821 may be taken as a road surface.

Only a distance map region judged to be closer than a threshold set based on the camera installation conditions (the angle of visibility, the resolution, and the angle of visual line), the photographing environment (the climate and the time zone), and information relating to a traveling road where the vehicle travels (the traffic lane width, the number of traffic lanes, the branch point/junction, the road type) may be taken as a road surface.

When the distance value of a pixel p (u0, v0) on the distance map is D, a road surface p (u0, v0) on the short distance side can be converted into X=u0−wu/2, Y=v0−hv/2, and Z=D in global coordinates.

When it is assumed that the road surface is horizontal, the equation of the surface is expressed by aX+bY+cZ+d=0 (a, b, c, and d are constants). With four or more points indicating the road surface on the short distance side, the road surface can be estimated by setting the constants of the foregoing equation.

The road surface on the long distance side can be estimated by the equation of the estimated road surface. Moreover, the distance can be subjected to scaling from this expanded road surface on the long distance side. Specifically, a depth Z of a point R (X, Y, Z) positioned at the intersection between the equation of the road surface and the straight line passing through a viewpoint V (0, Y0, 0) and a pixel q (u1, v1) indicating the region on the long distance side on the distance map can be estimated as a distance value.

The scaling ranging unit 1803 can acquire a distance value Z of the road corresponding to the q (u1, v1) by performing computation as described above even if the distance of the road corresponding to the pixel q (u1, v1) cannot be acquired from the distance data.

In consideration of this processing on the distance map, the distance of the second region is calculated by scaling the distance of the first region based on the ratio between the road surface present in the short distance region (first region) and the road surface present in the long distance region (a depth ratio in a three-dimensional space). Since the distance value calculated in this manner does not use a distance value of a parallax ranging unit which deteriorates at a distant place, accuracy of an estimated distance at a distant place is improved.

Figure 21:
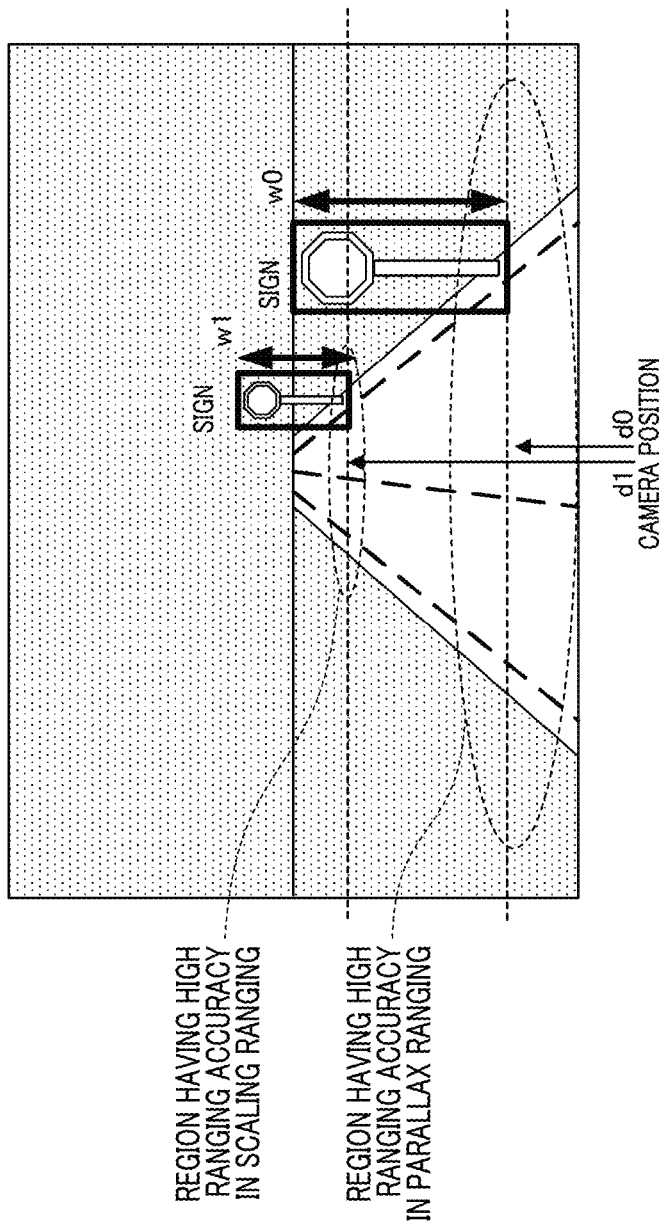
FIG. 21 is a schematic view illustrating an example of a scene in which two signs with a known object size are detected on a road.

Moreover, ranging accuracy can be improved using a detection frame detected by the recognition processing unit 1821. FIG. 21 is a schematic view illustrating an example of a scene in which two signs with a known object size are detected on a road. It is assumed that a sign having a size which is known in advance is disposed within an acquired image on each of the short distance side and the long distance side.

At the time of being in such a state, the distance to the sign on the short distance side can be accurately calculated by the distance image generation unit 1812. In addition, in the case of an object of which the object size is known, the scaling ranging unit 1803 can calculate the distance to the sign on the long distance side based on the ratio of the number of pixels in the image.

The height (the number of pixels) of the sign on the short distance side is regarded as w0, the distance from the camera position is regarded as d0, the height (the number of pixels) to the sign on the long distance side is regarded as w1, and the distance from the camera position is regarded as d1. The scaling ranging unit 1803 can calculate the distance by d1=d0*(w0/w1).

As described above, if an object having a known size (a sign, a traffic signal, or the like) or an object which can be assumed to have the same size on the short distance side and the long distance side (a guardrail; a width, a length, and an interval of a division line; or the like) can be detected, highly accurate scaling ranging can be performed.

If scaling ranging is performed with respect to an object having a known size, it is difficult to enhance the accuracy of all the distance ranges from a closer place to a distant place. However, accurate scaling ranging can be performed by combining the scaling ranging described above in which the road surface has been expanded and the scaling ranging utilizing the object size ratio.

The distance correction unit 1804 corrects the distance value subjected to ranging by the distance image generation unit 1812 and acquires a correction distance value Dc based on the distance value calculated by the scaling ranging unit 1803. Hereinafter, a value subjected to ranging by the distance image generation unit 1812 will be referred to as the distance value D, and the distance value calculated by the scaling ranging unit 1803 will be referred to as a scaling ranging value Ds. The correction distance value Dc is calculated in accordance with the following Expression 14 with a coefficient α.

$$Dc = \alpha \times D + (1-\alpha) \times Ds \quad \text{(Expression 14)}$$

The coefficient α is determined by any of the following three methods.

(1) Method for Determining Coefficient α Based on Magnitude of Distance Value

Regarding ranging of the parallax ranging unit, the distance value itself with respect to a ranging target affects the ranging accuracy. When the distance to the ranging target increases, the distance accuracy of the distance value calculated by the parallax ranging unit is degraded. Therefore, the coefficient α is determined such that the proportion of the scaling ranging value increases in accordance with the value of the distance value. Accordingly, accurate ranging results can be obtained. That is, the coefficient α is determined such that the a decreases as the distance value D increases.

(2) Method for Determining Coefficient α Based on Contrast of Ranging Target

Regarding ranging of the parallax ranging unit, there is a contrast of the ranging target as a factor other than the distance value with respect to the ranging target affecting the ranging accuracy. When the corresponding point (parallax) between parallax images is calculated, even if the regions having a low contrast are subjected to matching processing, discrimination from surrounding regions is unclear so that the parallax cannot be accurately obtained.

For this reason, if there is not sufficient lighting on the ranging target at night and the contrast of the ranging target is low, it is judged that the ranging accuracy of the distance value is low, and the coefficient α is set such that the proportion of the scaling ranging value increases.

That is, if the contrast of the ranging target is low, the coefficient α is determined such that the a increases. For example, since the scaling ranging value is generated based on the highly accurate distance value within a range illuminated by vehicle lighting, accurate ranging results can be obtained even if the contrast of the ranging target is low.

(3) Method for Determining Coefficient Based on Kind of Category of Detection Frame The ranging accuracy tends to differ in each of the parallax ranging and the scaling ranging in accordance with the type (category) of the ranging target. For example, a ranging object distant from the standard of scaling, such as a light emission part of a signal light can be subjected to ranging in the parallax ranging without being discriminated from a different object, but the ranging accuracy tends to be reduced in scaling ranging.

For this reason, if the category of the detection frame is a particular type, accurate ranging results can be obtained by setting a coefficient such that the proportion of the distance value increases. In addition, as illustrated in FIG. 21, if the distance accuracy of the scaling ranging in surrounding regions in which an object has been detected increases by the scaling ranging method, a coefficient may be determined such that the proportion of the scaling ranging around the detection frame increases in accordance with this category.

In the method for determining a coefficient described above, there is no need for the coefficient to be limited to one, and a final coefficient may be determined based on the coefficients generated for respective factors. Hence, accurate ranging results can be obtained.

Modification Example of Scaling Ranging Unit

Figure 22:
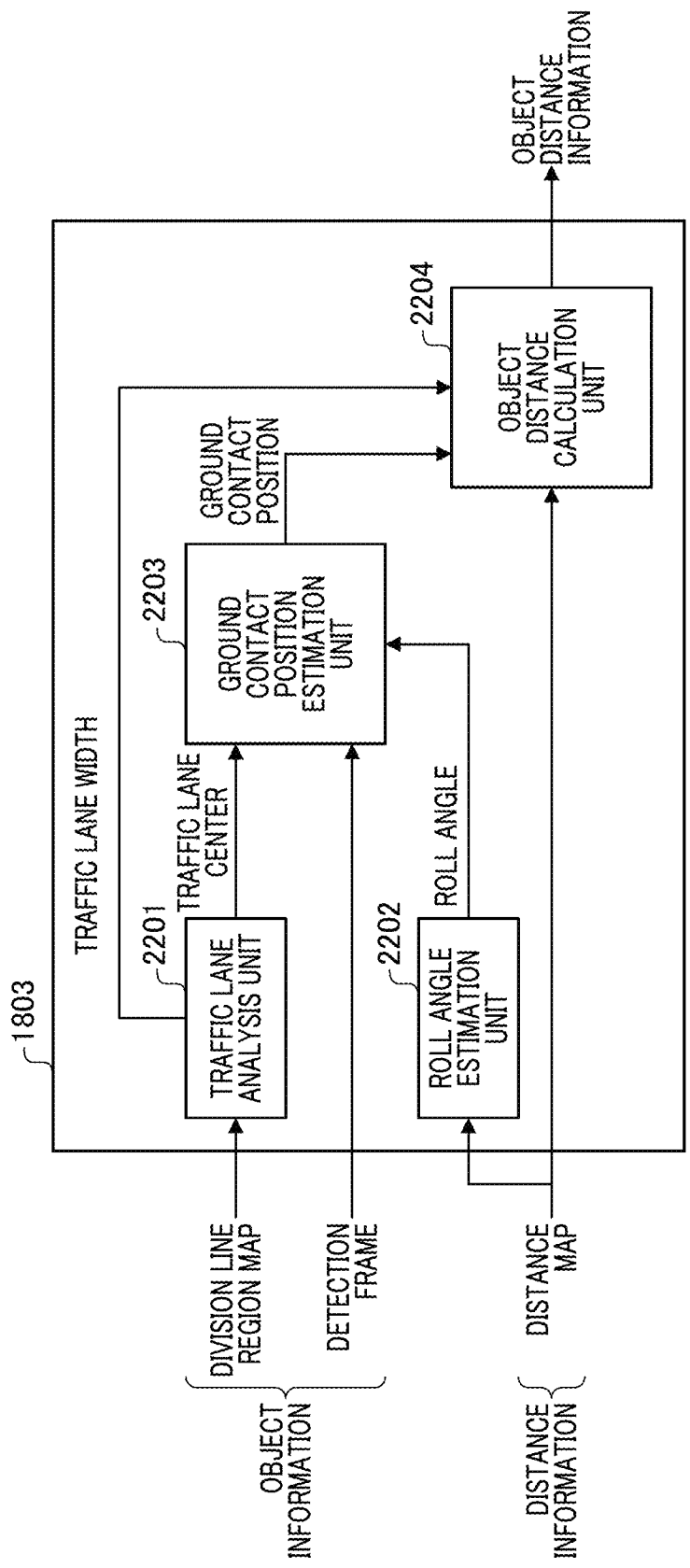
FIG. 22 is a block diagram showing a constitution of a modification example of a scaling ranging unit.

Regarding Modification Example of the scaling ranging unit 1803, an example in which estimation of the distance to a target object is performed by scaling the neighboring distance data on the basis of the size ratio of the road width on the short distance side and the long distance side in the image will be described. FIG. 22 is a block diagram showing a constitution of a modification example of the scaling ranging unit 1803.

The scaling ranging unit 1803 includes a traffic lane analysis unit 2201, a roll angle estimation unit 2202, a ground contact position estimation unit 2203, and an object distance calculation unit 2204. The traffic lane analysis unit 2201 detects the number of pixels between the division lines as a traffic lane width from the division line region map and detects central coordinates between the division lines as a traffic lane center (coordinates).

Figure 23A:
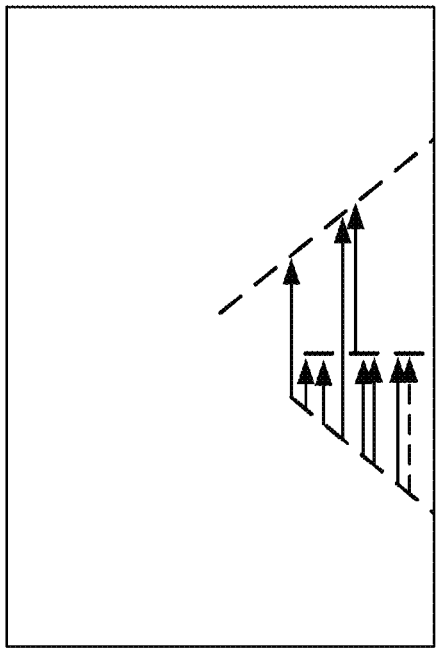
FIGS. 23A to 23D are schematic views schematically illustrating a processing example of traffic lane width detection and traffic lane center detection executed by a traffic lane analysis unit according to Third Embodiment.

FIGS. 23A to 23D are schematic views schematically illustrating a processing example of traffic lane width detection and traffic lane center detection executed by the traffic lane analysis unit 2201 according to Third Embodiment. FIG. 23A is a view schematically illustrating a division line region map indicating a division line in an image.

The traffic lane analysis unit 2201 assigns division line flags (expressed by black dashed lines in the diagram) to the pixels detected as the division lines in the image. Regarding the division lines on the road, since boundary parts of traveling traffic lanes and passing lanes may be indicated by dashed lines or the division lines may be hidden due to a car, an obstacle, or the like on the road, the division lines region map appears intermittently.

Figure 23B:
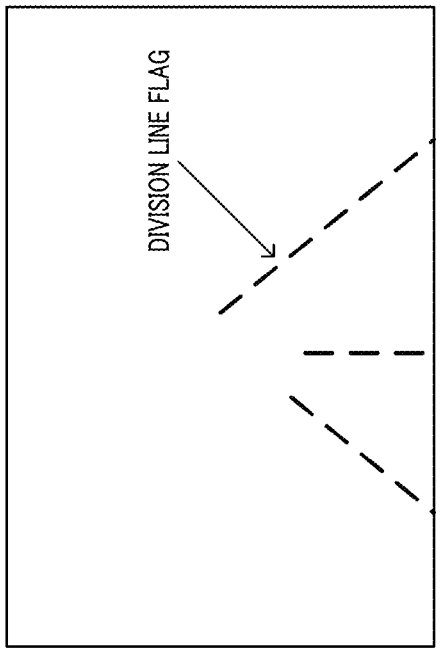

FIG. 23B is a schematic view illustrating a technique of calculating the traffic lane width and a position of the traffic lane center. The traffic lane analysis unit 2201 sequentially inspects whether or not the division line flags are set for each pixel from the left side to the right side in the division line region map. A starting point of the road width is a pixel under inspection in which the pixel under inspection does not have a division line flag and the pixel next to the left side of the pixel under inspection has a division line flag.

In addition, an end point of the road width is a pixel under inspection in which the pixel under inspection has a division line flag and the pixel next to the left side of the pixel under inspection does not have a division line flag. Accordingly, as in the arrow group illustrated in FIG. 23B, one traffic lane width (the length of the arrow) and one position of the traffic lane (the center position of the arrow) can be detected for one line in the division line region map.

Figure 23C:
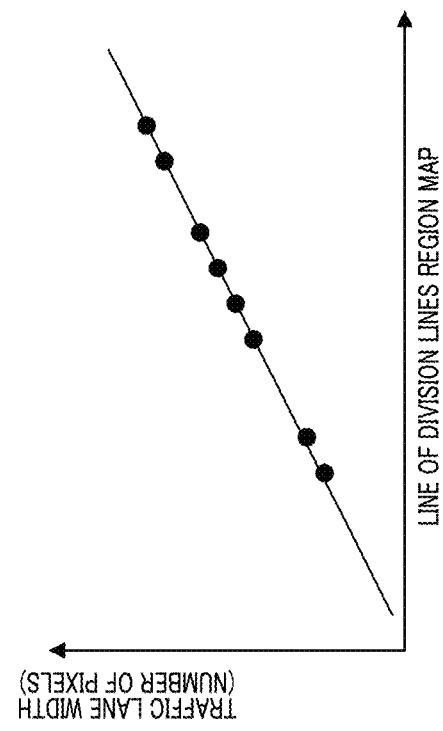

FIG. 23C is a schematic view illustrating detected traffic lane width data. The traffic lane width is observed by the number of pixels in proportion to a reciprocal number of the distance from the camera as long as the actual size of the traffic lane does not change. In FIG. 23C, the horizontal axis indicates the line of the division line region map, and the vertical axis indicates the detected traffic lane width (the number of pixels).

In this manner, the traffic lane width has a highly linear relationship with respect to the line. Although the traffic lane width for one traffic lane and the traffic lane width for two traffic lanes may be observed in a mixed manner depending on the state of intermittence or the like of the division line, since there is a difference of approximately two times therebetween, it is easy to separate them.

Figure 23D:
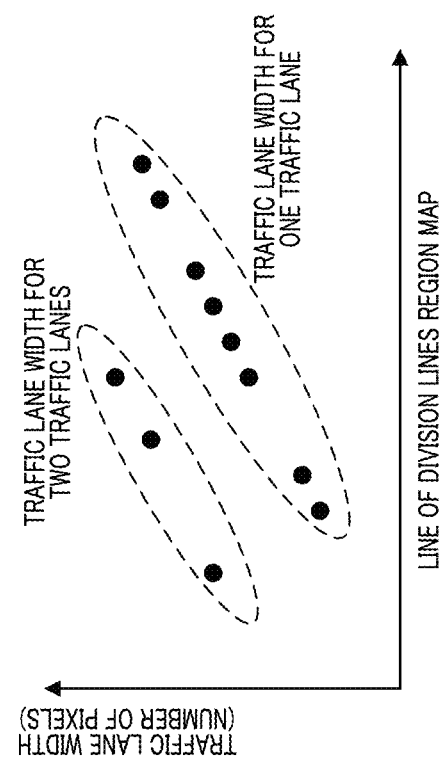

FIG. 23D illustrates a schematic view of interpolation of observation data for one traffic lane on the left side which has been separated, and data in the line in which the traffic lane width cannot be obtained from the observation data. Regarding separation of adjacent traffic lanes (traffic lanes on the left and right sides), it is easy to exclude the observation data of the adjacent traffic lanes by comparing the positions of the traffic lanes (the center position of the arrow). From these pieces of information, for example, the traffic lane width for only one traffic lane on the left side illustrated in FIG. 23B can be acquired by robust estimation such as an RANSAC method.

For interpolation of the traffic lane width, an approximate straight line equation may be calculated by the RANSAC method or the like described above and the approximate straight line expression may be used, or interpolation may be performed so as to interpolate pieces of observed road width data therebetween. Regarding the position of the traffic lane as well, data of each line can be obtained by a method similar to that described above. Scaling ranging is performed using the obtained traffic lane information (the traffic lane width and the traffic lane center).

The roll angle estimation unit 2202 estimates a roll angle of the camera from the distance map. There are a plurality of factors generating a roll angle with respect to the in-vehicle camera. For example, due to unevenness on the road surface, there may be a difference in height between the ground contact surfaces of left and right tires, which may cause a roll angle because the camera attachment position cannot be horizontally kept.

In addition, the vehicle body itself may be deformed due to a centrifugal force when the vehicle is turning a curve so that a roll angle may be generated. Generation of such a roll angle significantly affects the distance estimation.

The scaling ranging described herein is processing in which the neighboring distance value which has been accurately measured is subjected to scaling using the ratio of the number of pixels of the traffic lane width assumed to be at the same distance as an object and the number of pixels of the neighboring traffic lane width for the distance to the object on the road surface. If a roll angle of the camera is caused, it is difficult to find a traffic lane width assumed to be at the same distance as the object.

Figure 24:
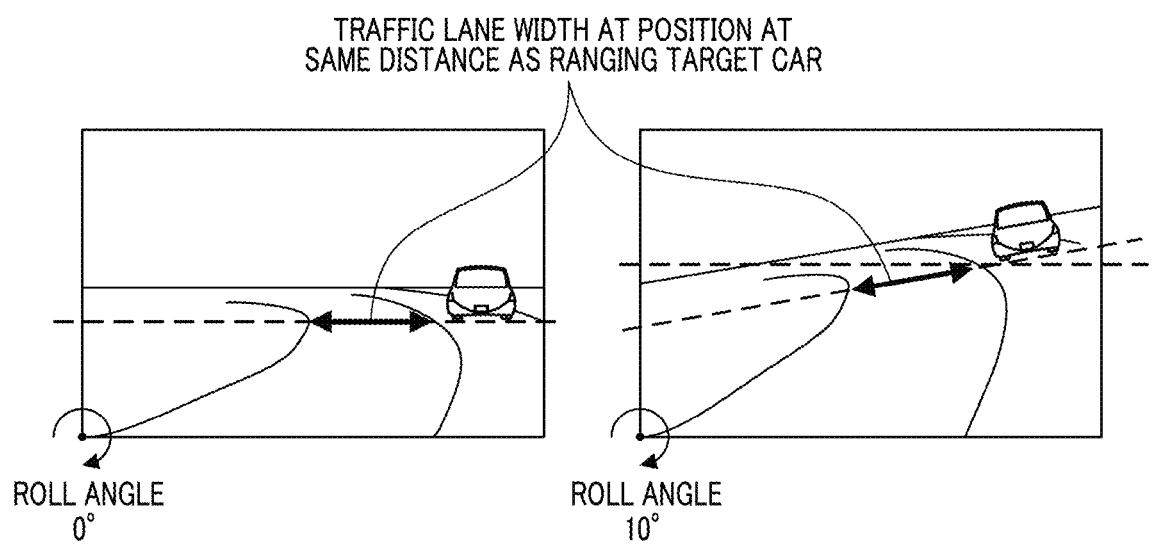
FIG. 24 is a schematic view of comparison between positions indicating a traffic lane width in a captured image regarding the presence or absence of a roll angle.

FIG. 24 is a schematic view of comparison between positions indicating a traffic lane width in a captured image regarding the presence or absence of a roll angle. The captured image on the left side illustrates a case in which no roll angle is generated, and the captured image on the right side illustrates a case in which 10° of a roll angle is caused centering on the lower left side of the image in the same scene. In the case of the captured image on the left side, since the ground contact position of the car (ranging target) and the traffic lane assumed to be present at the same distance are arranged on the same straight line, it is possible to easily take countermeasures.

On the other hand, in the case of the captured image on the right side in which a roll angle has been caused, there is no traffic lane present in the same line as the ground contact position of a car (ranging target), and even if there is a traffic lane, it is not possible to calculate the traffic lane width at the same distance. In order to find the traffic lane width at the same distance as the car (ranging target), there is a need to accurately estimate the roll angle.

The roll angle estimation unit 2202 estimates the roll angle based on the distance map acquired by the parallax ranging. If a roll angle is generated, regarding the distance to the road surface which can be assumed to be horizontal, it is known that the position at the same distance tilts as illustrated in FIG. 24.

Since the roll angle pivotally rotates around the viewpoint direction, there is no change in distance between the camera and the target object, and the image photographed by the camera tilts due to the roll angle. Therefore, an inclination also occurs in the distance map in a form along the inclination of the road surface in the image.

Figure 25:
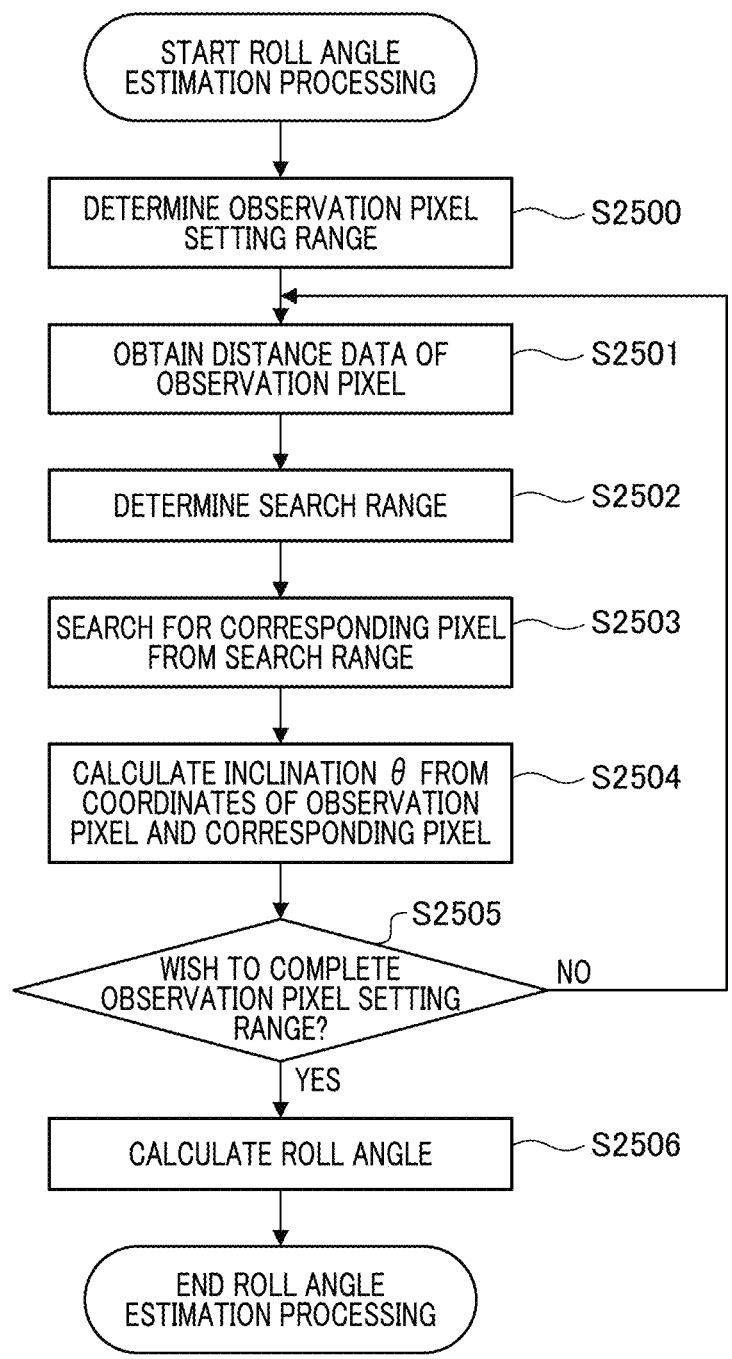
FIG. 25 is a flowchart showing an example of roll angle estimation processing executed by a roll angle estimation unit according to Third Embodiment.
Figure 26A:
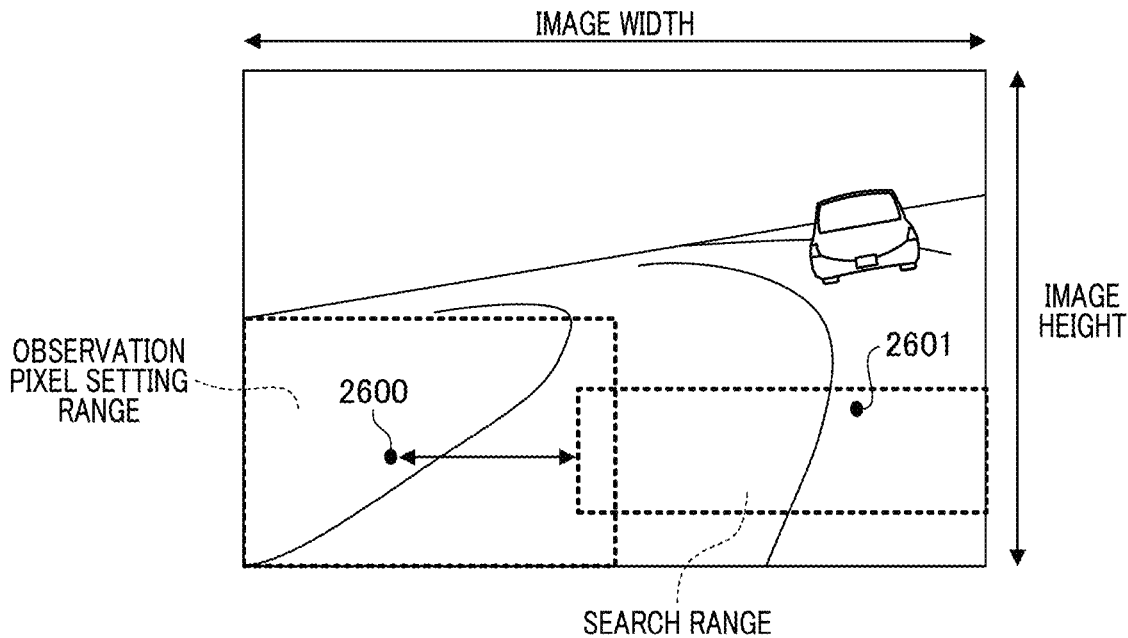
FIGS. 26A to 26C are explanatory schematic views of each processing example in the roll angle estimation processing according to Third Embodiment.
Figure 26B:
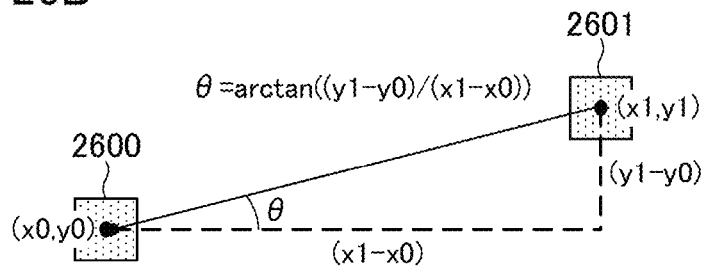
Figure 26C:
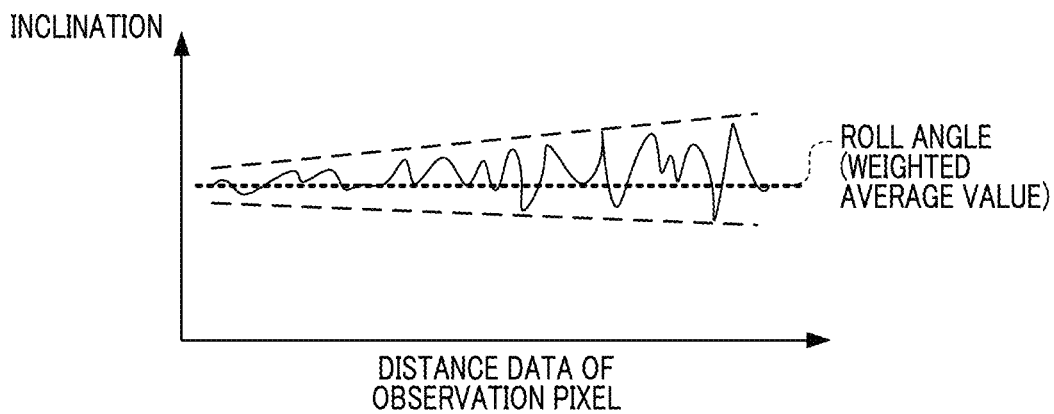

FIG. 25 is a flowchart showing an example of roll angle estimation processing executed by the roll angle estimation unit 2202 according to Third Embodiment. FIGS. 26A to 26C are explanatory schematic views of each processing example in the roll angle estimation processing according to Third Embodiment.

Operation of each step of the flowchart in FIG. 25 is performed by causing the computer included in the path generation device 150 to execute the computer program stored in the memory.

In Step S2500, the roll angle estimation unit 2202 determines an observation pixel setting range from the distance map. FIG. 26A is a schematic view illustrating the observation pixel setting range in the distance map.

As illustrated in FIG. 26A, the observation pixel setting range is positionally set in the lower left region in the distance map. The height of the observation pixel setting range is presumed to be in the region corresponding to the road surface, and a height from the horizontal line to the lower end of the distance map is set, for example. The width of the observation pixel setting range is set in consideration of an interval between the observation pixel and the search range. The search range is set at a position away from the observation pixel in the horizontal direction by a predetermined number of pixels (predetermined interval).

If the interval between the observation pixel and the search region is large, even if a large width of the observation pixel setting range is set, the search range cannot be set. In Present Embodiment, a predetermined interval is set to approximately ¼ of the image width of the distance map, and the size of the observation pixel setting range is set to approximately half the image width of the distance map. The computation amount can be controlled by suitably setting the observation pixel setting range.

In Step S2501, the roll angle estimation unit 2202 obtains distance data of an observation pixel 2600 from the distance map. In Present Embodiment, the distance data is obtained with respect to the observation pixel 2600 within the observation pixel setting range.

In Step S2502, the roll angle estimation unit 2202 determines the search range. Regardless of the presence or absence of generation of a roll angle, the distance value of the pixel in the vicinity of the observation pixel tends to be closer to the distance value of the observation pixel. Therefore, in order to detect a roll angle with a high resolving power from the coordinates of the observation pixel 2600 and a corresponding pixel 2601, the roll angle estimation unit 2202 sets the region with a predetermined interval from the observation pixel 2600 in the horizontal direction as the search range.

The roll angle estimation unit 2202 can limit the height of the search range by the range of a roll angle presumed to be generated. For example, in the case of an in-vehicle camera installed in the vehicle, if the vehicle travels a general road, it is limited to generation of a roll angle by ±several degrees. In Present Embodiment, approximately ⅛ of the image height in the distance map is set.

The extent of the search range is set from the position away from the observation pixel 2600 with a predetermined interval therebetween in the horizontal direction to the right end of the distance map. The right end of the search range is not limited to the right end of the distance map. However, if the extent of the search range is small, the region becomes excessively small so that the distance data of the road surface corresponding to the observation pixel 2600 may not be found. Therefore, it is preferable to set the extent of the search range as large as possible.

In Step S2503, the roll angle estimation unit 2202 searches for the corresponding pixel 2601 corresponding to the observation pixel 2600 from the search range. In order to positionally set a pixel similar to the distance value of the observation pixel 2600 within the search range as the corresponding pixel 2601, a difference between the distance values of the corresponding pixel 2601 and the observation pixel 2600 is detected for each pixel within the search range, and the pixel having the smallest difference is adopted as the corresponding pixel 2601.

A method for searching for the corresponding pixel 2601 is not limited to difference comparison between one pixel and one pixel, and a central pixel in a pixel group having the highest degree of similarity may be adopted as the corresponding pixel 2601 by performing difference comparison between the distance values of neighboring pixel groups including the observation pixel and the pixel within the search range.

In Step S2504, the roll angle estimation unit 2202 calculates an inclination 0 from the coordinates of the observation pixel and the corresponding pixel. As illustrated in FIG. 26B, when the coordinates of an observation pixel 3800 are (x0, y0) and the coordinates of the corresponding pixel 2601 are (x1, y1), the inclination 0 is calculated by 0=arctan((y1−y0)/(x1−x0)).

In Step S2505, the roll angle estimation unit 2202 performs branching depending on whether all the processing in the observation pixel setting range has been completed. If the processing has been completed while having all the pixels in the observation pixel setting range as the observation pixels, the processing proceeds to Step S2506. If the processing has not been completed while having all the pixel in the observation pixel setting range as the observation pixels, the processing proceeds to Step S2501, and processing is performed with respect to a new observation pixel.

In Step S2506, the roll angle estimation unit 2202 calculates a roll angle. The flow in FIG. 25 is regularly repeated until a user issues an instruction of ending (not illustrated).

FIG. 26C is a schematic view illustrating an inclination calculated while having the horizontal axis as the distance value of the observation pixel and the vertical axis as the observation pixel. Since the inclination calculated from one observation pixel includes a noise component, a plausible roll angle is detected by averaging a plurality of inclinations.

Although a distance map referred to for roll angle estimation is generated from a parallax image, it is known that detection accuracy of ranging from the parallax image deteriorates as the distance to an object increases.

For this reason, when the inclination for each observation pixel is calculated utilizing the distance map, unevenness in inclination calculated in accordance with the magnitude of the distance value of the observation pixel increases. For this reason, in calculation of a roll angle, the roll angle is estimated based on a weighted average in which the proportion of the inclination having a small distance value of the observation pixel is increased and the proportion of the inclination having a large distance value is reduced.

Regarding factors for determining the proportion of the weighted average, the degree of similarity at the time of searching for the corresponding pixel may be used. Through the foregoing processing, a roll angle can be estimated utilizing the distance map of the road surface.

Moreover, a method for setting an interval between an observation pixel and a search range in which the resolving power of the estimated roll angle is determined in advance will be described.

An interval between an observation pixel and a search range is set by the resolving power of the roll angle. The roll angle is calculated based on the inclination from the observation pixel to the corresponding pixel and is expressed by the ratio of a horizontal difference between the observation pixel and the corresponding pixel and a perpendicular difference between the observation pixel and the corresponding pixel. Since the perpendicular difference is at least one pixel, the resolving power of the roll angle is determined by the magnitude of the horizontal difference. An interval d between the observation pixel and the search range can be obtained using the following Expression 15 using a resolving power r of the roll angle.

$$d = \frac{1}{\tan r} \quad \text{(Expression 15)}$$

Mathematical Expression 15 indicates the smallest detection angle and is derived from the relationship of an angle r in the case of a difference of one pixel in a y axis direction with the interval d between the observation pixel and the search range. The larger the calculated interval d, the higher the resolving power, but when the interval d is increased, the search range is narrowed as described above. Therefore, it is preferable to set the minimum resolving power.

For example, if the necessary resolving power r is 0.1°, the interval d becomes 573 pixels or more. If a resolving power for detecting a roll angle is applied by the foregoing calculation method, a suitable interval can be set.

The ground contact position estimation unit 2203 estimates the coordinates of the traffic lane width data positioned at the same distance as the ground contact position of the ranging target using the detection frame obtained by an object detection task, the traffic lane center obtained by the traffic lane analysis unit 2201, and the roll angle estimated by the roll angle estimation unit 2202.

Figure 27:
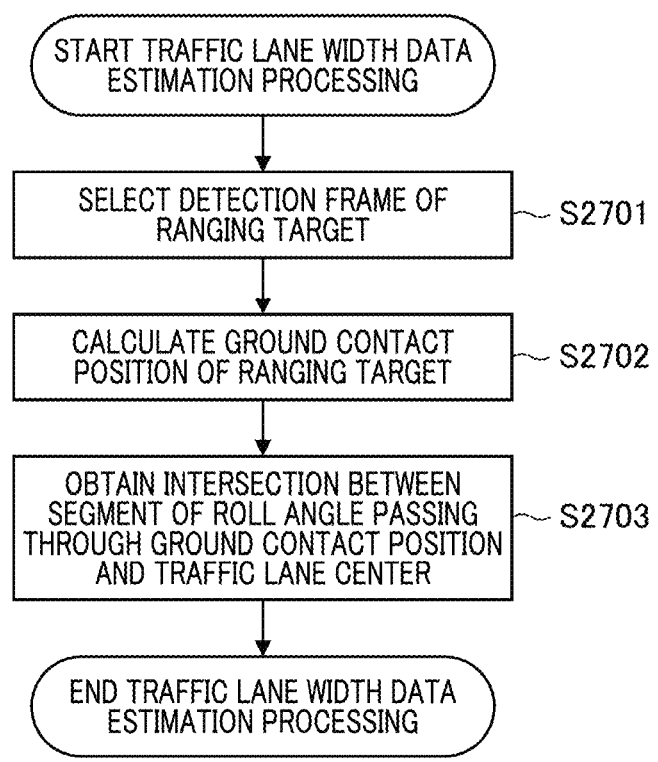
FIG. 27 is a flowchart showing an example of coordinate estimation processing of traffic lane width data executed by a ground contact position estimation unit according to Third Embodiment.

FIG. 27 is a flowchart showing an example of coordinate estimation processing of traffic lane width data executed by the ground contact position estimation unit 2203 according to Third Embodiment. Operation of each step of the flowchart in FIG. 27 is performed by causing the computer included in the path generation device 150 to execute the computer program stored in the memory.

In Step S2701, the ground contact position estimation unit 2203 selects the detection frame of the ranging target from the detection frames obtained by the object recognition task.

In Step S2702, the ground contact position estimation unit 2203 sets the center position of the lower portion of the detection frame as the coordinates (xc, yc) of the ground contact position of the ranging target.

Figure 28:
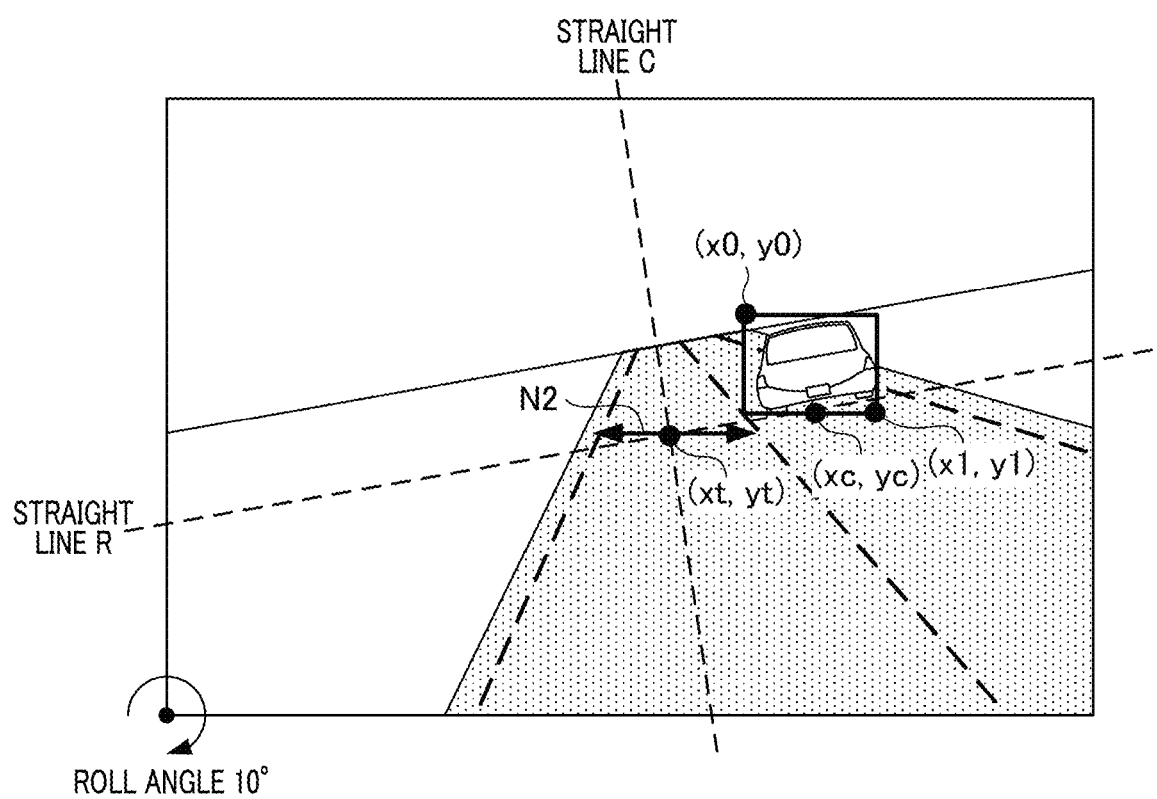
FIG. 28 is a schematic view illustrating an example of coordinates of a ground contact position of a ranging target set by the ground contact position estimation unit according to Third Embodiment.

FIG. 28 is a schematic view illustrating an example of the coordinates (xc, yc) of a ground contact position of a ranging target set by the ground contact position estimation unit 2203 according to Third Embodiment. The coordinates (xc, yc) of the ground contact position of the ranging target are expressed using the following Expression 16 using the upper left coordinates (x0, y0) of the detection frame and the lower right coordinates (x1, y1).

$$(xc, yx) = \left(\frac{x0 + x1}{2}, y1\right) \quad \text{(Expression 16)}$$

Regarding a method for acquiring coordinates of the ground contact position of the ranging target, a technique different from the method described above may also be used. In the case of an object having a large lateral width, such as a car, the object is captured in a manner of tilting by the roll angle, the deviation between the center coordinates at the lower end of the detection frame and the coordinates where the tires are actually in contact with the ground may increase.

In such a case, for example, a constitution in which a contour of an object within the detection frame is detected using the captured image or the distance map and the position where a straight line R having the inclination of the roll angle comes into contact with the lower end of the contour of the object is set as the coordinates of the ground contact surface may be adopted. The coordinates where the ranging target is actually in contact with the ground can be set by using such a constitution.

Since the processing of recognizing a contour of an object requires a large computational load, regarding a constitution in consideration of computation costs, suitable coordinates may be selected from the coordinates of corners of the detection frame in accordance with the positional relationship between the traffic lane center and the ranging target.

Specifically, there is a selection method for selecting the coordinates on the lower left side of the detection frame if a ranging target is present on the left side from the traffic lane center and selecting the coordinates on the lower right side of the detection frame if it is present on the right side. Accordingly, it may be possible to set the coordinates where the ranging target is actually in contact with the straight line R obtained in the next step to the coordinates closer than those set at the center of the lower end of the detection frame.

In Step S2703, the ground contact position estimation unit 2203 obtains coordinates (xt, yt) which pass through the coordinates (xc, yc) of the ground contact position of the ranging target and in which the straight line R of which the inclination becomes the roll angle and a straight line C of the traffic lane center obtained by the division line detection intersect each other.

Through the processing performed as described above, even if the distance map tilts due to the roll angle, the coordinates of the traffic lane width data at the same distance as the ground contact position of the ranging target can be obtained.

The object distance calculation unit 2204 calculates the distance to the ranging target using the coordinates on the traffic lane width data corresponding to the ground contact position obtained by the ground contact position estimation unit 2203, the traffic lane width data calculated by the traffic lane analysis unit 2201, and data on the distance map.

Figure 29:
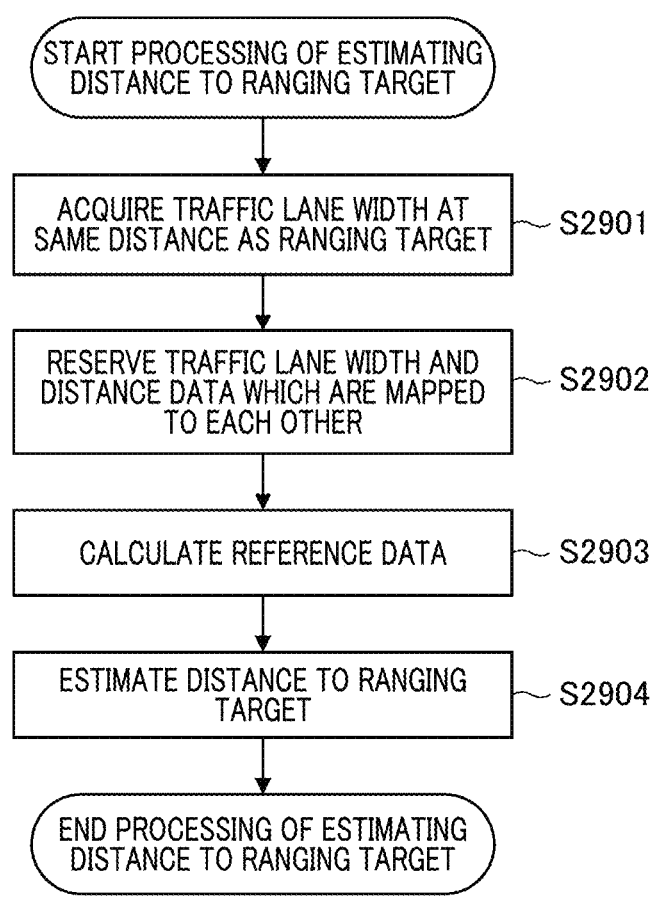
FIG. 29 is a flowchart showing an example of estimation processing of a distance to a ranging target executed by an object distance calculation unit according to Third Embodiment.

FIG. 29 is a flowchart showing an example of estimation processing of a distance to a ranging target executed by the object distance calculation unit 2204 according to Third Embodiment. Operation of each step of the flowchart in FIG. 29 is performed by causing the computer included in the path generation device 150 to execute the computer program stored in the memory.

In Step S2901, the object distance calculation unit 2204 calculates a traffic lane width N2 using the traffic lane width data and the coordinates (xt, yt). The object distance calculation unit 2204 may acquire the traffic lane width of the coordinates (xt, yt) as the traffic lane width N2 and may acquire the traffic lane width thereof based on a weighted average by acquiring a plurality of traffic lane widths in the vicinity of the coordinates (xt, yt) and performing weighting in accordance with the distance from the coordinates (xt, yt).

If the traffic lane width is obtained from the traffic lane detected by image recognition, there is a likelihood that a blur will occur between the traffic lane width detected based on an error in image recognition and the actual traffic lane width. As described above, a blur of the detected traffic lane width can be reduced by calculating the traffic lane width N2 using a plurality of traffic lane widths. The number of pieces of traffic lane width data used for smoothing in accordance with a processing load may be one.

In Step S2902, the object distance calculation unit 2204 reserves the traffic lane width data obtained from the frame at the current time and the distance data, which are mapped to each other. First, the object distance calculation unit 2204 acquires each piece of the traffic lane width data and the coordinates thereof and acquires the distance data corresponding to the coordinates of the traffic lane width data from the distance map.

At this time, the corresponding distance data may be obtained by acquiring and smoothing the distance data corresponding to each of the coordinates within the range of the traffic lane width data (xn—N1/2, yn) to (xn+N1/2, yn) centering on the coordinates (xn, yn) corresponding to a traffic lane width N1 of a traffic lane center line C.

The object distance calculation unit 2204 performs such mapping between the traffic lane width data and the distance data for each piece of the traffic lane width data obtained in the frame T0 at the current time. FIG. 30 is a schematic view illustrating an example of each piece of traffic lane width data according to Third Embodiment. The object distance calculation unit 2204 may narrow the range of the number of pieces of data to be mapped to each other in accordance with a processing load or a recording capacity. For example, a constitution in which only data at a location having a high probability of the distance data is reserved may be performed.

In Step S2903, the object distance calculation unit 2204 calculates reference data B used for calculation of a distance to the ranging target. The reference data B is expressed by the following Expression 17 using a distance D1 to the traffic lane and the traffic lane width N1 when the number of pieces of data mapped in the preceding step is k.

$$B = \sum_{n=0}^{k-1} \frac{(D1[n] \times N1[n])}{k}$$ (Expression 17)

At this time, as the distance increases, an error in the distance data is likely to increase. Therefore, the reference data B may be calculated by a weighted average in which the weight corresponding to the location having a small distance value is increased and the weight corresponding to the location having a large distance value is reduced. In addition, the data obtained in Step S2802 may be constituted such that data corresponding to several frames such as T1 and T2 is held as the frame data in the past, and calculation may be performed including this.

In Mathematical Expression 16, D1 [n]×N1[n] becomes a value corresponding to the traffic lane width which becomes a reference for distance calculation. When the distance to the traffic lane is D, the number of pixels of the traffic lane width in an image is N pixels, and the horizontal field angle of the imaging camera is F°, and the horizontal image width is H pixels, the size W of an actual traffic lane width can be calculated by W=(D×N)×2×tan(F/2)/W. A part of 2×tan(F/

2)/W can be handled as a fixed value when the specification of the imaging camera is determined.

Therefore, an actual traffic lane width becomes a variable of (D×N). Due to this relationship, in Mathematical Expression 16, since the traffic lane width can be regarded as the same when the vehicle travels, observation noise can be curbed by performing smoothing with respect to D1 [n]×N1[n].

In addition, even in the case of a plurality of consecutive frames, since traveling in the same traffic lane is presumed, an actual traffic lane width can be regarded as the same, and thus observation noise can be curbed by performing smoothing with respect to D1 [n]×N1[n].

On the other hand, there is a likelihood that a blur will occur in an image depending on the frame when the vehicle body rides on a small stone or the like so that the traffic lane width data cannot be correctly acquired. For this reason, calculation may be performed to reduce an error from reference data by reducing the weight of the frame in which the estrangement in D1[n]×N1[n] is large (that is, a large blur).

Alternatively, calculation may be performed to maintain a balance between smoothing of a blur generated between the response and the frame with respect to the frame at the current time by increasing the weight as the time difference from the frame at the current time decreases and reducing the weight as the time difference increases. In addition, since the reference data also becomes approximately uniform during a period in which the traffic lane width does not significantly change, a constitution in which a processing load is curbed by utilizing the reference data obtained in the past and skipping the foregoing computation (Mathematical Expression 17) during such a period may be performed.

In Step S2904, the object distance calculation unit 2204 obtains distance data D2 of the ranging target using the reference data B obtained in the preceding step and the traffic lane width N2 of the ranging target. The distance data D2 can be obtained by the following Expression 18.

$$D2=B/N2 \qquad \text{(Expression 18)}$$

Through the processing performed as above, the distance to the ranging target can be estimated. The object distance calculation unit 2204 outputs object distance information indicating the distance to the ranging target obtained in this manner.

As above, in Present Embodiment, an example of a ranging system capable of ranging with high accuracy from a closer place to a distant place by combining stereo ranging using a parallax image and distance estimation from a single image has been described. The distance accuracy can be maintained even if the ranging target is at a distant place, using the size ratio of a scaling object such as a road surface, even if located at a distant place where the ranging accuracy deteriorates in a ranging unit based on the parallax image.

If the scaling target object is an object such as a road of which the actual size is unlikely to change, the distance accuracy can be enhanced by reducing observation noise at the time of measuring a size through smoothing at the time of scaling.

In addition, more robust distance estimation can be performed by changing the synthesis ratio in accordance with the distance range in ranging based on the parallax image and ranging based on distance estimation of a single image. Moreover, it is possible to perform robust distance estimation in which an influence of deformation of the vehicle, irregularity of the traveling road, or the like is reduced by performing detection and correction of a roll angle.

Other Embodiments

In the embodiments described above, an imaging device acquiring parallax images on the left and right sides by the imaging surface phase difference method via the same optical system in order to acquire distance image data has been described as an example, but the acquiring method is not limited thereto.

Parallax images on the left and right sides can also be acquired by so-called stereo cameras in which the parallax image on the left side and the parallax image on the right side are individually acquired by two imaging devices provided on the left and right sides away from each other by a predetermined distance.

In addition, distance information can be acquired using a ranging device such as LiDAR, and the ranging described above can also be performed using the external information obtained by image recognition with respect to the captured image obtained from the imaging device. The foregoing embodiments may be suitably combined. In addition, in the foregoing embodiments, integrated distance information may be generated on the basis of the histories of at least two of the first distance information to the third distance information of an object or the history of the integrated distance information.

In the embodiments described above, an example in which a distance calculation device is mounted as an electronic instrument in the vehicle that is an automobile (movable apparatus) has been described. However, the movable apparatus may be any movable apparatus such as an automatic two-wheeled vehicle, a bicycle, a wheelchair, a ship, an airplane, a drone, or a mobile robot such as AGV or AMR as long as it can move.

In addition, the distance calculation device serving as the electronic instrument of Present Embodiment is not limited to that mounted in these mobile bodies and include a distance calculation device acquiring an image of a camera or the like mounted in a movable apparatus through communication and calculating the distance at a position away from the movable apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition, as a part or the whole of the control according to the embodiments, a computer program realizing the function of the embodiments described above may be supplied to the electronic instrument through a network or various storage media. Then, a computer (or a CPU, an MPU, or the like) of the electronic instrument may be configured to read and execute the program. In such a case, the program and the storage medium storing the program configure the present invention.

This application claims the benefit of Japanese Patent Application No. 2022-036621 filed on Mar. 9, 2022, which is hereby incorporated by reference herein in its entirety.

What is claimed is:

1. An electronic instrument comprising:
one or more memories storing instructions; and
one or more processors executing the instructions to:
acquire first distance information corresponding to an object included in an image signal;
acquire second distance information based on information of an end position of the object included in the image signal;

acquire third distance information based on information of a size of the object included in the image signal;

acquire a ranging value from a kinetic model from relative velocity parameters with respect to the object; and generate integrated distance information based on the first distance information, the second distance information, the third distance information, and the ranging value.

2. The electronic instrument according to claim 1, wherein the one or more processors executing the instructions generate the integrated distance information by performing weighting addition of at least two of the first distance information to the third distance information.

3. The electronic instrument according to claim 1, wherein the one or more processors executing the instructions generate the integrated distance information by selecting at least one of the first distance information to the third distance information.

4. The electronic instrument according to claim 1, wherein the one or more processors executing the instructions acquire the first distance information by a phase difference ranging method.

5. The electronic instrument according to claim 4, wherein the one or more processors executing the instructions acquire the first distance information by the phase difference ranging method based on signals from a first photoelectric conversion unit and a second photoelectric conversion unit disposed within a pixel of an imaging element.

6. The electronic instrument according to claim 4, wherein the one or more processors executing the instructions acquire the first distance information by the phase difference ranging method based on two image signals from a stereo camera.

7. The electronic instrument according to claim 1, wherein the one or more processors executing the instructions acquire the second distance information based on information of a ground contact position or a bottom end position of the object included in the image signal.

8. The electronic instrument according to claim 7, wherein the one or more processors executing the instructions estimate a roll angle of a camera acquiring the image signal.

9. The electronic instrument according to claim 1, wherein the one or more processors executing the instructions acquire the third distance information based on information of a width or a height of the object included in the image signal.

10. The electronic instrument according to claim 1, wherein the one or more processors executing the instructions generate the integrated distance information based on a kind of the object.

11. The electronic instrument according to claim 1, wherein the one or more processors executing the instructions generate the integrated distance information based on histories of at least two of the first distance information to the third distance information of the object.

12. The electronic instrument according to claim 1, the one or more processors executing the instructions acquire fourth distance information with respect to the object using a radar, and wherein the one or more processors executing the instructions generate the integrated distance information based on the fourth distance information.

13. The electronic instrument according to claim 1, wherein the one or more processors executing the instructions generate integrated distance information based on a probability distribution based on the first distance information, the second distance information, and the third distance information, and the ranging value.

14. The electronic instrument according to claim 1, wherein the one or more processors executing the instructions acquire the size of the object based on the at least one of the first distance information and the second distance information.

15. The electronic instrument according to claim 14, wherein the one or more processors executing the instructions acquire the size of the object by averaging sizes of the object in the time-series.

16. A distance calculation method comprising:
acquiring first distance information corresponding to an object included in an image signal;
acquiring second distance information based on information of an end position of the object included in the image signal;
acquiring third distance information based on information of a size of the object included in the image signal;
acquiring a ranging value from a kinetic model from relative velocity parameters with respect to the object; and
generating integrated distance information based on the first distance information, the second distance information, the third distance information, and the ranging value.

17. A non-transitory computer-readable storage medium configured to store a computer program comprising instructions for executing following processes:
acquiring first distance information corresponding to an object included in an image signal;
acquiring second distance information based on information of an end position of the object included in the image signal;
acquiring third distance information based on information of a size of the object included in the image signal;
acquiring a ranging value from a kinetic model from relative velocity parameters with respect to the object; and
generating integrated distance information based on the first distance information, the second distance information, the third distance information, and the ranging value.

18. The electronic instrument according to claim 1, the one or more processors executing the instructions acquire an absolute error in the first distance information based on the second distance information and the third distance information.

19. The electronic instrument according to claim 1, the one or more processors executing the instructions acquire an error correction value for the first distance information such that a change in the size of the object is reduced.

* * * * *